United States Patent
Patel et al.

(10) Patent No.: US 12,039,581 B2
(45) Date of Patent: Jul. 16, 2024

(54) CONTROLLED DISPENSING SYSTEM AND METHOD

(71) Applicant: PAYRANGE INC., Portland, OR (US)

(72) Inventors: Paresh K. Patel, Portland, OR (US); Srinivas Annam, San Jose, CA (US)

(73) Assignee: PAYRANGE INC., Portland, OR (US)

( * ) Notice: Subject to any disclaimer, the term of this patent is extended or adjusted under 35 U.S.C. 154(b) by 0 days.

(21) Appl. No.: 17/447,528

(22) Filed: Sep. 13, 2021

(65) Prior Publication Data
US 2021/0406970 A1    Dec. 30, 2021

Related U.S. Application Data

(63) Continuation-in-part of application No. 17/026,000, filed on Sep. 18, 2020.
(Continued)

(51) Int. Cl.
*G06Q 30/0601* (2023.01)
*A24F 40/53* (2020.01)
(Continued)

(52) U.S. Cl.
CPC ........ *G06Q 30/0607* (2013.01); *A24F 40/53* (2020.01); *G05B 19/042* (2013.01);
(Continued)

(58) Field of Classification Search
CPC ............ G06Q 30/0607; G06Q 20/322; G05B 19/042; G05B 2219/23363; A24F 40/65; A24F 40/53; G06K 7/1095; G06K 7/1413
See application file for complete search history.

(56) References Cited

U.S. PATENT DOCUMENTS 6,711,465 B2 * 3/2004 Tomassi ................. G07C 9/257
                                                    700/236
7,783,379 B2    8/2010 Beane et al.
(Continued)

FOREIGN PATENT DOCUMENTS

EP          3869395 A1    8/2021
WO    WO2019032043 A1    2/2019
(Continued)

OTHER PUBLICATIONS

Payrange, Inc., PCT/US2020/055456, International Search Report and Written Opinion, Feb. 2, 2021, 9 pgs.
(Continued)

*Primary Examiner* — Michael Collins
(74) *Attorney, Agent, or Firm* — Morgan, Lewis & Bockius LLP

(57) ABSTRACT

A controlled dispensing system includes a dispensing fixture and a server system coupled to the dispensing fixture and a mobile device via a communication network. The server system receives from the mobile device identification data of a user of the mobile device, verifies an identity or age of the user, and receives a request to reserve a controlled product included in the dispensing fixture. In accordance with the verifying of the identity or age of the user and the request to reserve the controlled product, the server system transmits to the mobile device dispense approval data including user validation and product selection information. The dispensing fixture obtains via an input peripheral a dispense code provided by the mobile device, the dispense code corresponding to the dispense approval data, and in accordance with the dispense code, causes a dispensing mechanism to dispense the controlled product.

20 Claims, 35 Drawing Sheets

Related U.S. Application Data

(60) Provisional application No. 63/075,814, filed on Sep. 8, 2020, provisional application No. 62/985,882, filed on Mar. 5, 2020.

(51) Int. Cl.
| | |
|---|---|
| *A24F 40/65* | (2020.01) |
| *G05B 19/042* | (2006.01) |
| *G06K 7/10* | (2006.01) |
| *G06K 7/14* | (2006.01) |
| *G06Q 20/32* | (2012.01) |

(52) U.S. Cl.
CPC ......... *G06K 7/1095* (2013.01); *G06K 7/1413* (2013.01); *G06Q 20/322* (2013.01); *A24F 40/65* (2020.01); *G05B 2219/23363* (2013.01)

(56) References Cited

U.S. PATENT DOCUMENTS

| | | |
|---|---|---|
| 9,466,082 B1 | 10/2016 | Dabiri |
| 9,691,201 B2 | 6/2017 | Myers et al. |
| 9,904,911 B2 | 2/2018 | Bowles |
| 10,171,444 B1 | 1/2019 | Lerner |
| 10,395,246 B2 | 8/2019 | Li |
| 10,402,804 B1 | 9/2019 | Wittern, III et al. |
| 10,600,095 B2* | 3/2020 | Ackerman ......... G06Q 10/0836 |
| 10,726,246 B1 | 7/2020 | McClellan et al. |
| 11,200,770 B2* | 12/2021 | Hubbard ................ A24F 40/53 |
| 11,321,962 B2 | 5/2022 | McClellan et al. |
| 11,334,931 B2 | 5/2022 | Ryner et al. |
| 11,386,740 B2* | 7/2022 | Shah ....................... G07F 11/06 |
| 11,537,352 B1 | 12/2022 | Clements |
| 11,620,622 B2 | 4/2023 | Swaminathan |
| 11,657,667 B2 | 5/2023 | Patel et al. |
| 11,663,875 B2 | 5/2023 | Patel et al. |
| 11,783,395 B2* | 10/2023 | Hubbard ................ H04L 9/50 705/26.25 |
| 2001/0026632 A1 | 10/2001 | Tamai |
| 2002/0087413 A1 | 7/2002 | Mahaffy et al. |
| 2005/0192705 A1 | 9/2005 | Pinney et al. |
| 2006/0157152 A1 | 7/2006 | Wolski et al. |
| 2007/0180022 A1 | 8/2007 | Kimura |
| 2007/0239456 A1 | 10/2007 | LaFauci et al. |
| 2008/0269947 A1 | 10/2008 | Beane et al. |
| 2009/0144208 A1 | 6/2009 | Blust et al. |
| 2010/0234986 A1 | 9/2010 | Clopton et al. |
| 2010/0325709 A1 | 12/2010 | Kawase |
| 2012/0185317 A1 | 7/2012 | Wong |
| 2012/0310408 A1* | 12/2012 | Stache ................. G06Q 20/325 705/26.1 |
| 2014/0100691 A1 | 4/2014 | West |
| 2015/0088731 A1* | 3/2015 | Ackerman ......... G06Q 10/0836 705/39 |
| 2015/0100441 A1 | 4/2015 | Alarcon et al. |
| 2015/0324794 A1 | 11/2015 | Vadura et al. |
| 2016/0098882 A1* | 4/2016 | Holdych .............. G06Q 20/327 700/237 |
| 2016/0106936 A1 | 4/2016 | Kimmel |
| 2016/0155127 A1 | 6/2016 | Hartman |
| 2016/0379287 A1 | 12/2016 | Dabiri |
| 2017/0186110 A1 | 6/2017 | Carpenter et al. |
| 2017/0302641 A1* | 10/2017 | Ramatchandirane ....................... G06Q 20/4012 |
| 2018/0262891 A1 | 9/2018 | Wu et al. |
| 2018/0288594 A1 | 10/2018 | Kim |
| 2019/0050921 A1* | 2/2019 | Ryner ..................... G06Q 20/18 |
| 2019/0114685 A1 | 4/2019 | Postrel |
| 2020/0137570 A1 | 4/2020 | Skoda |
| 2020/0342507 A1* | 10/2020 | Hubbard ................. A24F 40/53 |
| 2020/0396220 A1 | 12/2020 | McKegney et al. |
| 2020/0401792 A1 | 12/2020 | McClellan et al. |
| 2021/0176240 A1 | 6/2021 | Rose |
| 2021/0279994 A1 | 9/2021 | Patel et al. |
| 2021/0327201 A1 | 10/2021 | Patel |
| 2021/0327203 A1* | 10/2021 | Shah ....................... G06F 21/32 |
| 2021/0403239 A1 | 12/2021 | Patel et al. |
| 2021/0405602 A1 | 12/2021 | Patel et al. |
| 2021/0407243 A1 | 12/2021 | Patel et al. |
| 2022/0051507 A1* | 2/2022 | Forutanpour ........... H04M 1/24 |
| 2022/0071299 A1 | 3/2022 | Patel |
| 2022/0245690 A1 | 8/2022 | Ryner et al. |
| 2022/0398557 A1 | 12/2022 | Richards |
| 2023/0298427 A1 | 9/2023 | Patel et al. |
| 2023/0322487 A1 | 10/2023 | Patel |
| 2024/0002152 A1 | 1/2024 | Patel et al. |

FOREIGN PATENT DOCUMENTS

| | | |
|---|---|---|
| WO | WO2019/126805 A1 | 6/2019 |
| WO | WO2021/178007 A1 | 9/2021 |

OTHER PUBLICATIONS

Payrange, Inc., PCT/US2020/055456, International Preliminary Report on Patentability, Sep. 6, 2022, 6 pgs.
Patel, Non-Final Office Action, U.S. Appl. No. 17/026,000, Sep. 29, 2022, 17 pgs.
Patel, Non-Final Office Action, U.S. Appl. No. 17/469,776, Sep. 29, 2022, 16 pgs.
Patel, Non-Final Office Action, U.S. Appl. No. 17/194,152, Mar. 10, 2023, 14 pgs.
Patel, Notice of Allowance, U.S. Appl. No. 17/026,000, Apr. 7, 2023, 8 pgs.
Patel, Notice of Allowance, U.S. Appl. No. 17/469,776, Apr, 10, 2023, 9 pgs.
Patel et al., Non-Final Office Action, U.S. Appl. No. 17/447,530, Apr. 13, 2023, 14 pgs.
Patel et al., Notice of Allowance, U.S. Appl. No. 17/447,530, Oct. 24, 2023, 9 pgs.
Patel et al., Non-Final Office Action, U.S. Appl. No. 17/447,499, Apr. 12, 2023, 20 pgs.
Patel et al., Notice of Allowance, U.S. Appl. No. 17/447,499, Oct. 26, 2023, 9 pgs.
Patel, Notice of Allowance, U.S. Appl. No. 17/194,152, Nov. 15, 2023, 8 pgs.
Patel et al., Non-Final Office Action, U.S. Appl. No. 18/201,096, Dec. 28, 2023, 17 pgs.
Patel et al., Notice of Allowance, U.S. Appl. No. 18/327,689, Feb. 5, 2024, 10 pgs.
Patel et al., Notice of Allowance, U.S. Appl. No. 17/447,530, Feb. 14, 2024, 8 pgs.
Payrange, Inc., PCT/US2022/043357, International Search Report and Written Opinion, Apr. 24, 2023, 35 pgs.

\* cited by examiner

| Step | Device(s) | Association |
|---|---|---|
| Account Setup | Device 106 / Server 108 | UserID < > MobileID — 602 |
| Item Selection | Device 106 / Server 108 | UserID < > SelectID — 604 |
| Item Identification | Machine 102 | UserID < > ItemID — 606 |
| Item Activation | Server 108 | MobileID < > ItemID — 608 |

Figure 6A

| Step | Device(s) | Association |
|---|---|---|
| Account Setup | Device 106 / Server 108 | UserID < > MobileID — 612 |
| Item Stocking | Machine 102 | ItemID < > SelectID — 614 |
| Item Selection | Device 106 / Server 108 | UserID < > ItemID — 616 |
| Item Activation | Server 108 | MobileID < > ItemID — 618 |

CONTROLLED DISPENSING SYSTEM AND METHOD

RELATED APPLICATIONS

The present application is a continuation-in-part of U.S. patent application Ser. No. 17/026,000, filed Sep. 18, 2020, which claims priority to U.S. Provisional Patent Application No. 62/985,882, filed Mar. 5, 2020, and U.S. Provisional Patent Application No. 63/075,814, filed Sep. 8, 2020, each of which is hereby incorporated by reference in its entirety.

TECHNICAL FIELD

The present application relates to the field of controlled dispensing machines, and in particular, to a system for restricting the purchase and use of controlled products to individuals who are authorized to use them.

BACKGROUND

Selling age-restricted products presents particular issues and there must be effective systems in place for preventing sales to prospective consumers who are underage. Since young people often seek to discover ways to evade proof-of-age checks and obtain age-restricted products, sales of such products have traditionally required a live person at the point of sale to request valid proof of age to confirm that the purchaser is over the minimum age to buy the product in question.

In the case of online or remote sales, retailers may require purchasers of age-restricted products to register details or to set up accounts for future purchases, which means age verification checks may only be required for the initial set-up of accounts or on the first purchase from the website. However, upon delivery or pickup of the product, a live person is still required to perform identity verification to ensure that the person receiving the age-restricted product matches the identity of the person who set up the account used to purchase the product.

Even if the seller of an age-restricted product can successfully verify the age and identity of the purchaser upon receipt of the product, the purchaser may allow an underage person to use the product and the seller would have no way of knowing when or how often this is happening.

Failure to restrict the purchase and use of such products to authorized individuals can lead to adverse consequences to sellers and manufacturers, such as lawsuits, sanctions (e.g., geographic restrictions on sales), aggressive legislative and regulatory restrictions, fines, and even imprisonment. As such, sellers and manufacturers of age-restricted products have an interest in ensuring that such products are purchased by, released to, and used by authorized individuals only.

SUMMARY

Disclosed herein is a controlled dispensing system for restricting the purchasing, release, and usage of controlled products to authorized users. An example controlled product is a product for which usage is controlled by an age restriction (e.g., a cigarette, tobacco product, cannabis product, cannabidiol (CBD), vaping product, e-liquid, electronic cigarette, nicotine pouch, nicotine gum, dietary supplement, alcohol, lottery ticket, firearm, and so forth). An example controlled product may additionally or alternatively be subject to other kinds of restriction, such as security restrictions (e.g., inventory-controlled products that may have a relatively high tendency to be stolen, such as contraceptives, razor blade refills, spray paint, baby formula, calling cards, cough syrup, pharmaceutical products, and so forth), identity restrictions (e.g., products authorized for a specified individual such as a prescription medication or other pharmaceutical product), and/or quantity restrictions (e.g., products limited to a certain number of purchases or items to a consumer in any given period of time).

Disclosed herein are various implementations of systems and methods for dispensing and activating controlled products or, more specifically, systems and methods for restricting the purchase and/or use of controlled products to individuals who are authorized to use them based on identity-based and/or age-based restrictions associated with the controlled products.

BRIEF DESCRIPTION OF THE DRAWINGS

FIGS. 6A-6B are diagrams of the various associations between identifiers in accordance with some implementations.

FIGS. 17A-17F are diagrams of transaction screens of a user interface associated with product selection in accordance with some implementations.

FIGS. 18A-18B are diagrams of transaction screens of a user interface associated with clerk authentication in accordance with some implementations.

Like reference numerals refer to corresponding parts throughout the several views of the drawings.

DETAILED DESCRIPTION

Figure 1:
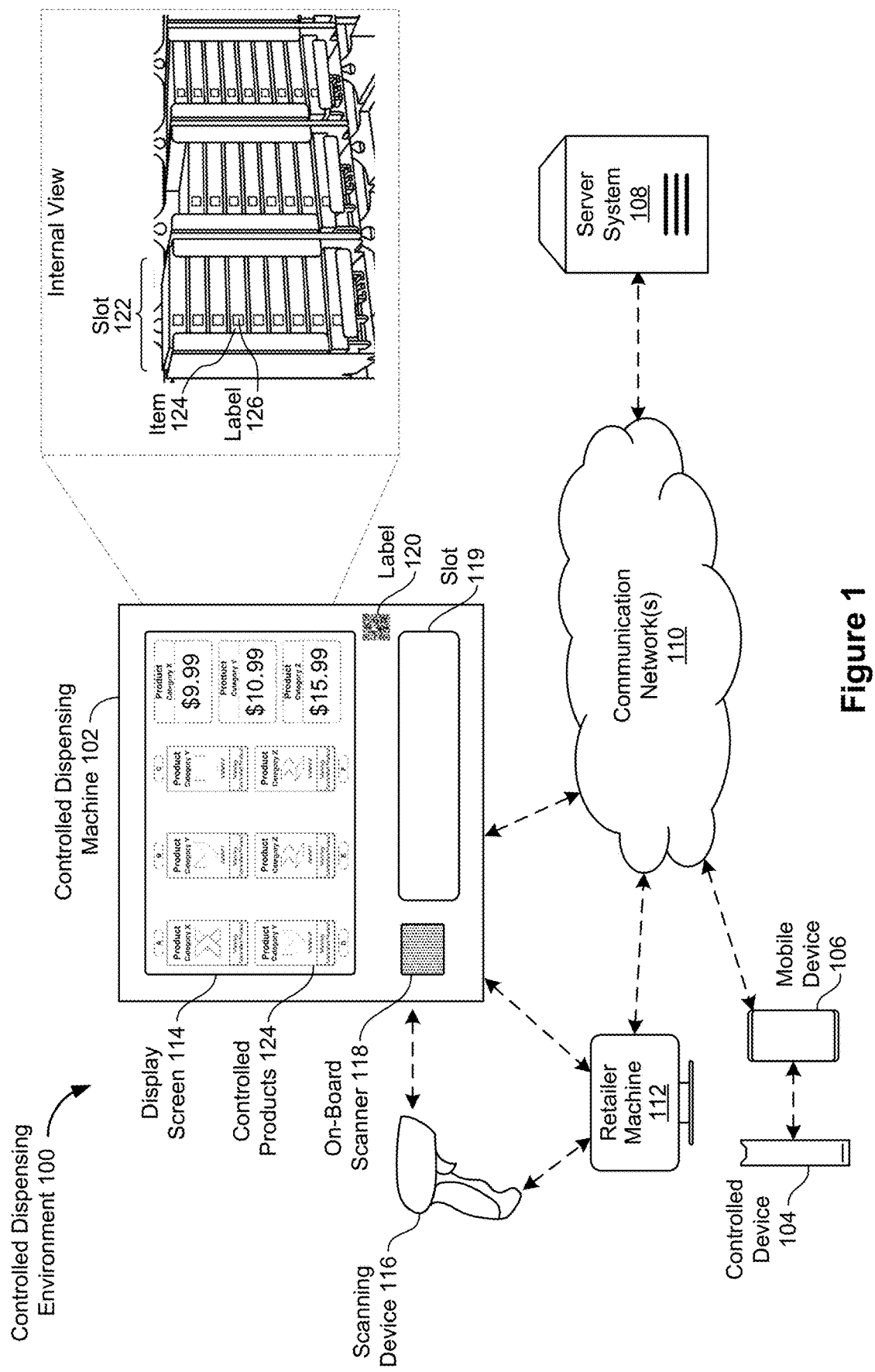
FIG. 1 is a diagram of a controlled dispensing environment in accordance with some implementations.

Disclosed herein are various implementations of systems and methods for dispensing and activating controlled products or, more specifically, systems and methods for restricting the purchase and use of controlled products to individuals who are authorized to use them.

In some implementations, a consumer creates an account using any electronic device. Included in the account setup process is an age verification step, so that upon setting up the account, the consumer's age is verified, and the consumer's identity is linked to the account. Also included in the account setup process is a personal electronic device linking step, so that upon setting up the account, the consumer's personal electronic device (e.g., smartphone) is linked to the account.

The user's account information is stored on a server. When the consumer purchases a controlled product, the server obtains a unique product (or categorical) identifier corresponding to the particular controlled product purchased by the consumer. The server may obtain the unique product identifier as a result of a dispensing machine scanning the purchased product as it is being released or prior to being released to the consumer. Alternatively, the server may preemptively obtain the unique product identifier as the product is being stocked into a dispensing machine (prior to the purchase of the product). Alternatively, a product in a machine may be categorized as being a restricted product based on the machine it is stocked into or the specific slot it is stocked in without any unique identifier of the product itself.

Using the unique product identifier, the server links the purchased product to the consumer's account. As part of this linking process, the purchased product is associated with the consumer's personal electronic device. In some aspects, as a result of this association, the purchased device can only be used when in range of the user's personal electronic device.

Thus, the purchase of the controlled device complies with age-restriction requirements because the consumer verifies his or her age during an account setup process. Additionally, in some aspects, the use of the controlled device complies with age-restriction requirements because functionality of the controlled device is enabled only when in range of the consumer's personal electronic device. In some embodiments, in addition to being in range of the consumer's personal electronic device, the consumer must also perform a biometric verification (FaceID or TouchID) or enter a PIN to activate and/or use the controlled device. This prevents the device from working if the consumer gives it to an underage or unauthorized individual after the purchase is complete.

Importantly, the technical aspects of this system (e.g., automated linking and activation) allow for the purchase and use restrictions to be met as described above without the requirement of a live person (e.g., a store clerk) to conduct an age verification at the point of sale. This technical automation provides for a more efficient user experience, ensures compliance with restrictions regarding controlled devices, and allows controlled devices to be sold remotely by unstaffed dispensing devices, thereby providing for increased availability of controlled devices without sacrificing consumer safety or seller/manufacturer liability.

FIG. 1 is a diagram of a controlled dispensing environment 100 in accordance with some implementations. The environment 100 includes a controlled dispensing machine 102, a controlled device 104, a mobile device 106, and a server system 108. The controlled dispensing machine 102 and the mobile device 106 communicate with the server system 108 over one or more communication networks 110 such as the Internet. The controlled device 104 communicates with the mobile device 106 using a short-range communication network such as Bluetooth Low Energy (BLE). In some implementations, the environment 100 includes a retailer machine 112, such as a computing terminal at a checkout counter in a store, that communicates with the server system 108 over the communication network(s) 110.

The controlled dispensing machine 102 is a machine configured to store a plurality of controlled products, such as an item 124 or controlled device 104, and release them to consumers. The machine 102 may be a vending machine or any other device that stores products or services and dispenses the products or services as a result of transactions involving consumers. The machine 102 can be a wall-mount vending machine or placed on the ground. The machine 102 may have a glass (or otherwise transparent) front panel (or no front panel) so the item 124 is visible, or it may have a digital display screen 114 on which a representation of the item 124 is presented, or it may have any other type of opaque front panel (such as metal or plastic) where the item 124 is not directly visible and is instead represented in analog form such as with a decal, picture, or label. In some implementations, the machine 102 does not accept cash, coins, or credit cards, and instead acts on instructions received from the server system 108 (e.g., as a result of a consumer selecting an item 124 using a mobile device 106). Machines 102 stocked with controlled devices associated with age restrictions may be located in adult-oriented venues such as bars, convention centers, hotels, airports, clubs, and so forth. Each product is associated with a unique product identifier (e.g., a serial number). The unique product identifier may be disposed on a label 126 of the item 124 or printed on the packaging of item 124. The machine 102 includes a plurality of storage positions, sometimes referred to as slots 122. The slots may be disposed across one or more rows and/or columns of the machine 102. The machine 102 is associated with a unique machine identifier. The unique machine identifier may be disposed on a label 120 (e.g., a quick response (QR) code or a barcode that may be scanned by the mobile device 106). The machine 102 is communicatively coupled to the server system 108 over the network(s) 110. In some implementations, the controlled dispensing machine 102 includes a on-board scanner 118, configured to scan ID cards (e.g., a driver's license of a consumer or an employee identification card of a retail employee). Additionally or alternatively, the controlled dispensing machine 102 may communicate via a short-range communication protocol (e.g., Bluetooth) with an external scanning device 116, configured to scan ID cards. The scanning device 116 may communicate via a short-range communication protocol (e.g., Bluetooth) with the retail machine 112 (e.g., communicating data associated with scanned ID cards).

The controlled device 104 is any product that is associated with a usage restriction. An example usage restriction is an age restriction (e.g., may only be used by those who are 18 and up, 21 and up, or whatever the case me be). Controlled devices 104 may additionally or alternatively be restricted in other ways, such as by identity (e.g., may only be used by a particular individual), by quantity or usage, or by any other type of attribute associated with one or more individuals. Example controlled devices 104 include electronic cigarettes (e-cigs), electronic vaporizers (vaping pens or vape pens), or any other product including a controlled substance such as tobacco, nicotine, alcohol, marijuana, and so forth. Controlled devices 104 may be products configured to interface with any of the aforementioned example products. For example, a controlled device 104 may be a vaping accessory which may or may not include a controlled substance. Controlled devices 104 may be associated with medicine or any other type of age-restricted substance. Controlled devices 104 may include products which are not associated with legal restrictions, but may be meant for individuals who need to be tracked by the seller or manufacturer, or for whom the transaction itself needs to be tracked by the seller or manufacturer (e.g., for compliance purposes). For example, controlled devices 104 may include communication devices (phones, sim cards, and so forth) which are meant to be sold to adults only, or to individuals for whom the transaction needs to be tracked.

The mobile device 106 is a personal electronic device associated with the consumer (e.g., the consumer's smartphone). Mobile devices 106 include, but are not limited to, smart phones, tablet or laptop computers, or personal digital assistants (PDAs), smart cards, or voice assistant devices (such as Alexa), or other technology (e.g., a hardware-software combination) known or yet to be discovered that has structure and/or capabilities similar to the mobile devices described herein. The mobile device 106 includes a long-range communication capability (e.g., modem, transceiver, and so forth) for communicating through the network(s) 110, and a short-range communication capability (e.g., BLE) for communicating with the controlled device 104 and other devices in range of a short-range radio (e.g., Bluetooth radio) of the mobile device 106. Communications between the mobile device 106 and the controlled device 104 take place using short-range communication technology or short-range communication protocol (e.g., Bluetooth (such as Bluetooth 4.0, Bluetooth Smart, Bluetooth Low Energy (BLE)), near-field communication (NFC), Ultra Wideband (UWB), radio frequency identification (RFID), infrared wireless, induction wireless, WiFi, or any wired or wireless technology that could be used to communicate a small distance (e.g., approximately a hundred feet or closer) that is known or yet to be discovered). The communications technologies described herein may be replaced with alternative communications technologies and, therefore, specific communications technologies are not meant to be limiting. For example, Wi-Fi technology could be replaced with another long-range communications technology.

The server system 108 communicates with the machine 102, the mobile device 106, and the retailer machine 112 through the communication network(s) 110. The server system 108 stores user accounts associated with consumers of the controlled devices 104, and links the various identifiers associated with controlled devices 104 and mobile devices 106 to respective user accounts, as described in more detail below with reference to FIGS. 6-8. The server system 108 includes one or more host processing servers that may be operated by a company associated with the seller of controlled devices 104. For each consumer, the server system 108 may maintain a virtual wallet having a balance (which can be $0) of designated funds for which the server system 108 keeps an accounting. The balance may represent, for example, cash or it may be a promotional value that represents funds that may be spent under certain circumstances. If these funds begin to be depleted, the consumer may be notified (e.g., via an application on the mobile device 106 or via an electronic communication) that additional funds need to be designated and/or transferred. Alternatively, funds from other sources (e.g., a funding source server) may be automatically transferred to restore a predetermined balance.

The communication network(s) 110 include wired and/or wireless communication networks that facilitate connections that are ongoing (e.g., a dedicated connection, a dedicated online connection, and/or a hardwired connection) or accessible on demand (e.g., the ability for the machine 102 to make a temporary connection to the server system 108 or the ability for a consumer to contact the server system 108 from a mobile device 106). Typically the network connection is conducted over long-range communication technology or long-range communication protocol (e.g., hardwired, telephone network technology, cellular technology (e.g., GSM, CDMA, or the like), Wi-Fi technology, wide area network (WAN), local area network (LAN), or any wired or wireless communication technology over the Internet that is known or yet to be discovered.

The retailer machine 112 is any computing device located in the vicinity of the point of sale of a controlled device 104 (e.g., a terminal computing device at a checkout counter in a store). The retailer machine 112 communicates with the server system 108 through the communication network(s) 110 using a long-range communication technology as described above.

Figure 2:
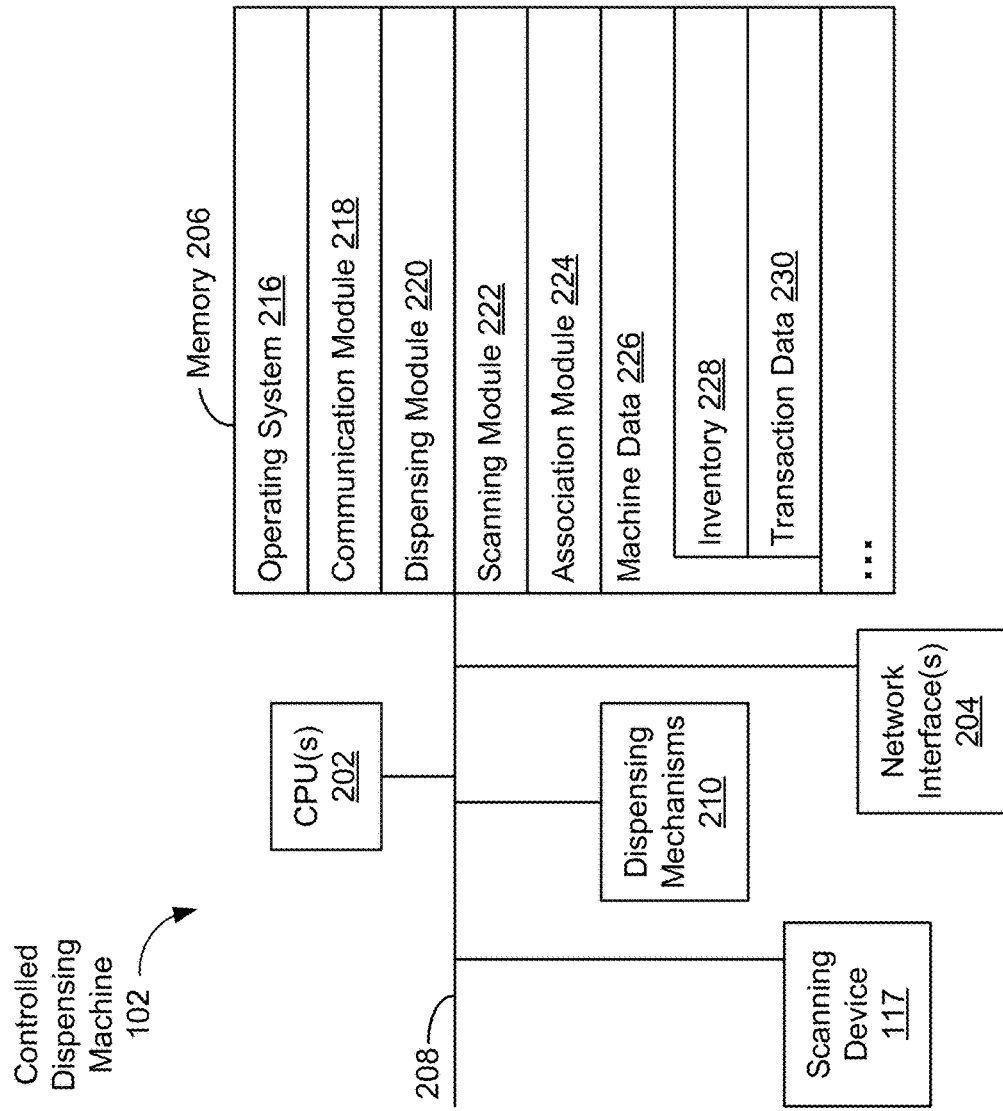
FIG. 2 is a diagram of a controlled dispensing machine in accordance with some implementations.

FIG. 2 is a block diagram illustrating an example controlled dispensing machine 102 of the controlled dispensing environment 100 in accordance with some implementations. The controlled dispensing machine 102 includes one or more processing units (CPUs) 202, one or more network interfaces 204, memory 206, and one or more communication buses 208 for interconnecting these components. The CPU(s) 202, network interface(s) 204, memory 206, and bus(es) 208 may be implemented on an electronic processing unit (e.g., a printed circuit board) and/or in any other type of hardware housing installed or otherwise disposed in the controlled dispensing machine 102.

The controlled dispensing machine 102 includes one or more dispensing mechanisms 210 for releasing the products (items 124) stored therein. Examples include rotating elements that release the next item 124 in a slot 122, or any other type of mechanical component (e.g., a release lever or arm) that physically manipulates the item 124 by causing it to be relocated to an area of the machine 102 in which a consumer can access the released product. In some implementations, the dispensing mechanism(s) 210 move the product to an intermediate area (e.g., for scanning or otherwise obtaining information about the product, such as a product identifier) before moving the product to a release area (e.g., in proximity to a slot 119 providing access to dispensed products).

Figure 21A:
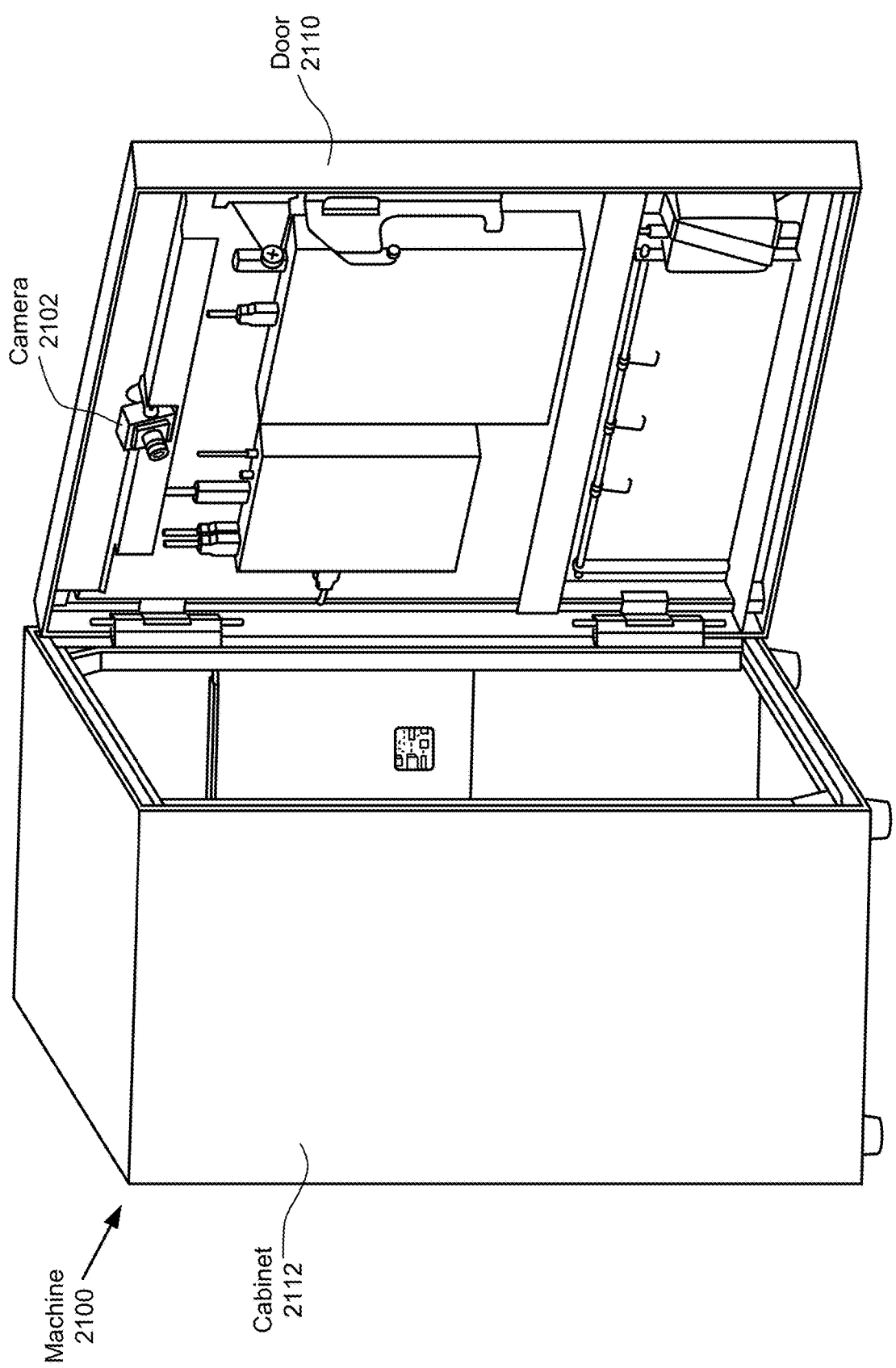
FIGS. 21A-21D are diagrams of a controlled dispensing machine including an internal camera in accordance with some implementations.
Figure 21B:
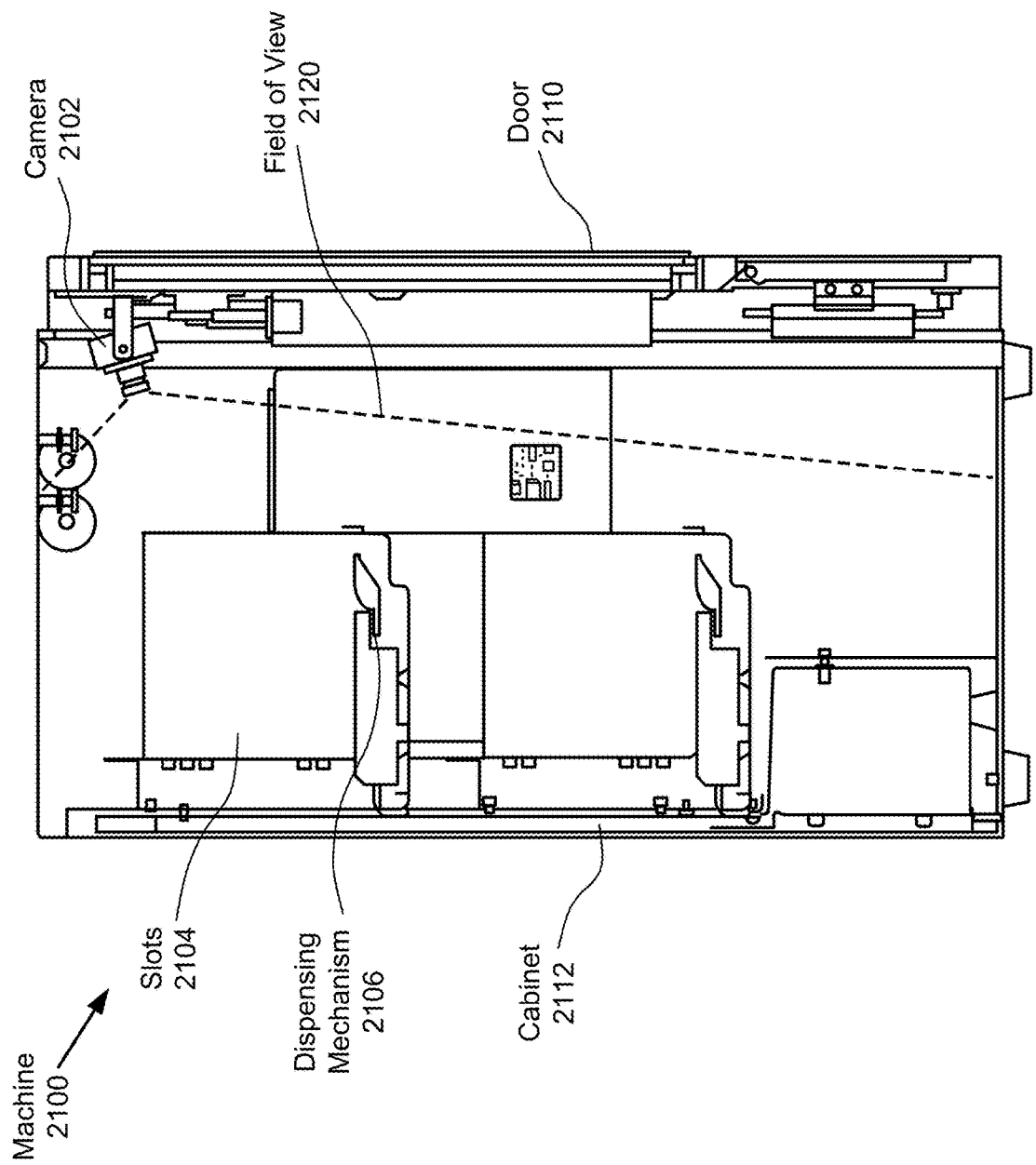
Figure 21C:
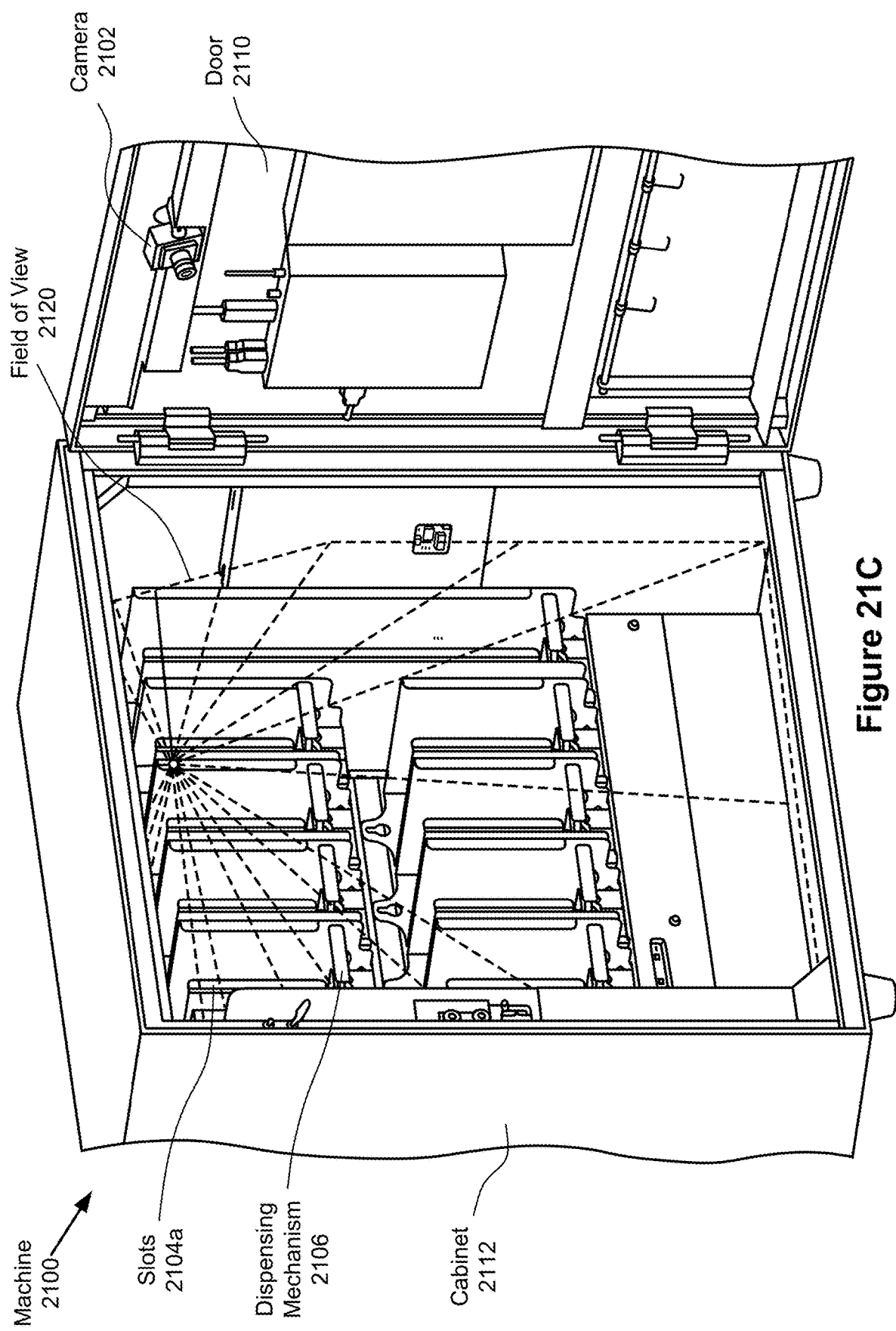
Figure 21D:
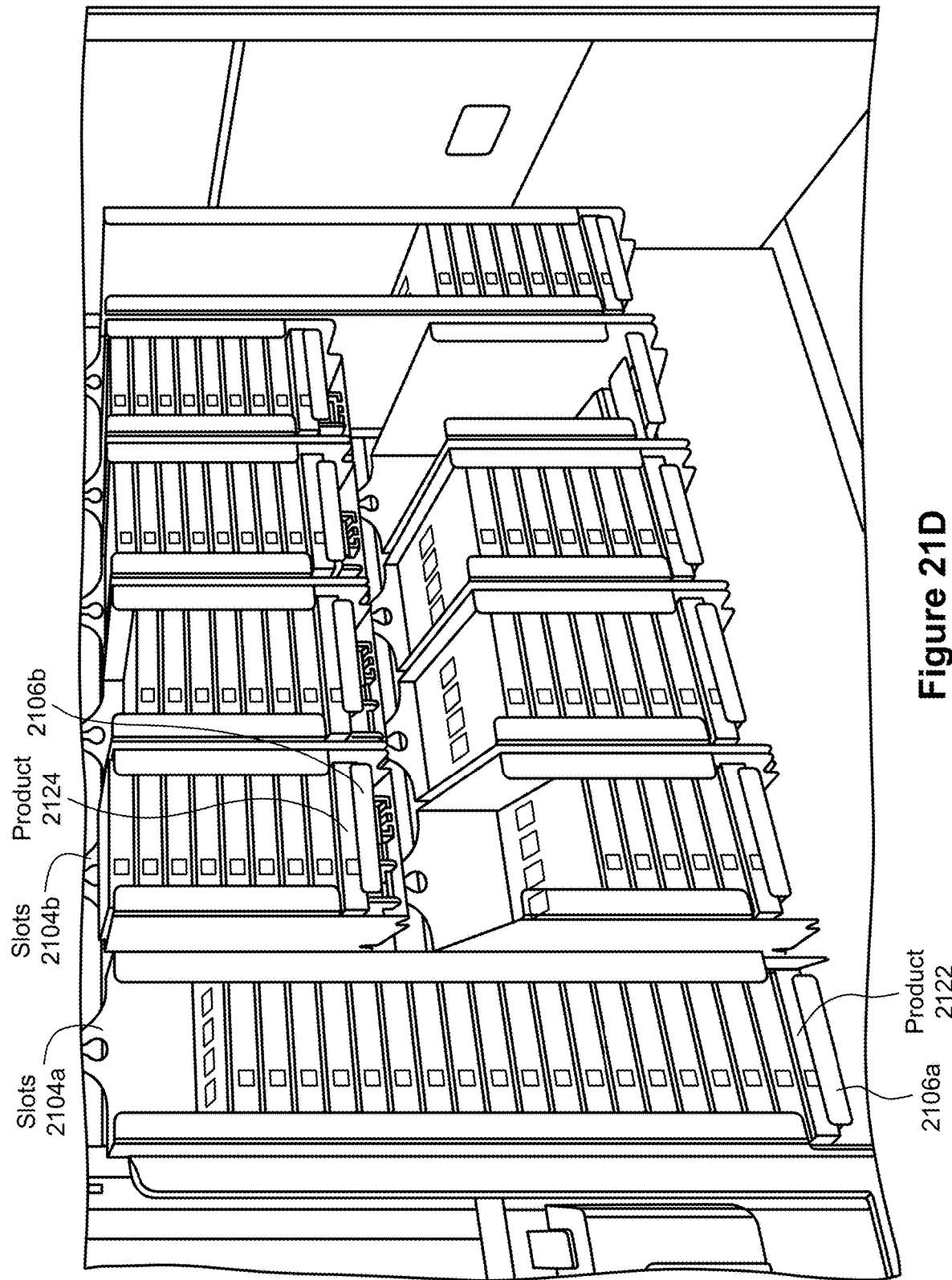

The controlled dispensing machine 102 optionally includes an on-board scanning device 118 (e.g., camera 2102, FIGS. 21A-21C) for obtaining information about the product (e.g., a product identifier). The scanning device 118 may be an image-based device (e.g., a camera), a laser-based device, or any other type of device that can identify a product or a characteristic of a product (e.g., a serial number, a barcode, a QR code, etc.). In some implementations, the scanning device is an imaging device, a laser scanning device, or any other type of scanner configured to scan a barcode or any other type of visual indicator on the surface of a product that is being dispensed in order to obtain the product identifier. In some implementations, the scanning device is a near field communication (NFC) scanning device configured to scan an NFC tag in or otherwise associated with the product as it is being dispensed in order to obtain the product identifier. In some implementations, the machine 102 may have products stocked in a manner in which many (or substantially all) product identifiers are visible at once. In some implementations, the machine 102 periodically captures an image (e.g., using a camera 2102, FIGS. 21A-21C) to count the items in each slot, track sales, keep track of the unique identifiers, and keep track of batch codes (for instance in the case of recall). If a product is recalled or expired, the machine can disable the particular slot(s) based on either local computation or analysis at the machine 102 or based on instructions received from the server based on remote analysis either systematically or by a human.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Communication module 218 for connecting the controlled dispensing machine 102 to other devices (e.g., the server system 108) via one or more network interfaces 204 (wired or wireless) and one or more communication networks 110, such as the Internet, other wide area networks, local area networks, metropolitan area networks, and so on;

Dispensing module 220 for controlling the dispensing mechanisms 210 in accordance with dispense instructions received from the server system 108;

Scanning module 222 for controlling the scanning device 118 in accordance with scan-and-dispense operations;

Association module 224 for linking a product identifier associated with a scanned and dispensed product with a user identifier associated with the purchase of the scanned and dispensed product; and Machine data 226 including:
Inventory 228 including a listing of available products stored in the machine 102; and
Transaction data 230 including user identifiers and product identifiers involved in current and/or past purchases of products stored in the machine 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
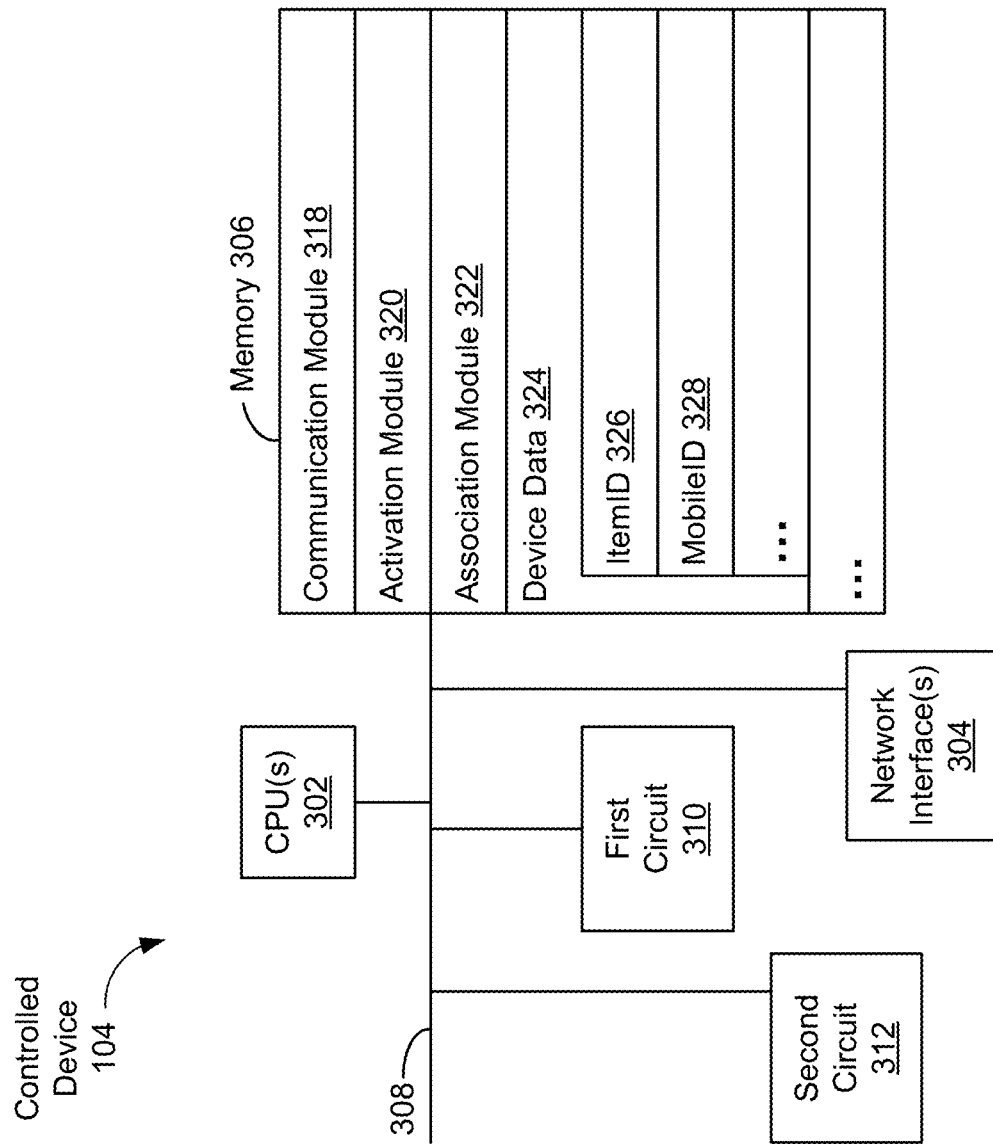
FIG. 3 is a diagram of a controlled device in accordance with some implementations.

FIG. 3 is a block diagram illustrating an example controlled device 104 of the controlled dispensing environment 100 in accordance with some implementations. The controlled device includes one or more processing units (CPUs) 302, one or more network interfaces 304, memory 306, and one or more communication buses 308 for interconnecting these components. The CPU(s) 302, network interface(s) 304, memory 306, and bus(es) 308 may be implemented on an electronic processing unit (e.g., a printed circuit board) and/or in any other type of hardware housing installed or otherwise disposed in the controlled device 104.

The controlled device 104 includes a first electronic circuit 310 for controlling one or more functions that are central to the controlled device 104. For example, if the controlled device is a vaping pen, the first circuit may control a vaporizing function (e.g., heating element and/or temperature sensing circuit) of the vaping pen.

The controlled device 104 includes a second electronic circuit 312 for controlling one or more functions that are ancillary to the controlled device 104. For example, if the controlled device is a vaping pen, the second circuit may control a status display or a battery life indicator of the vaping pen.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Communication module 318 for connecting the controlled device 104 to other devices (e.g., the mobile device 106) via one or more network interfaces 304 (wired or wireless) and one or more short-range communication networks, such as a BLE network;

Activation module 320 for activating and deactivating the first circuit 310 of the controlled device 104;

Association module 322 for linking the controlled device 104 to a specific mobile device 106 based on, for example, a successful pairing with the mobile device 106; and Device data 324 including:
- ItemID 326 which is a unique product identifier associated with the controlled device 104; and
- MobileID 328 which is a unique mobile device identifier associated with a particular mobile device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
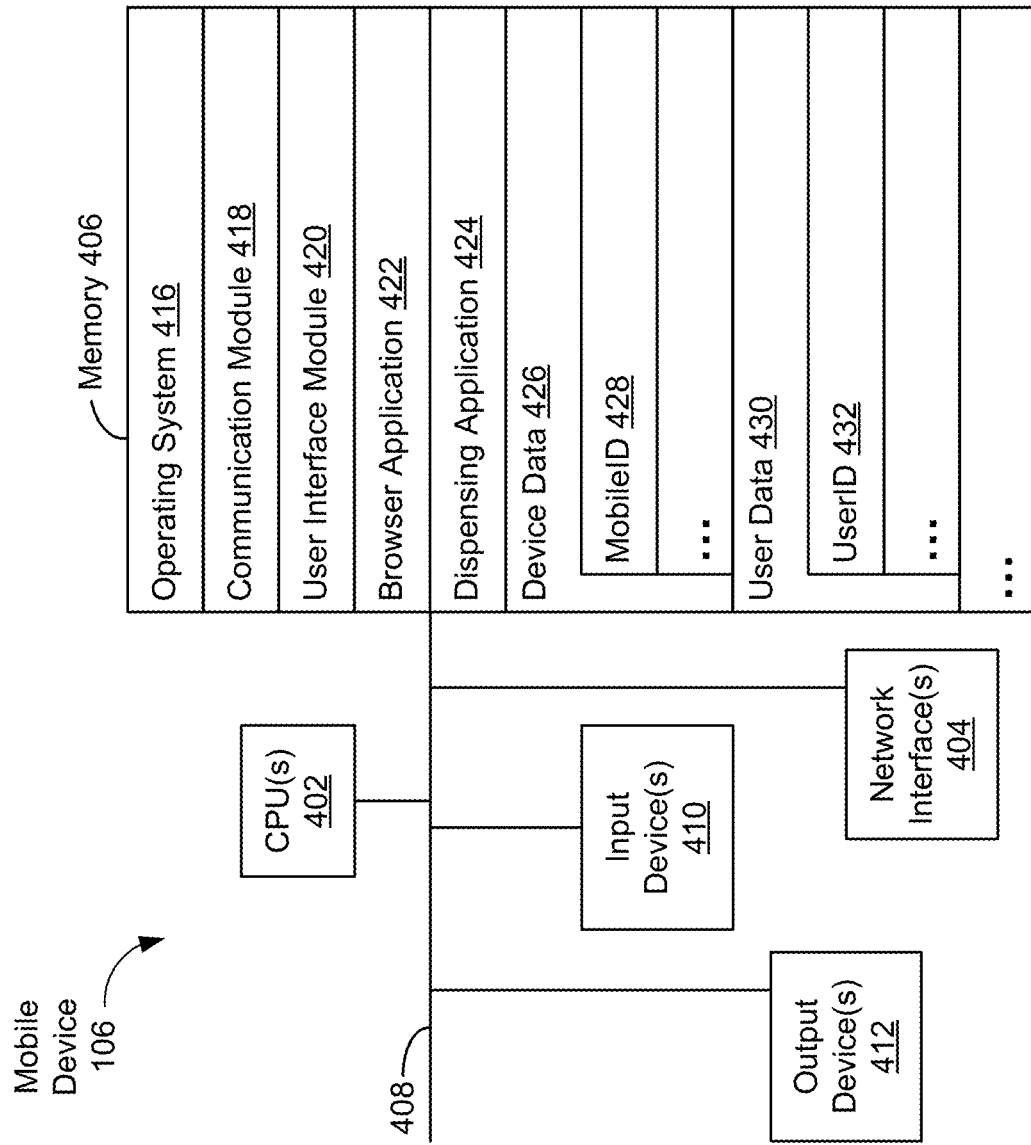
FIG. 4 is a diagram of a mobile device in accordance with some implementations.

FIG. 4 is a block diagram illustrating an example mobile device 106 of the controlled dispensing environment 100 in accordance with some implementations. The mobile device 106 includes one or more processing units (CPUs) 402, one or more network interfaces 404, memory 406, and one or more communication buses 408 for interconnecting these components.

The mobile device 106 includes one or more input devices 410 for receiving user inputs (e.g., a touch screen, a keyboard, a mouse, a microphone, and so forth), and one or more output devices 412 for displaying outputs to a user (e.g., a display screen, a speaker, and so forth).

Figure 7:
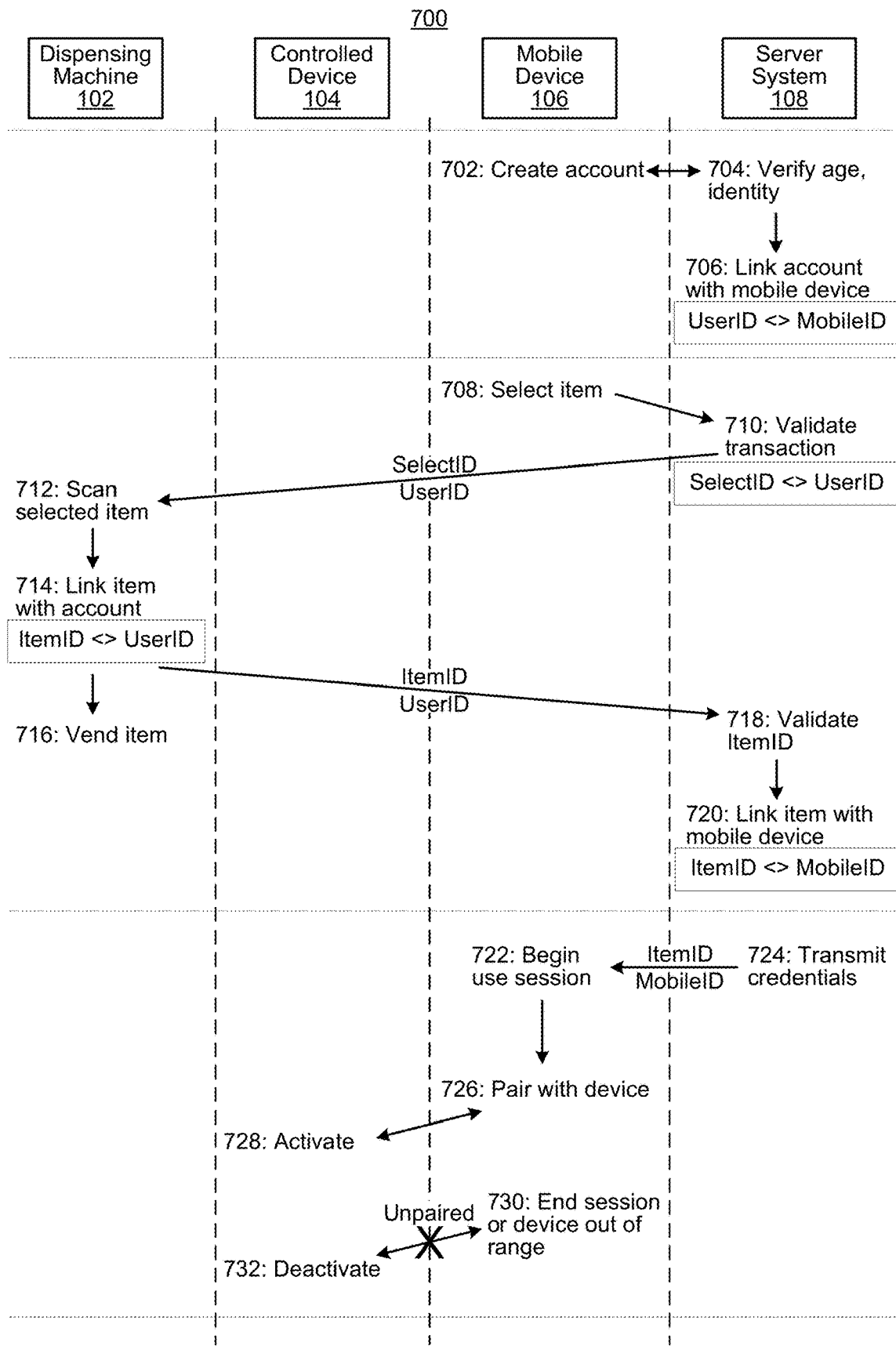
FIG. 7 is a flow diagram showing a method corresponding to the controlled dispensing environment in accordance with some implementations.
Figure 8:
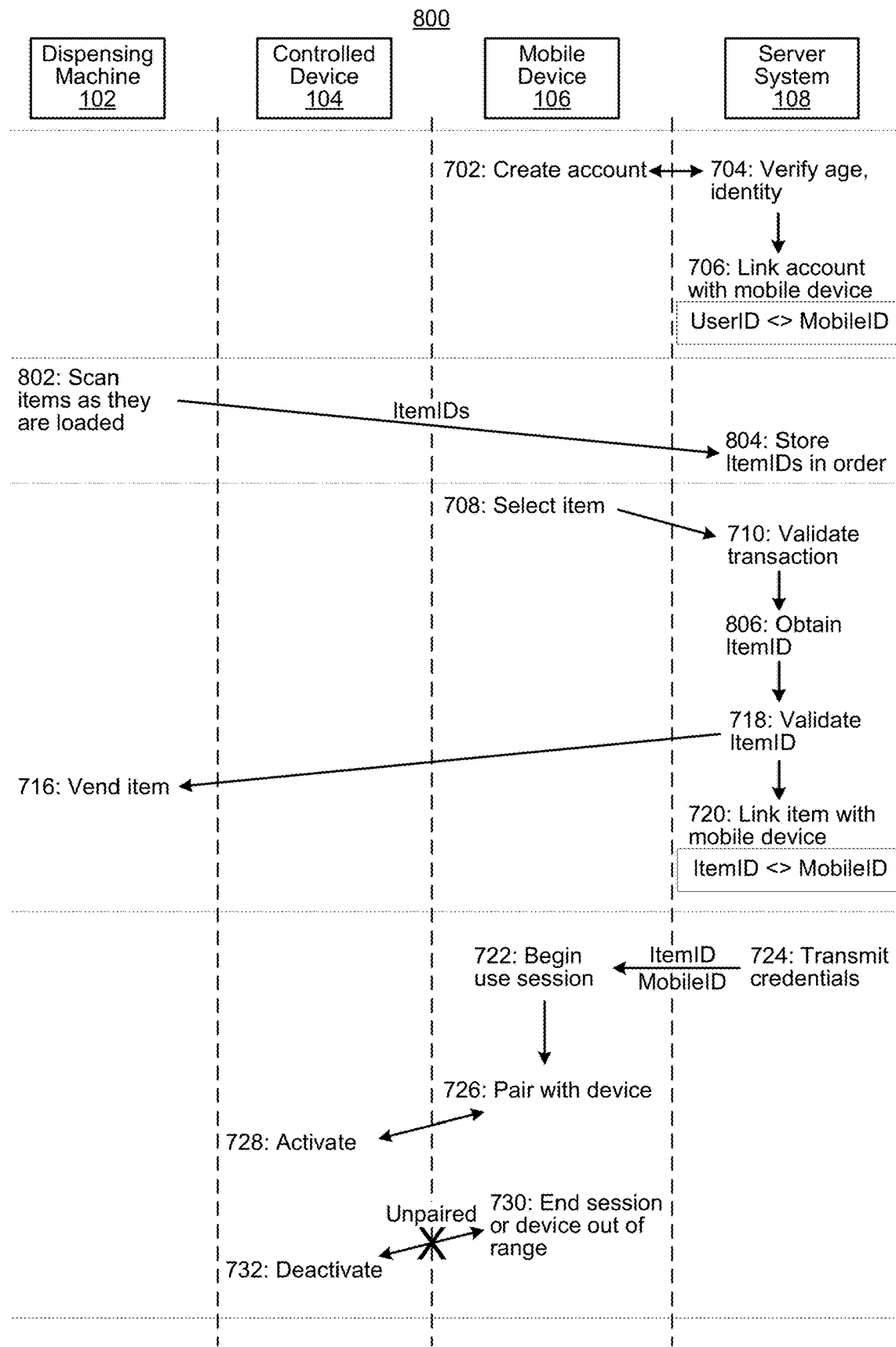
FIG. 8 is a flow diagram showing a method corresponding to the controlled dispensing environment in accordance with some implementations.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- Operating system 416 including procedures for handling various basic system services and for performing hardware dependent tasks;
- Communication module 418 for connecting the mobile device 106 to other devices (e.g., the server system 108) via one or more network interfaces 404 (wired or wireless) and one or more communication networks 110, such as the Internet, other wide area networks, local area networks, metropolitan area networks, and so on;
- User interface module 420 for receiving inputs from a user via the input device(s) 410 and displaying outputs to the user via the output device(s) 412;
- Browser application 422 for facilitating Internet browsing over the one or more communication networks 110;
- Dispensing application 424 for facilitating product purchases as described below with reference to FIGS. 7-8;
- Device data 426 including a unique mobile device identifier (MobileID 428) associated with the mobile device 106; and
- User data 430 including a unique user account identifier (UserID 432) associated with the user of the mobile device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5:
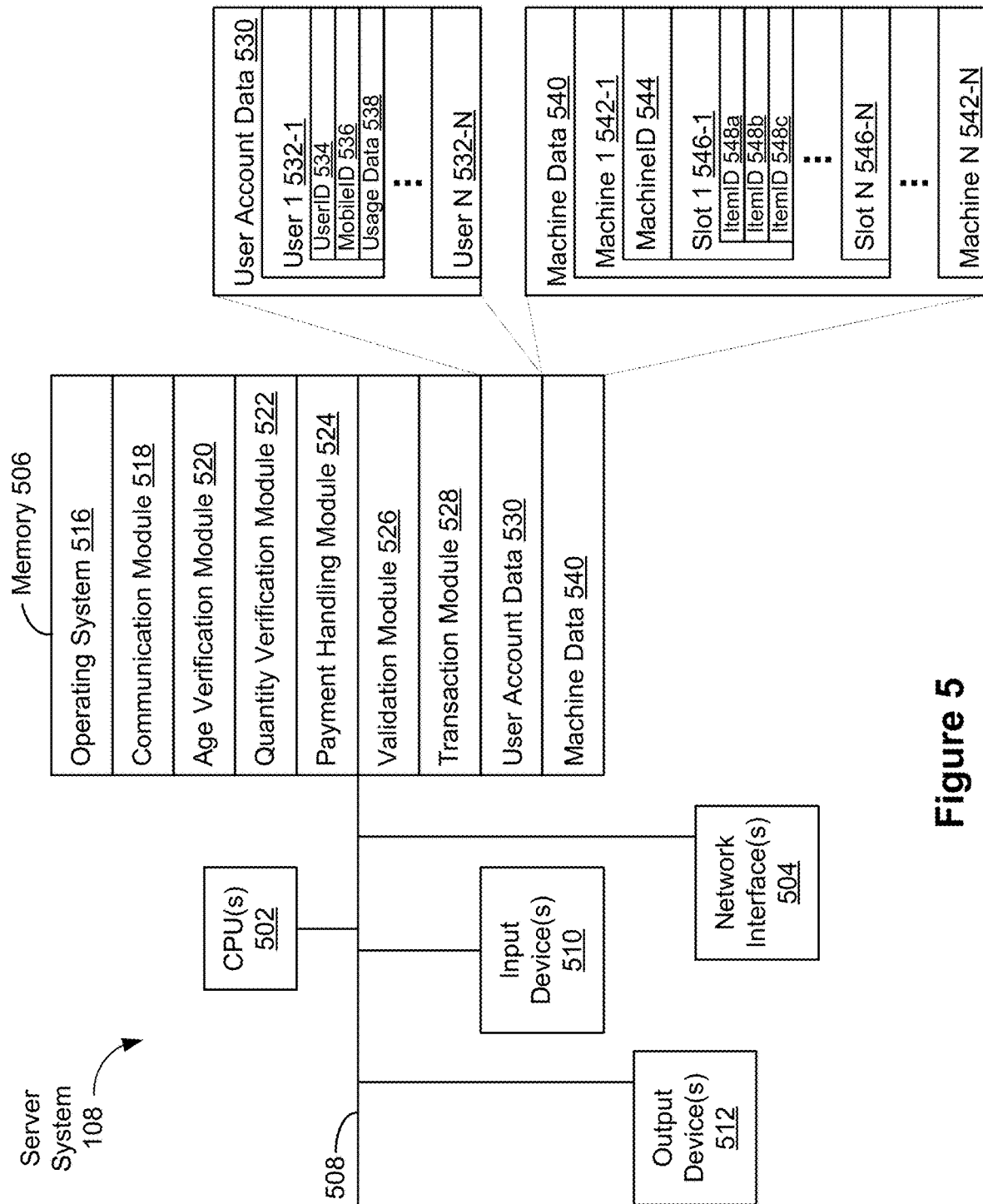
FIG. 5 is a diagram of a server system in accordance with some implementations.

FIG. 5 is a block diagram illustrating an example server system 108 of the controlled dispensing environment 100 in accordance with some implementations. The server system 108 includes one or more processing units (CPUs) 502, one or more network interfaces 504, memory 506, and one or more communication buses 508 for interconnecting these components.

The server system 108 includes one or more input devices 510 for receiving user inputs (e.g., a button, a keypad, touch screen, a keyboard, a mouse, a microphone, and so forth), and one or more output devices 512 for displaying outputs to a user (e.g., a display screen, light, LED or LCD display, a speaker, and so forth).

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

- Operating system 516 including procedures for handling various basic system services and for performing hardware dependent tasks;
- Communication module 518 for connecting the mobile device 106 to other devices (e.g., the machine 102 and the mobile device 106) via one or more network interfaces 504 (wired or wireless) and one or more communication networks 110, such as the Internet, other wide area networks, local area networks, metropolitan area networks, and so on;
- Age verification module 520 for performing one or more age and/or ID verification processes on consumers as part of the account setup process;
- Quantity verification module 522 for verifying that user accounts satisfy quantity thresholds regarding controlled device purchases and/or usage (e.g., no more than a threshold number of devices purchased within a given amount of time, or no more than a threshold number of uses of a device within a given amount of time);
- Payment handling module 524 for performing payment functions during transactions (e.g., managing account balances, charging funding accounts, and so forth);
- Validation module 526 for validating that a purchased controlled device 104 has not been linked to any other mobile devices 106 before allowing the controlled device 104 to be linked to a particular mobile device 106 as part of a purchase of the controlled device 104;

Transaction module 528 for facilitating purchases between user accounts and respective controlled devices 104 as described below with regard to FIGS. 7-8;

User account data 530 including data 532 for a plurality of users accounts, including, for each user account:
  UserID 534, a unique identifier associated with the user account;
  MobileID 536, a unique identifier associated with a mobile device 106 which is linked to the user account;
  Usage Data 538 describing usage statistics of controlled device(s) 104 linked to the user account (e.g., how much and/or how often a particular device is used in a given amount of time); and Machine data 540 including data 542 for a plurality of machines 102, including, for each machine:
  MachineID 544, a unique identifier associated with the machine; and
  Slot data 546 including scanned ItemIDs 548 associated with controlled devices 104 that have been stocked in the machine.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

The previous section described details of a controlled dispensing machine 102, a controlled device 104, a mobile device 106, and a server system 108 in accordance with some implementations. This section describes various interactions between these devices in a controlled dispensing environment 100 during a transaction. Specifically, when a consumer associated with a user account stored in the server system 108 purchases a controlled device 102 from a controlled dispensing machine 102 using a mobile device 106, these devices interact with each other to link various components of the transaction in a way that restricts the purchase and usage of the controlled device so that only the consumer associated with the user account may purchase the controlled device from the controlled dispensing machine, and only that consumer's mobile device will enable the controlled device to be used by the consumer.

FIG. 6A depicts these links in more detail, in accordance with some implementations. With reference to the first row 602, the consumer sets up an account on the server system 108 using a mobile device 106 (or any other electronic device with access to the server system 108). During the account setup process, the server system identifies the user account with a unique user identifier, referred to herein as "UserID." This process is conditioned on the consumer passing an age verification process. Also, as part of the account setup process, the consumer registers a mobile device 106. During this registration step, the server system 108 assigns a unique identifier to the mobile device 106, referred to herein as "MobileID." Thus, the server system, through the consumer's user account, verifies the consumer's age and associates the UserID with the MobileID. Throughout this application, the term "associates" is synonymous with links, relates, connects, joins, combines, and so forth. Stated another way, the UserID and the MobileID can be described as being linked together, or both linked to the same user account, or both linked to the same consumer through the user account. In some implementations, the UserID may not be linked to a MobileID (e.g., a controlled device may be linked to the user's account irrespective of any mobile devices). In some implementations, the UserID may be linked to a plurality of MobileIDs (e.g., a work phone, a personal phone, a tablet, etc.). In some implementations, a MobileID that is currently linked to a UserID may be replaced with a new MobileID (e.g., when a consumer replaces his or her phone).

With reference to the second row 604, the consumer proceeds to select a controlled device 104 (also referred to herein as an "item") in a particular machine 102. For implementations in which the machine 102 does not have any inputs or money accepting functionality, the consumer makes the selection using a dedicated application on the mobile device, or through a web browser on the mobile device which is pointed to a website associated with the consumer's user account stored on the server system 108. The server system assigns an identifier to the consumer's selection (referred to herein as SelectID). The SelectID may correspond to a particular storage position in the machine (e.g., a slot 122) that contains the desired product. Alternatively, the SelectID may correspond to a particular product and the machine 102 may interpret which particular slot in which the product is stocked. As a result of the selection, server system 108 associates the consumer's SelectID with the UserID. Stated another way, the consumer's selection is linked to the consumer's user account.

With reference to the third row 606, the server system 108 sends a dispense instruction to the machine 102. The dispense instruction initiates a dispensing process which includes an operation for the machine to identify the exact item (among the plurality of items) which is being dispensed (e.g., item 124). Upon obtaining the unique identifier corresponding to the item (referred herein as ItemID), the machine 102 associates the UserID with the ItemID and communicates this association back to the server system 108.

With reference to the fourth row 608, the server system 108 receives the communication with the association of the UserID with the ItemID. Based on the UserID, the server system accesses the consumer's user account obtains the consumer's MobileID (obtained during the account setup). The server system then associates the consumer's MobileID with the ItemID of the vended item and communicates this association to the consumer's mobile device 106. This final association enables the consumer's mobile device 106 (and no other mobile devices which are not registered to the consumer's user account) to activate the item associated with the ItemID. Thus, the controlled device may be enabled only by the mobile device of the age-verified consumer, thereby restricting not only the purchase of the controlled device, but also the usage of the controlled device.

FIG. 6B depicts the aforementioned associations in accordance with alternative implementations. With reference to the first row 612, the consumer sets up an account just as in the account setup process discussed above with reference to row 602. As such, the server system 108 associates the consumer's UserID with the consumer's MobileID.

However, with reference to the second row 614, the server system 108 may have access to the various items in a machine 102 before the consumer even makes a selection.

For instance, while a person is stocking the machine 102, the person may scan each item's ItemID and cause the ItemIDs to be uploaded to the server system 108 in the order in which they were scanned, which corresponds to the order in which they were stocked. The person stocking the machine 102 may additionally or alternatively scan just a single item in a batch of products if the server has separate access to all of the serial numbers of the batch (e.g., if the products in the batch are in sequential order or recorded together at manufacturing, each individual product may not necessarily be required to be scanned as it is stocked). Thus, the server system 108 need only consult the list of ItemIDs corresponding to a particular machine to know the unique identity of a selected item without requiring the machine 102 to first scan the item during a dispense operation. As such, before the consumer makes a product selection, the server system 108 may associate each SelectID in a particular machine (e.g., each slot 122) with the ItemID corresponding to a particular product (e.g., to each specific item 124 in each specific slot 122).

With reference to the third row 616, by the time the consumer makes a selection, the server system 108 may associate the ItemID with the UserID without first having to wait for the machine 102 to communicate the ItemID, since the ItemIDs are already stored at the server system and already associated with respective SelectIDs. As such, the server system 108 sends the dispense instruction to the machine 102, already knowing the exact ItemID of the item being dispensed.

With reference to the fourth row 618, the server system 108 associates the ItemID of the vended product to the MobileID of the consumer's mobile device 106 based on the information stored in the consumer's user account. The server system sends this association to the mobile device 106 corresponding to the MobileID, thereby enabling the consumer's mobile device 106 to activate the vended controlled device. Thus, the controlled device may be enabled only by the mobile device of the age-verified consumer, thereby restricting not only the purchase of the controlled device, but also the usage of the controlled device.

FIG. 7 is a flow diagram showing a method 700 corresponding to the controlled dispensing environment 100 in accordance with some implementations. The method 700 includes a more specific set of operations for making the various associations described in the previous section.

The method 700 is performed by a controlled dispensing machine 102, a controlled device 104, a mobile device 106, and a server system 108. Method 700 is, optionally, governed by instructions that are stored in a computer memory or non-transitory computer readable storage medium (e.g., memories 206, 306, 406, and/or 506) and that are executed by one or more processors (e.g., CPU(s) 202, 302, 402, and/or 502). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

The method 700 begins when a consumer creates (702) an account. The consumer may use a mobile device 106 to create the account, but this is not required. The consumer may use any electronic device with access to the server system 108 to create the account, as long as the consumer, at some point during the account creation, registers the mobile device 106 as being the mobile device which will eventually be required for activating any vended devices 102. During account creation, the server system 108 performs (704) an age verification process and, in some implementations, an identity verification process. These processes may be combined if the documentation required to verify the consumer's age also verifies the consumer's identity. One example of an age verification process includes the requirement for the consumer to upload an image of an identification document with a picture of the consumer (e.g., a drivers license, passport, military identification card) or upload an image or video of the face of the consumer (e.g., using facial recognition software), to the server system 108. Then, the server system 108 verifies the authenticity of the identification document or image or video (by, e.g., comparing the document or image to documents or images in a database and/or using machine intelligence to determine authenticity). The server system 108 verifies the consumer's age based on the identification document. If the consumer meets relevant age requirements, then the server system 108 allows the consumer to create an account. As part of the account creation process, the UserID identifying the consumer and the MobileID identifying the consumer's mobile device 106 are associated (i.e., linked), and this association is stored at the server system 108 with the user's account. The user's identification documents and/or information may also be verified by external databases or services to ensure the documents/information presented are valid, authentic, and/or unrevoked.

At some point in time subsequent to account creation, the consumer selects (708) a controlled device (referred to as an item) from a particular machine. As part of the selection process, the consumer, using the mobile device 106, identifies or selects a machine such as by scanning a machine identifier MachineID (e.g., label 120) which identifies the particular machine to the server system 108. The selection/identification may be made via GPS, Bluetooth, or any other communication protocol/network, by way of a user interface of the mobile device 106, or any other selection/identification method. The consumer makes a selection using the mobile device 106, the selection corresponding to a storage position (e.g., slot 122) of the desired item. The mobile device 106 transmits the MachineID and the SelectID to the server system 108. The server system validates (710) the transaction and associates the SelectID with the UserID as described above. The server system transmits the SelectID and UserID to the machine 102 identified by the MachineID. The machine 102 scans (712) the selected item to determine the item's identifier (ItemID), and links (714) the ItemID to the UserID. The machine 102 transmits the linked ItemID and UserID to the server system 108 and vends (716) the selected product (the selected controlled device 104). The server system 108 validates (718) the ItemID (e.g., verifies that the ItemID has not been previously linked to another user account or mobile device) and links (720) the ItemID to the consumer's MobileID based on the information stored in the user's account (the registered mobile device identifier).

When the consumer is ready to use (722) the controlled device 104, the server system 108 transmits (724) the ItemID to the mobile device 106 identified by the linked MobileID. In some implementations, the server system transmits the ItemID before the consumer is ready to use the controlled device 104, so that when the consumer begins a use session, the mobile device 106 already has the access to the ItemID. The mobile device 106 uses the ItemID to pair (726) with the controlled device 104. Upon a successful pairing, the control device 104 activates (728) its primary functionality (e.g., activates or enables the first circuit 310). The controlled device 104 may remain activated until it is unpaired from the mobile device 106, either as a result of the mobile device 106 ending (730) the session (if the user turns off the mobile device 106 or otherwise actively ends the use session), or as a result of the mobile device 106 being out of range of the controlled device 104. As a result of the unpairing, the primary functionality of the controlled device 104 deactivates (732) (e.g., deactivates or disables the first circuit 310).

FIG. 8 is a flow diagram showing a method 800 corresponding to the controlled dispensing environment 100 in accordance with some implementations. The method 800 includes an alternative set of operations for making the various associations described in the previous section.

The method 800 is performed by a controlled dispensing machine 102, a controlled device 104, a mobile device 106, and a server system 108. Method 700 is, optionally, governed by instructions that are stored in a computer memory or non-transitory computer readable storage medium (e.g., memories 206, 306, 406, and/or 506) and that are executed by one or more processors (e.g., CPU(s) 202, 302, 402, and/or 502). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

The method begins when a consumer creates (702) an account and the server system performs (704) verifications and links (706) the UserID with the MobileID as described in method 700. However, in method 800, the server system 108 preemptively obtains ItemIDs of the items as they are loaded into the machine. An individual, while stocking the machine, scans (802) the items are they are loaded into their respective slots, and the server system 108 stores (804) the ItemIDs in the order in which they were loaded and scanned, as described with reference to FIG. 6B above. That way, when the consumer selects (708) and item and the server system validates (710) the transaction, the server system can obtain (806) the ItemID corresponding to the consumer's selection without waiting for the dispensing machine 102 to vend the item, scan the ItemID, and upload the ItemID. The rest of the method corresponds to similarly numbered operations as described in method 700.

Alternative Implementations

Alternative approaches to the controlled dispensing methods described above include scenarios in which one or more of the operations are performed by a person. For instance, in some implementations, a consumer may convey intent to purchase a particular controlled device (e.g., 104) to a retailer (e.g., an employee using a retailer machine 112). The consumer may (i) pay the retailer over the counter or via an application (e.g., executing on the consumer's mobile device 106 or on the retailer machine 112) and/or (ii) show the retailer his or her identification over the counter or verify his or her identity and/or age via an application (e.g., executing on the consumer's mobile device 106 or on the retailer machine 112). The retailer approves the purchase and provides a transaction code (e.g., a QR code) to the consumer. The transaction code may be (i) printed from (or caused to be printed by) the retailer machine 112, or (ii) pre-printed (e.g., on a card). The consumer proceeds to the machine 102 and scans the machine identifier (e.g., label 120) (e.g., using the mobile device 106). Any combination of the machine 102 and the mobile device 106 transmits the transaction code and the machine identifier to the server system 108, which validates the transaction using any of the operations described above with reference to FIGS. 6A-8. Upon validation of the transaction, the server system 108 instructs the machine 102 (via network(s) 110) to dispense the controlled product (e.g., the product specified by the transaction code). Alternatively, the server system 108 sends a communication to the retailer machine 112 notifying the retailer that the transaction has been validated, and in response, the retailer may hand the controlled device to the consumer. In some implementations, in order to activate the controlled device, the consumer uses the transaction code that was provided by the retailer.

In another alternative approach, consumers use controlled dispensing machines 102 as pickup terminals for products purchased online. In some implementations, a consumer purchases a particular controlled device on a website or application via the mobile device 106 and network(s) 110. Payment and identification verification are handled through the website or application, as described above. Upon a successful payment and identification verification, the website or application directs the consumer to a particular machine 102 (e.g., based on distance and/or product availability), or to any machine 102 (e.g., one that the consumer may decide to use) to receive the controlled device. At the machine 102, the consumer scans the machine identifier (e.g., label 120) using the mobile device 106, and the server system 108 instructs the machine 102 to dispense the controlled device based on any of the operations described above with reference to FIGS. 6A-8. In some implementations, the dispensed device is then associated with the consumer (via the user's account) and/or the consumer's mobile device, as described above with reference to FIGS. 6A-8.

Controlled Device Packaging

In the approaches described above, a controlled device 104 may be activated upon being dispensed and being associated with a user account and/or a mobile device. In some implementations, the controlled device 104 may be activated or otherwise unlocked prior to dispensing (while it is still in the machine 102). In such implementations, an authorized consumer may use a controlled device as soon as it is dispensed.

Figure 9:
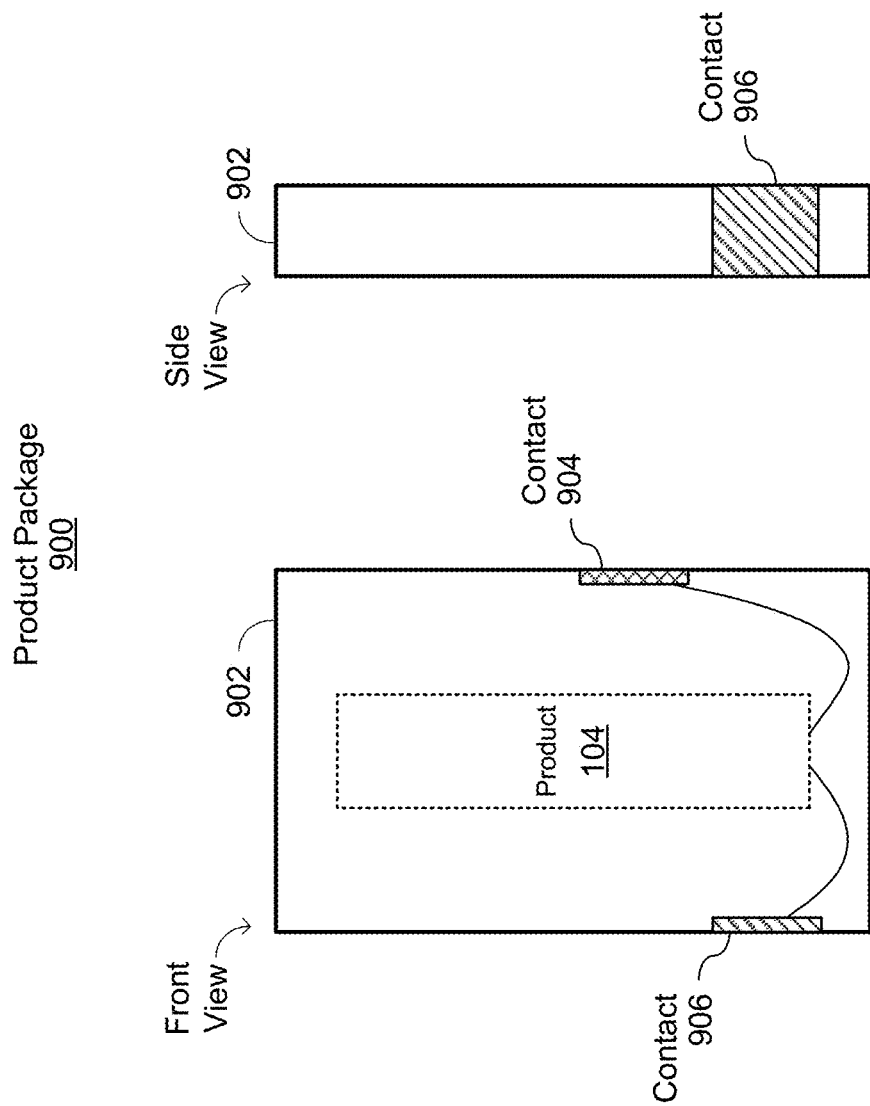
FIG. 9 is a diagram of a product package in accordance with some implementations.

FIG. 9 depicts front and side views of a product package 900 in accordance with some implementations. A controlled device (e.g., 104) is disposed inside a shell 902 of the package 900. The controlled device 104 is electrically coupled to two power contacts 904 and 906 (e.g., via respective wires). The power contacts may be vertically displaced so as to ensure proper polarity when placing the package 900 into the machine 102. For example, contact 904 may be a positive power contact and contact 906 may be a negative power contact. The power contacts comprise any electrically conductive material. When power is applied via the contacts 904 and 906, the controlled device 104 may be powered on (e.g., for the purpose of receiving activation signals). The package shell 902 optionally includes one or more communication contacts (not shown) (e.g., two contacts for serial peripheral interface communication), which are electrically coupled to communication circuitry of the controlled device 104.

Figure 10:
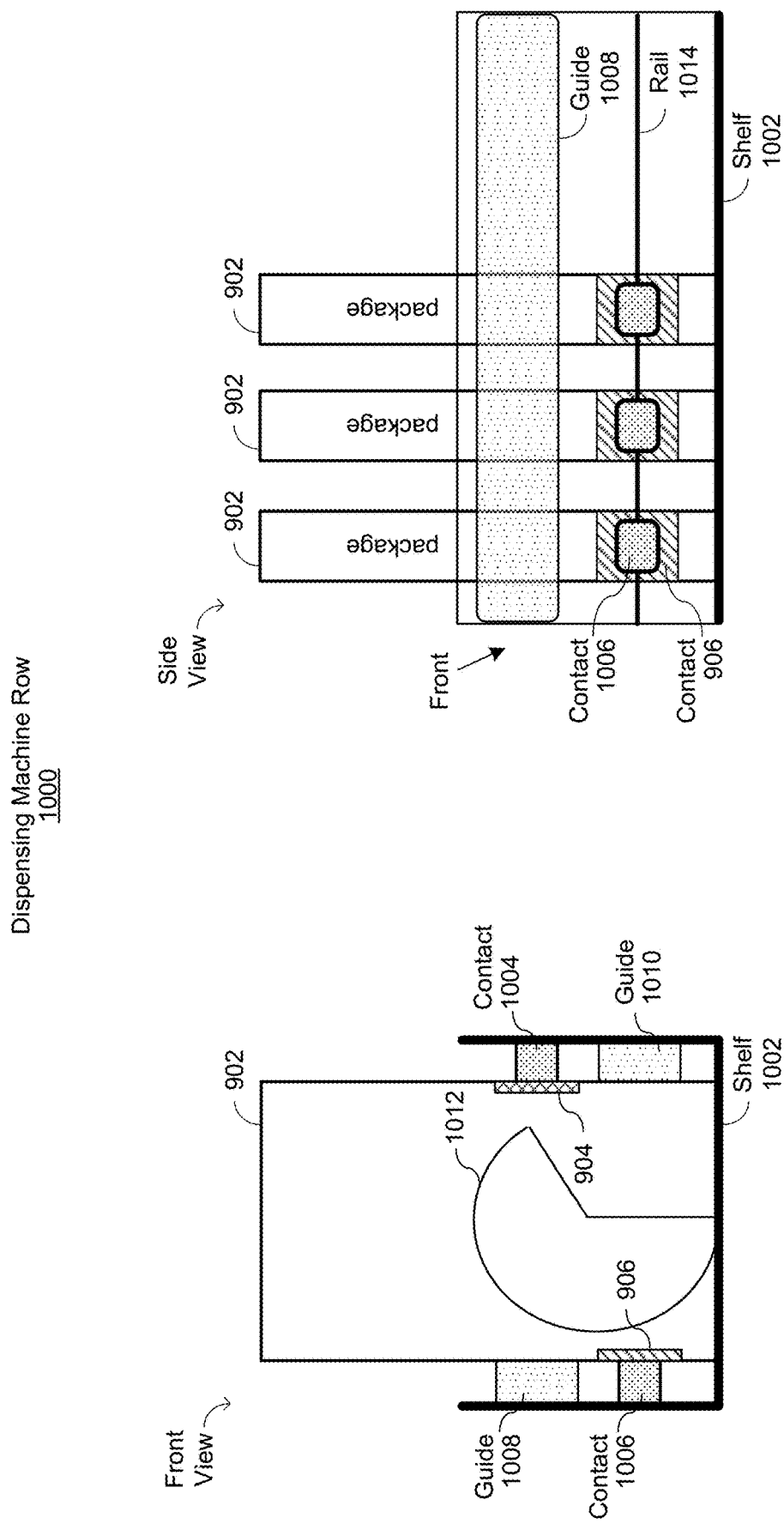
FIG. 10 is a diagram of a dispensing machine row in accordance with some implementations.

FIG. 10 depicts front and side views of a row 1000 of the machine 102 in accordance with some implementations. The row includes one or more shelves 1002, and each shelf 1002 includes one or more controlled devices in package shells 902. Each shelf 1002 is lined with power rails 1014 (one on each side of the controlled devices) electrically coupled to power contacts 1004 and 1006 (corresponding to contacts 906 and 904 of the package shell 902), and guides 1008 and 1010. The power contacts 1006 may include springs to keep tension on the packages shells 902, and the guides may be sized to keep the product shells 902 aligned on the shelf 1002. The power rails 1014 electrically couple the power contacts 1004 and 1006 to power provided by a power bus of the machine 102. In some implementations, the shelves 1002 include dispensing spirals 1012 or other types of pushing mechanisms for dispensing products. Each shelf 1002 optionally includes one or more communication rails (not shown) having contacts configured to be physically coupled to communication contacts of the package shell 902. In some implementations, only the package in the front-most slot is in contact with the communication rail(s), so that communications sent through the rail(s) are only received by the package that is about to be dispensed.

Figure 11:
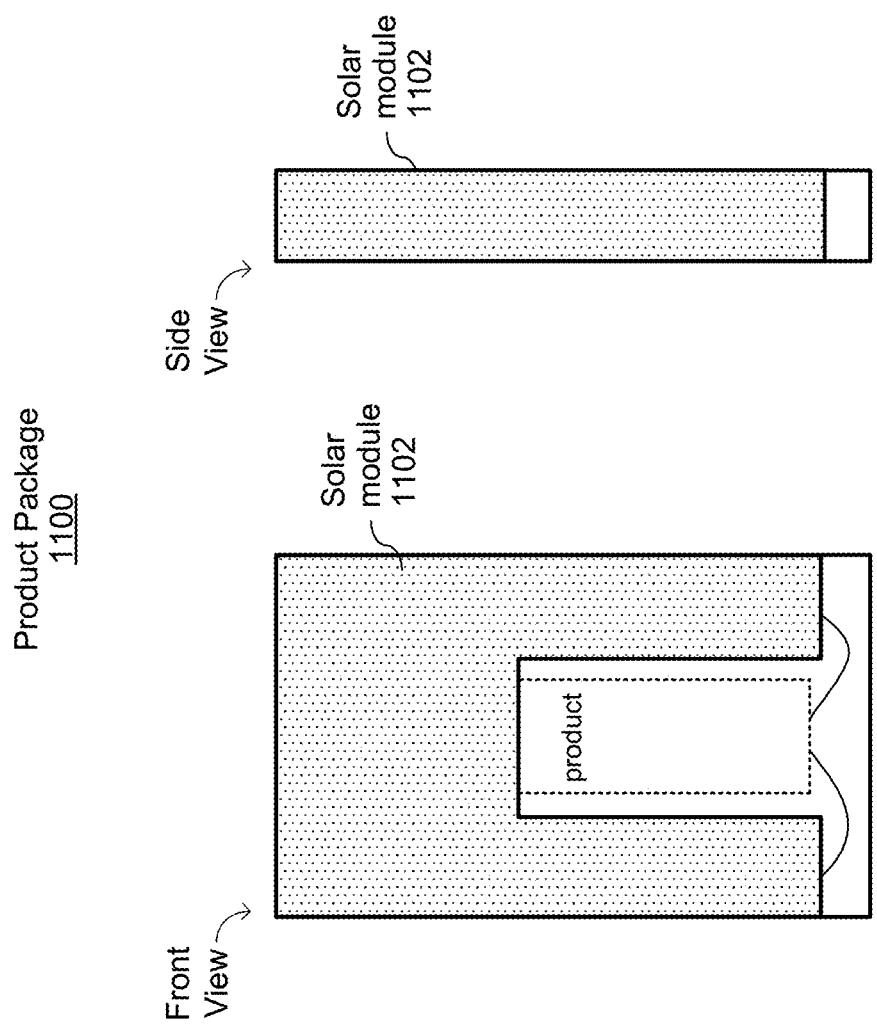
FIG. 11 is a diagram of a product package in accordance with some implementations.

FIG. 11 depicts front and side views of a product package 1100 in accordance with some implementations. The product package 1100 corresponds with the product package 900, and it includes power contacts (not shown) as described with reference to contacts 904 and 906 in FIG. 9. Instead of the contacts receiving power from power rails 1014, however, the contacts receive power from a solar module 1102 (e.g., solar cells or any other type of solar power generating material) integrated into (or in physical contact with) the packaging of the controlled device. As described above, the package shell optionally includes one or more communication contacts (not shown) (e.g., two contacts for serial peripheral interface communication), which are electrically coupled to communication circuitry of the controlled device 104. In some implementations, the solar module 1102 of the package 1100 may continue to keep the controlled device 104 charged even after it is dispensed (e.g., by a user placing the package 1100 to sunlight or other types of light).

Figure 12:
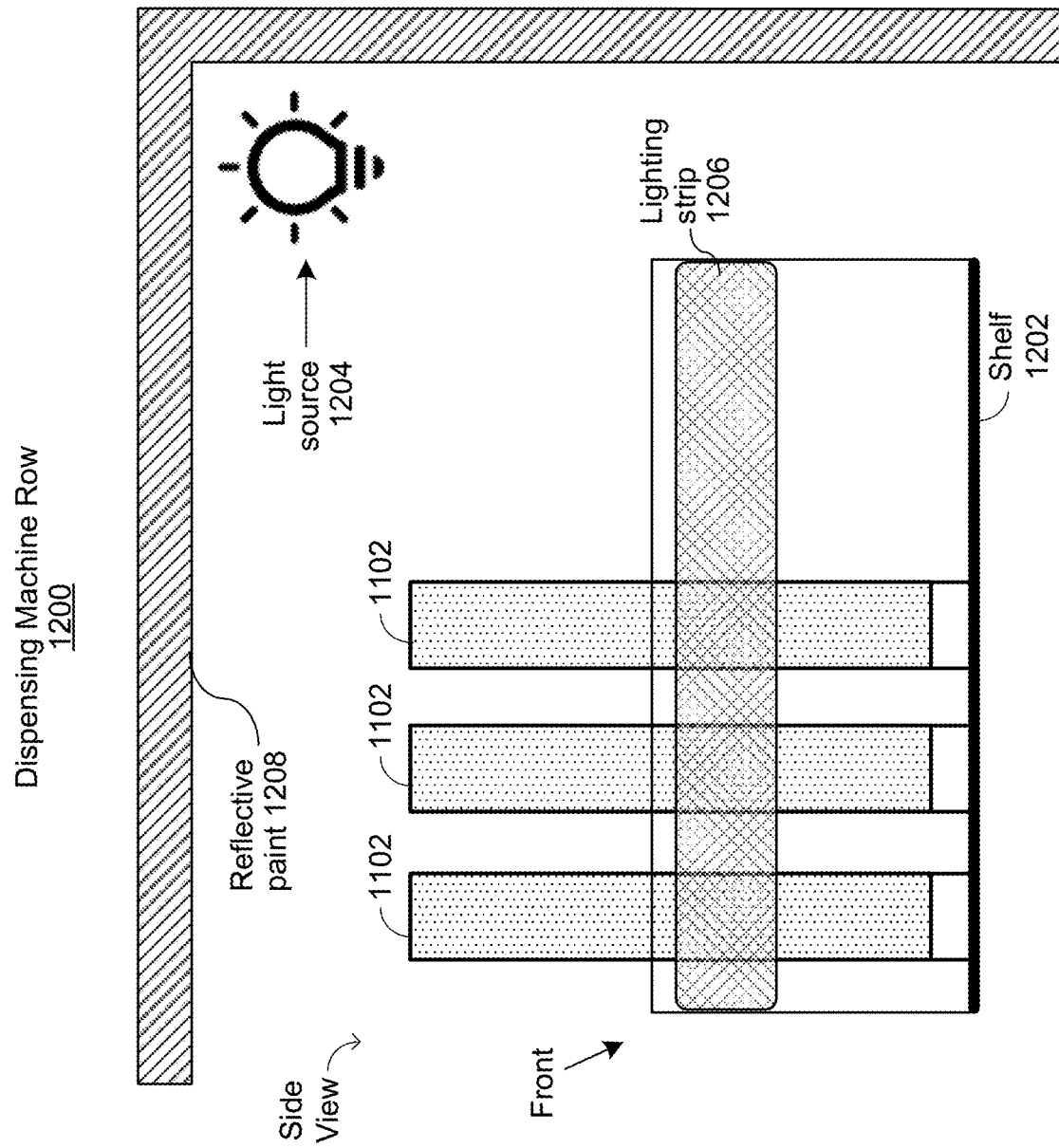
FIG. 12 is a diagram of a dispensing machine row in accordance with some implementations.

FIG. 12 depicts a front view of a row 1200 of the machine 102 in accordance with some implementations. The row includes one or more shelves 1202, and each shelf 1202 includes one or more controlled devices in package shells with solar modules 1102. The machine 102 includes an internal light source 1204, which may not only provide lighting for consumers to view the products within the machine (for machines with transparent front panels), but may also provide lighting for the solar modules 1102. In order to optimize the amount of light that reaches the solar modules 1102, each shelf 1202 optionally includes a lighting strip 1206 comprising reflective material, and portions of the interior surface of the machine are optionally covered with reflective paint 1208 or any other kind of reflective material. Each shelf 1002 optionally includes one or more communication rails (not shown) having contacts configured to be physically coupled to communication contacts of the package shell 902. In some implementations, only the package in the front-most slot is in contact with the communication rail(s), so that communications sent through the rail(s) are only received by the package that is about to be dispensed.

The controlled device packages described above provide power and, optionally, communications to respective controlled devices. In some implementations, controlled devices 104 are locked (or otherwise deactivated) when they are loaded into a machine 102. The packing for each controlled device 104 keeps the respective controlled devices in a charged state. As described above with reference to FIGS. 6A-8, a consumer purchases a particular controlled device 104. However, instead of a deactivated device being dispensed (e.g., in operation 716) and activated outside the machine 102 (e.g., in operation 728), the device may be activated before it is dispensed. The machine 102 may communicate with the device that is about to be dispensed and send an unlock code to the device's firmware. This unlocks the controlled device without requiring the controlled device to be paired to a mobile device 106. In some implementations, the controlled device 106 may be permanently unlocked. In some implementations, the communication to unlock the controlled device may be wireless (e.g., via a wireless communication module of the machine 102 using, for example, Bluetooth), or wired (e.g., via serial communication bus through communication contacts in the packaging as described above).

Controlled Dispensing

Figure 13:
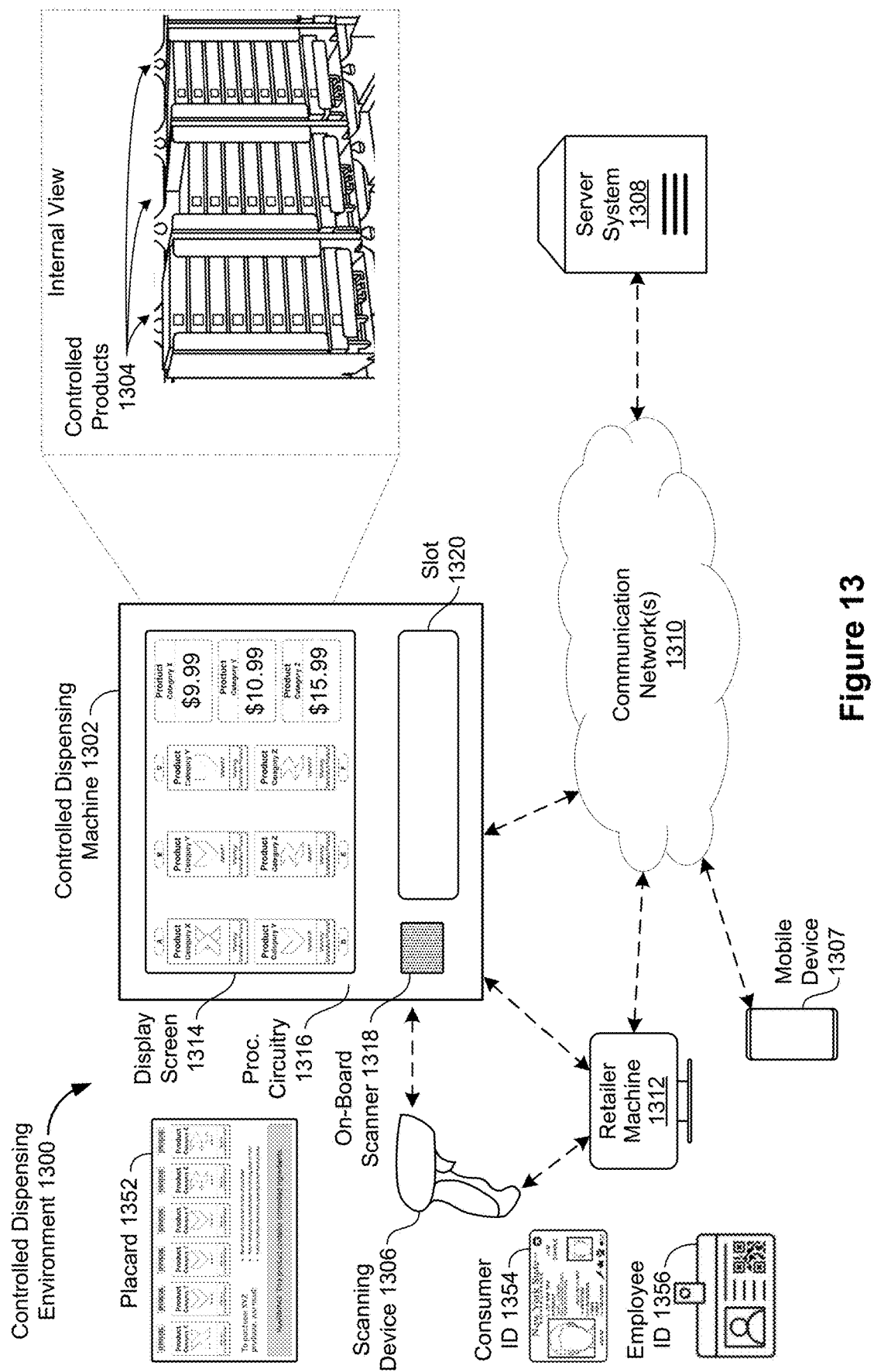
FIG. 13 is a diagram of a controlled dispensing environment in accordance with some implementations.

FIG. 13 is a diagram of a controlled dispensing environment 1300 in accordance with some implementations. In the environment 1300, a controlled dispensing machine 1302 (also referred to as a controlled dispensing fixture, smart dispensing fixture, or a smart trade fixture) dispenses controlled products 1304 in accordance with a controlled dispensing process 1400 (described with reference to FIG. 14 below) involving (i) product identification/validation, (ii) consumer authentication/validation, and/or (iii) clerk authentication. The dispensing environment 1300 and dispensing process 1400 provide safety protections for consumers as well as liability protections for retailers and manufacturers. The dispensing environment 1300 implements a digital age and/or identity verification process for the controlled dispensing of controlled products (e.g., cigarettes, tobacco products, cannabis products, cannabidiol (CBD) products, vaping products, e-liquid products, electronic cigarettes, nicotine pouches, nicotine gum, dietary supplements, alcohol, lottery tickets, firearms, security-restricted products, and/or identity-restricted products as described above). Stated another way, the dispensing environment 1300 performs age and/or identity verification for controlled products when sold and/or distributed by a person (service provider, clerk, retailer, employee, etc.) or retail establishment. As described in more detail below, the dispensing environment 1300 performs age and/or identity verification of the purchaser with scanning technology and/or an automated software system that indicates the birth date, age, and/or identity of the purchaser.

Aspects of the controlled dispensing environment 1300 may supplement one or more aspects of the controlled dispensing environment 100 described above (or vice versa). For example, upon the dispensing of a controlled product (described with reference to environment 1300), the product may be required to be activated (described with reference to environment 100). Alternatively, the controlled dispensing environment 1300 may be implemented without any of the aspects described with reference to the controlled dispensing environment 100 (or vice versa). For example, upon the dispensing of a controlled product (described with reference to environment 1300), the product may be ready for use without being required to be activated as described above.

The controlled dispensing environment 1300 may include a retailer machine 1312, such as a point-of-sale device or any other kind of computing device operated by a service provider (clerk). The retail machine 1312 may support dispensing aspects of transactions regarding the controlled products 1304 (e.g., controlling the dispensing machine 1302) and/or non-dispensing aspects of transactions regarding the controlled products 1304 (e.g., payment processing). In some implementations, the retailer machine 1312 only handles payments aspects of a transaction, and is completely independent of controlled dispensing aspects of the transaction. Stated another way, the dispensing of a controlled product using the dispensing machine 1302 may be implemented completely independent of payment-handling components.

The dispensing machine 1302 may be controlled via a user interface on a display screen 1314 (described with reference to FIGS. 16-19 below), an optional scanning device 1306 (while the scanning device adds efficiency to the controlled dispensing process, manual data input via the user interface or input via any other peripheral such as a keyboard/mouse may serve as a substitute), and processing circuitry 1316 including or in communication with memory storing programs that, when executed by elements of the processing circuitry, perform one or more of the functions described below with reference to FIGS. 14-23. The display screen 1314, scanning device 1306, and processing circuitry 1316 may be distributed among any combination of the dispensing machine 1302 and a retailer machine 1312 as described below.

The dispensing machine 1302 may include an on-board (integrated) scanner 1318 in addition to, or as an alternative to, one or more of the remote scanning devices 1306. The scanning device 1306 and/or the on-board scanner 1318 are configured to scan barcodes, QR codes, and/or any other type of scannable code, image, or string of characters (e.g., on a consumer ID 1354 such as a drivers license or a passport, and/or an employee ID 1356). In an example implementation, a clerk may use the scanning device 1306 to scan a barcode of a product selected by a consumer (e.g., using placard 1352) and the consumer's ID 1354, and use the on-board scanner 1318 to scan the clerk's ID 1356 in order to facilitate the dispensing of the selected product. Other combinations for using the scanning device 1306 and/or the on-board scanner 1318 may be implemented (e.g., scanner 1306 scans all IDs and product barcode, scanner 1318 scans all IDs and product barcode, or scanners 1306/1318 scan different subsets of the IDs and product barcodes).

The dispensing machine 1302 includes a slot 1320, which houses an area within the dispensing machine 1302 from which a controlled product 1304 may be retrieved after having been dispensed. The internal dispensing mechanics of the dispensing machine 1302 may include one or more mechanical features (e.g., slots, rows, rails, contacts, packaging, shelves, guides, solar modules, lighting strips, reflective paint, and/or light sources) described herein with reference to FIGS. 1, 9-12, and/or 21A-21D. The dispensing machine 1302 may include one or more features described above with reference to the controlled dispensing machine 102 (FIGS. 1-2), and the controlled products 1304 may include one or more features described above with reference to the controlled device 104 (FIG. 3). The controlled dispensing environment 1300 may include one or more of the features described above with reference to the controlled dispensing environment 100 (FIGS. 1-8).

The dispensing machine 1302 includes one or more dispensing mechanisms for releasing the controlled products stored therein. Examples include rotating elements (e.g., dispensing spirals 1012, FIG. 10) or pushing elements (e.g., dispensing mechanism 2106, FIG. 21B) that release the next controlled product in a slot, or any other type of mechanical component (e.g., a release lever or arm) that physically manipulates the controlled product by causing it to be relocated to an area of the dispensing machine 1302 (e.g., slot 1320) in which a consumer or retail employee can access the released product. In some implementations, the dispensing mechanism(s) move the product to an intermediate area (e.g., for scanning or otherwise obtaining information about the product, such as a product identifier as described above with reference to FIGS. 9-12) before moving the product to the release area.

In some implementations, the display screen 1314, scanning device 1306, and processing circuitry 1316 are integrated into or communicatively coupled to the dispensing machine 1302. For these implementations, a retailer machine 1312 may not be required to perform dispensing aspects of transactions regarding the controlled products 1304. Scanning hardware for executing the scanning features described herein may be implemented in the structure of the dispensing machine 1302 (e.g., on-board scanner 1318), implemented as a separate component (e.g., scanning device 1306, such as a handheld remote barcode scanner), or implemented as a combination of the two (e.g., on-board scanner 1318 and scanning device 1306). The scanning device 1306 may be a handheld scanner communicatively coupled (paired) to the dispensing machine 1302 using a wired or wireless communication link (e.g., USB, wireless dongle, Ethernet, Wi-Fi-, Bluetooth, etc.). The scanning device 1306 and/or the on-board scanner 1318 may be configured to scan/read barcodes, QR codes, and/or any other type of scannable code (e.g., on a consumer ID 1354 such as a drivers license or passport, and/or an employee ID 1356). Use of a handheld remote barcode scanner (scanning device 1306) allows the clerk to scan the consumer's ID without having to walk away or turn around with the consumer's ID in the clerk's hand. As a result, the consumer may be able to keep track of his or her ID the entire time it is out of his or her hands since the clerk may quickly scan the ID and return it to the consumer before continuing with dispensing operations (e.g., selecting/retrieving the dispensed product).

In some implementations, the display screen 1314 is included in the retailer machine 1312, and the scanning device 1306 and processing circuitry 1316 are integrated into (or are otherwise in communication with) the dispensing machine 1302. For these implementations, the retailer machine 1312 provides means to interact (e.g., the display screen and associated UI) with the processing circuitry 1316 in the dispensing machine 1302.

In some implementations, the display screen 1314, the scanning device 1306, and the processing circuitry 1316 are integrated into (or are otherwise in communication with) the retailer machine 1312. For these implementations, the retailer machine 1312 provides means to interact (e.g., the display screen and associated UI) with the processing circuitry 1316, and serves as the controller for the dispensing machine 1302 (e.g., by providing dispensing instructions to the dispensing machine 1302). For these implementations, the dispensing machine 1302 may be under a counter or consumer facing, and the only interaction with the dispensing machine 1302 during a dispensing operation would be the consumer retrieving a dispensed product via the slot 1320. Alternatively, for such consumer facing implementations, the consumer may also scan a consumer ID 1354 using the on-board scanner 1318 in addition to retrieving the dispensed product via the slot 1320. Alternatively, in these and other implementations, the clerk may retrieve the dispensed product from the slot 1320, allowing for scenarios in which the consumer has no interactions with the dispensing machine 1302.

For implementations in which the retailer machine 1312 is involved in dispensing aspects of transactions regarding the controlled products 1304 (e.g., at least a portion of the processing circuitry 1316 is integrated in the retailer machine 1312), the retailer machine 1312 may communicate with the dispensing machine 1302 using a secured connection, either wired or wireless. In some implementations, the secured connection is encrypted, so as to provide additional security to prevent unauthorized dispensing of the controlled products 1304. In some implementations, the retailer machine 1312 is a handheld computing device configured to wirelessly communicate with the dispensing machine 1302.

In some implementations, the processing circuitry 1316 (integrated into the dispensing machine 1302 and/or the retailer machine 1312) communicates with a server system 1308 via one or more local and/or wide area communication networks 1310 (e.g., Wi-Fi, the Internet, etc.). The server system 1308 may be located in the same location as the dispensing machine 1302 (e.g., in the same store), or may be located in a remote location (e.g., at a server farm operated by or otherwise having operations associated with a manufacturer of the controlled products 1304).

The controlled products 1304 may be age-restricted, as described throughout this disclosure (e.g., cigarettes, vaping products, alcohol, cannabis, etc.). The controlled products 1304 may not be age-restricted, but instead may be identity-controlled, such as products that may be purchased by consumers of any age but require the consumer to show identification upon purchase of the product (e.g., spray paint, calling cards, pharmaceutical products, etc.). The controlled products 1304 may be both age-restricted and identity-controlled. The products may be quantity restricted (for example any individual can purchase only a certain number of items in a period of time). The controlled products 1304 may include any controlled device (e.g., the controlled devices described throughout this disclosure) and/or accessories, cartridges, refills, pods, or any other products designed for use with such devices.

The controlled dispensing environment 1300 may optionally include a placard 1352 depicting available controlled products 1304 for sale. Each controlled product 1304 on the placard 1352 may be associated with a scannable barcode, QR code, or any other type of marking that, when scanned, identifies the product. The placard 1352 may implemented as a mat placed on a counter in proximity to the clerk and the consumer, a sign placed on a surface in view of the clerk and the consumer, or any other type of medium (e.g., an electronic display) capable of depicting products for selection by a consumer and for scanning by a clerk. Example implementations of the placard 1352 are described below with reference to FIGS. 16A and 16B.

The controlled dispensing environment 1300 may optionally be in communication with a mobile device 1307. The mobile device 1307 is a personal electronic device associated with the consumer (e.g., the consumer's smartphone). Mobile devices 1307 include, but are not limited to, smart phones, tablet or laptop computers, or personal digital assistants (PDAs), smart cards, or voice assistant devices (such as Alexa), or other technology (e.g., a hardware-software combination) known or yet to be discovered that has structure and/or capabilities similar to the mobile devices described herein. The mobile device 1307 includes a long-range communication capability (e.g., modem, transceiver, and so forth) for communicating through the network(s) 1310, and a short-range communication capability (e.g., BLE) for optionally communicating with controlled products 1304 and/or other devices in range of a short-range radio (e.g., Bluetooth radio) of the mobile device 1307. The communications technologies described herein may be replaced with alternative communications technologies and, therefore, specific communications technologies are not meant to be limiting. For example, Wi-Fi technology could be replaced with another long-range communications technology.

The server system 1308 communicates with the controlled dispensing machine 1302, the mobile device 13107, and/or the retailer machine 1312 through the communication network(s) 1310. The server system 1308 stores user accounts associated with consumers of the controlled products 1304. The server system 1308 includes one or more host processing servers that may be operated by a company associated with the seller of controlled products 1304. For each consumer, the server system 1308 may maintain a virtual wallet having a balance (which can be $0) of designated funds for which the server system 1308 keeps an accounting. The balance may represent, for example, cash or it may be a promotional value that represents funds that may be spent under certain circumstances. If these funds begin to be depleted, the consumer may be notified (e.g., via an application on the mobile device 1307 or via an electronic communication) that additional funds need to be designated and/or transferred. Alternatively, funds from other sources (e.g., a funding source server) may be automatically transferred to restore a predetermined balance.

The communication network(s) 1310 include wired and/or wireless communication networks that facilitate connections that are ongoing (e.g., a dedicated connection, a dedicated online connection, and/or a hardwired connection) or accessible on demand (e.g., the ability for the machine 1302 to make a temporary connection to the server system 1308 or the ability for a consumer to contact the server system 1308 from a mobile device 1307). Typically the network connection is conducted over long-range communication technology or long-range communication protocol (e.g., hardwired, telephone network technology, cellular technology (e.g., GSM, CDMA, or the like), Wi-Fi technology, wide area network (WAN), local area network (LAN), or any wired or wireless communication technology over the Internet that is known or yet to be discovered.

The retailer machine 1312 is any computing device located in the vicinity of the point of sale of a controlled product 1304 (e.g., a terminal computing device at a checkout counter in a store). The retailer machine 1312 communicates with the server system 1308 through the communication network(s) 1310 using a long-range communication technology as described above.

Figure 14:
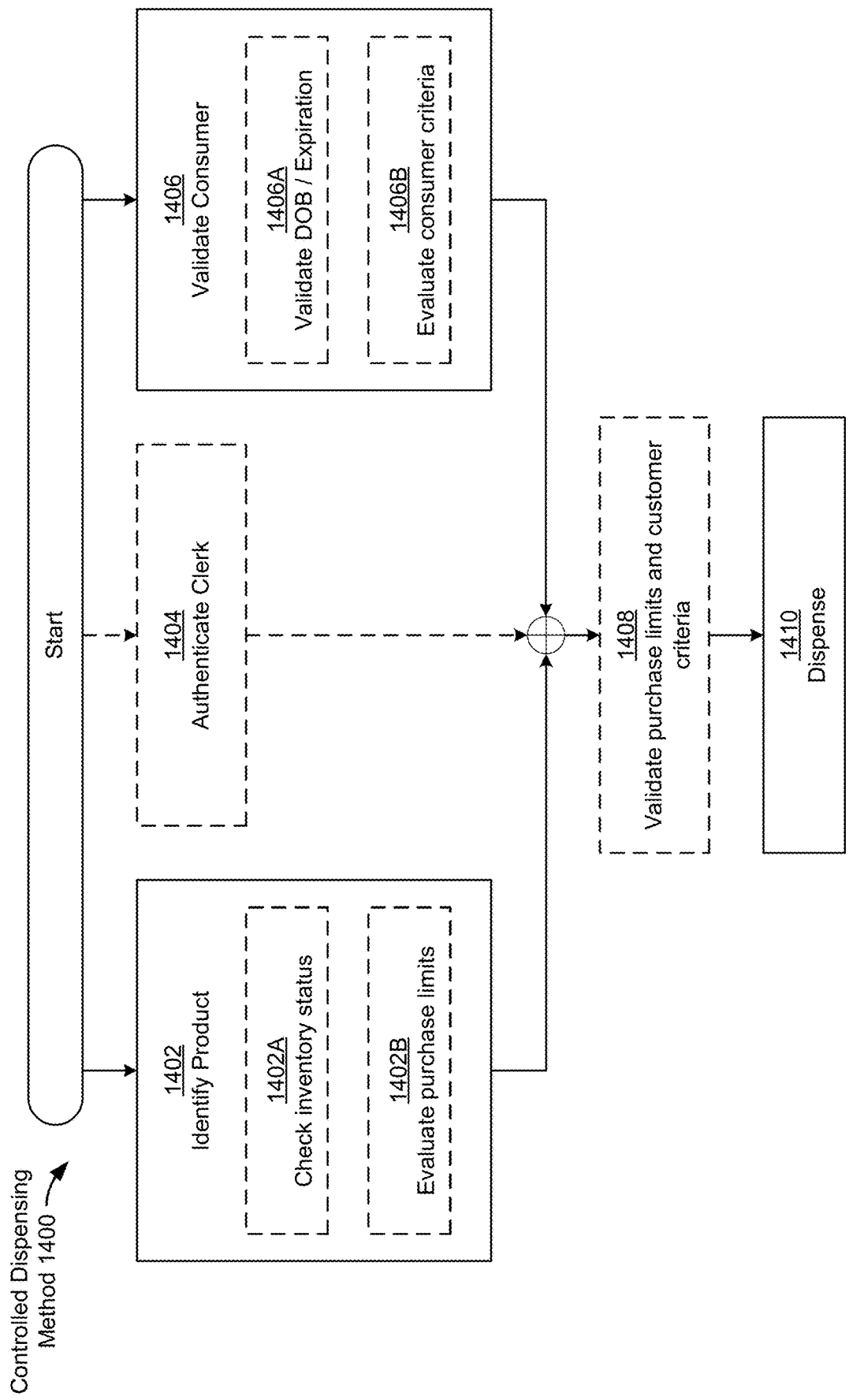
FIG. 14 is a flow diagram of a controlled dispensing method in accordance with some implementations.

FIG. 14 is a flow diagram of a controlled dispensing method 1400 in accordance with some implementations. The method 1400 may be governed by instructions that are stored in a computer memory or non-transitory computer readable storage medium and that are executed by one or more processors (e.g., processing circuitry 1316). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 1400 may be combined and/or the order of some operations may be changed. Optional operations are conveyed with dashed lines.

Some operations of method 1400 (e.g., 1402B, 1406B, and/or 1408) may be governed by instructions that are stored in a memory or non-transitory computer readable storage medium of server system 1308 and that are executed by one or more processors of server system 1308. The computer readable storage medium of server system 1308 may include a magnetic or optical disk storage device, solid state storage devices such as Flash memory, or other non-volatile memory device or devices. The instructions stored on the computer readable storage medium of server system 1308 may include one or more of: source code, assembly language code, object code, or other instruction format that is interpreted by one or more processors.

The method 1400 may begin as a result of a consumer (also referred to as a user or a dispensing requester) communicating his or her intention to purchase a controlled product 1304. The consumer may have identified the controlled product 1304 using a placeholder (e.g., empty packaging, paper, or cardboard) in the store identifying the product that the consumer has selected. The consumer may have built a shopping card on a mobile application or website, and such application or website may provide an identifier (e.g., a barcode) associated with the shopping cart or product selections. The consumer may point to a particular controlled product 1304 on the display of the dispensing machine 1302 or the retailer machine 1312. The consumer may point to a particular controlled product 1304 on signage or a countertop mat (e.g., placard 1352) that has the product name or image. The consumer may verbally convey to a clerk a particular controlled product 1304 that is desired for purchase. Regardless of the product identification method, as a result of a particular controlled product 1304 being identified by the consumer (labeled in the figure as "Start"), the dispensing method 1400 may be executed. The inputs required by the dispensing method 1400 (described below with reference to operations 1402, 1404, and 1406) may be provided by a clerk, a consumer, or any combination thereof.

In order to dispense the desired controlled product 1304 the processing circuitry 1316 of the dispensing machine 1302 or the retailer machine 1312 requires at least one of the operations 1402, 1404, and 1406 to be performed. Depending on the implementation, at least two of the operations 1402, 1404, and 1406 must be performed, or all three of the operations 1402, 1404, and 1406 must be performed in order to dispense the desired controlled product 1304. The operations may be executed in any order. For example, operation 1402 may be executed, optionally followed by operations 1404 and/or 1406 (or 1406 and/or 1404). Alternatively, operation 1404 may be executed, optionally followed by operations 1402 and/or 1406 (or 1406 and/or 1402). Alternatively, operation 1406 may be executed, optionally followed by operations 1402 and/or 1404 (or 1404 and/or 1402). The subset of operations 1402, 1404, and 1406 that are required to perform the dispensing operation 1410 may be customizable (e.g., by a store operator, by a manufacturer, etc.) based on a desired level of safety and/or liability protection.

In operation 1402, the processing circuitry 1316 identifies a controlled product 1304. The product may be identified based on any of the consumer or clerk actions described above with regard to providing a product identification. For example, a product identifier such as a barcode or image representing the product may be selected (on the user interface of the display screen 1314) or scanned using the scanning device 1306 and/or on-board scanner 1318 (e.g., by scanning a barcode on a placard 1352, or by scanning a code on a mobile device of the consumer).

In some implementations, upon receipt of the product identifier, the processing circuitry 1316 checks (1402A) inventory status of the identified product, and/or evaluates (1402B) bulk sale limits of the identified product. Bulk sale limits (also referred to as purchase limits, dispensing limits, limit thresholds, or dispensing limit thresholds) may restrict the number of products that may be purchased and/or dispensed (i) in a single transaction by a consumer, and/or (ii) by a single consumer within a predetermined amount of time (e.g., due to restricted use regulations associated with the controlled product). Stated another way, limit thresholds may correspond to a maximum number of products that may be dispensed to a given consumer over a predetermined time period. Such limits may be applied on a per product basis (e.g., only four of a particular product may be purchased per transaction or per day), a per product category basis (e.g., only one product of a first type and four products of a second type may be purchased per transaction or per day), a per total item basis (e.g., only eight total items may be purchased per transaction or per day), and so forth. Such limits may be applied based on an amount of time between purchases for a particular consumer (e.g., a consumer may only purchase four items per day, per week, per month, and so forth). Any of the stated limits may be specific to a particular dispensing machine, or can be applied across a group of machines, or across an entire network of machines. Limits may be specific to geographic region.

In accordance with bulk/purchase limit processing, the processing circuitry 1316 may track a consumer's transactions (and by extension, how many and which products have been purchased) by tracking the consumer's identification (obtained in operation 1406 below). The consumer's transactions may be tracked locally (e.g., at the processing circuitry 1316 of a particular dispensing machine 1302 or retailer machine 1312), or across a network (e.g., by a tracking process implemented at the server system 1308 in communication with processing circuitry 1316 of a plurality of dispensing machines 1302 and/or retailer machines 1312). In accordance with bulk/purchase limit processing, the processing circuitry 1316 may adjust purchase limits for a particular consumer based on a risk score for the consumer. The processing circuitry 1316 may evaluate the consumer's risk score in operation 1406 below. The higher the risk score, the lower the bulk limits for a particular transaction may be adjusted. Likewise, the lower the risk score, the higher the bulk limits for a particular transaction may be adjusted. In cases where a machine is offline (not connected to a communication network) and network-wide product limits are established, a separate off-line limit may be applied. For example, if a consumer is permitted to purchase 8 products per month across a group of machines, and the consumer wishes to make a purchase on a machine that is currently off-line (meaning the network limits are not able to be checked), an alternate local limit of 2 products may be approved. When the offline machine regains connectivity, the purchased products may be applied to the consumer's network-wide limits. The offline limit may vary depending on the consumer's risk score, if available locally at the offline machine.

In operation 1404, the processing circuitry 1316 identifies and authenticates the clerk. This operation is optional, and may not be required for every transaction. The processing circuitry 1316 may authenticate the clerk by scanning a badge or access card 1356 of the clerk using the scanning device 1306 and/or on-board scanner 1318. Upon such a scan, the clerk may be logged in to the dispensing machine 1302 and/or the retailer machine 1312, and as a result, dispensing operations associated with the authorized clerk may be unlocked (authorized) for the dispensing machine 1302 and/or the retailer machine 1312. Operation 1404 may be performed before operation 1402. In some implementations, upon execution of operation 1404, the clerk may be authenticated for a predetermined amount of time (e.g., a four-hour shift), during which the clerk remains authenticated for subsequent transactions and dispensing operations. Alternatively, operation 1404 may be required to be executed for each subsequent dispensing operation, in order to provide more detailed records regarding the approval process for each dispensing operation of a controlled product 1304. In some implementations, the processing circuitry 1316 may associate the clerk (upon scanning or logging in as described above) to the dispensing operations handled by the clerk. Such associations may be used to track sales by a particular clerk for incentive payouts, for security limits, and to prevent a clerk from using his or her own ID in place of a consumer's ID. For example, if the clerk's ID is associated to a particular user account, the system can prevent the consumer ID for that user account from being used for a transaction (when the consumer ID is the same as the clerk's ID, or possibly the ID of another clerk who is employed at the same location).

In operation 1406, the processing circuitry 1316 identifies the consumer and/or validates the consumer's eligibility to obtain the identified product 1304. This may include validating (1406A) the consumer's age or other information on the consumer's ID card 1354 (e.g., name, date of birth, expiration date, and/or license/identification number on the consumer's drivers license, passport, military identification card, or any other type of identification document). The consumer identification information may be obtained by a scanning device 1306/1318 or manually entered using the user interface on the display screen 1314. Facial recognition software in the scanning device 1306/1318 or retailer machine 1312 may be used to identify/authenticate the consumer. Optionally, the consumer identification information may be obtained by an optional external camera mounted on or in communication with the machine 1302 or the retailer machine 1312 (not shown), configured to obtain an image of the consumer and identify the consumer based on the image. The consumer identification information may be obtained by scanning (with scanning device 1306/1318) an identification code (e.g., QR code) on a mobile device of the consumer, the mobile device executing an application that, upon optional biometric verification of the consumer's identity, displays the identification code on a display of the mobile device for scanning by the clerk. In some implementations, the processing circuitry 1316 may validate or verify the authenticity of the identification document or image by comparing the document or image to documents or images in a database (consulting the database) and/or using machine intelligence to determine authenticity. The database and/or machine intelligence application may be implemented at or otherwise accessible by the server system 1308. For example, an authentication database for identification cards (e.g., drivers licenses or passports) may be accessed by the dispensing machine 1302 or the server system 1308 using an application programming interface (API). The server system 1308 verifies the consumer's age based on the identification document.

In some implementations, the processing circuitry 1316 may hash the consumer identification information or extract a consumer identifier from the identification information. By locally hashing the consumer identification information (e.g., by applying a hashing algorithm to an identification number on the consumer ID 1354) before sending the hashed data to the server system 1308 for further identification and/or purchase limit processing, the server system 1308 does not obtain personal identifiable information (PII) associated with the consumer. Specifically, rather than obtaining the consumer's name or date of birth (or other PII), the server may only obtain a hashed identification number, and use that hashed identification number to keep track of consumer purchases (e.g., as described below with reference to operations 1402B, 1406B, and/or 1408). Stated another way, the ConsumerID transmitted in operation 1502 may be the hashed identification number. As such, the consumer's privacy is honored while still providing a way for the server system 1308 to track the consumer's purchasing history for the purpose of evaluating purchase limits and consumer criteria (e.g., as described with reference to operation 1504 below).

As part of operation 1406, the clerk has an opportunity to physically verify that an image on the consumer's identification card matches the consumer's appearance. Accordingly, the clerk authentication operation (1404) may serve as a digital signature or an electronic record of the clerk having verified the consumer's identification and/or age for a particular transaction and dispensing operation.

In some implementations, upon identifying the consumer and/or verifying the consumer's age, the processing circuitry 1316 may evaluate, determine, or otherwise obtain certain criteria (1406B) of the consumer. The consumer criteria may be based on risk, health, and/or compliance with controlled product restrictions. The consumer criteria may be determined locally based on the consumer's purchase history (e.g., how many and which products have been purchased per transaction, per day, per week, per month, etc.) (also referred to as a dispensing history). The consumer criteria may be determined remotely (e.g., by a risk determination process implemented at the server system 1308 in communication with processing circuitry 1316 of a plurality of dispensing machines 1302 and/or retailer machines 1312). The consumer criteria may be based on the number of products purchased from one or more dispensing machines 1302 at one or more locations (stores) in a particular time period, or the number of transactions (dispensing operations) involving one or more dispensing machines 1302 at one or more locations in a particular time period. The higher the number of products purchased (or transactions completed), or the higher the number of transactions, the higher the consumer's risk score. Likewise, the lower the number of products purchased, or the lower the number of transactions, the lower the consumer's risk score. The consumer criteria may be influenced by other risk-based, health-based, and/or compliance-based factors, such as purchase activity (e.g., whether products were purchased in different jurisdictions (e.g., cities, counties, or states) over a short interval of time) and/or purchase location characteristics (e.g., locations with historically high crime and/or medical activity, or locations in proximity to schools). In some implementations, as an alternative to a score, consumer criteria may be evaluated by comparing the criteria above to predetermine thresholds that may be set based on a level of risk or liability that the retailer or manufacturer associated with the controlled products 1304 is willing to assume, or is legally allowed to implement.

Upon obtaining the consumer criteria, the processing circuitry 1316 may evaluate the consumer criteria by comparing the number and/or types of products identified (or to subsequently be identified) in operation 1402 to thresholds that are predetermined in accordance with the risk score/criteria as described above. Higher risk scores may be associated with lower criteria thresholds (further limiting purchases), and lower risk scores may be associated with higher criteria thresholds (allowing for increased purchases). The higher the threshold, the more products the consumer may be allowed to purchase, and/or the more transactions the consumer may be allowed to complete in a predetermined time period (e.g., per day, per week, per month, etc.). The thresholds may be determined on a location-by-location basis. For example, depending on the store and how much risk a manager of a store is willing to (or legally allowed to) take on, thresholds for that store may be adjusted accordingly.

Upon evaluating the consumer criteria by comparing the thresholds associated with the risk score/criteria with the type and/or number of products identified in operation 1402, the processing circuitry 1316 may allow or not allow the requested products to be dispensed. If the requested products are not allowed to be dispensed, the clerk/consumer may decrease a number of products identified in operation 1402 for dispensing, or cancel the dispensing operations altogether. Once the dispensing operation is complete, the processing circuitry 1316 may update the consumer's risk score/criteria (or cause the consumer's risk score/criteria to be updated) based on the number and/or type of products that were dispensed.

In some implementations, operations 1402B and 1406B may be executed independently from operations 1402 and 1406, as a separate validation operation 1408 (or plurality of validation operations 1408), executed upon identification of one or more controlled products (in operation 1402) and a consumer (in operation 1406). Upon identification of one or more controlled products and a consumer, the processing circuitry 1316 may validate purchase limits and consumer criteria (as described above) in operation(s) 1408 before proceeding to dispensing (1410) the identified controlled product(s).

Figure 15:
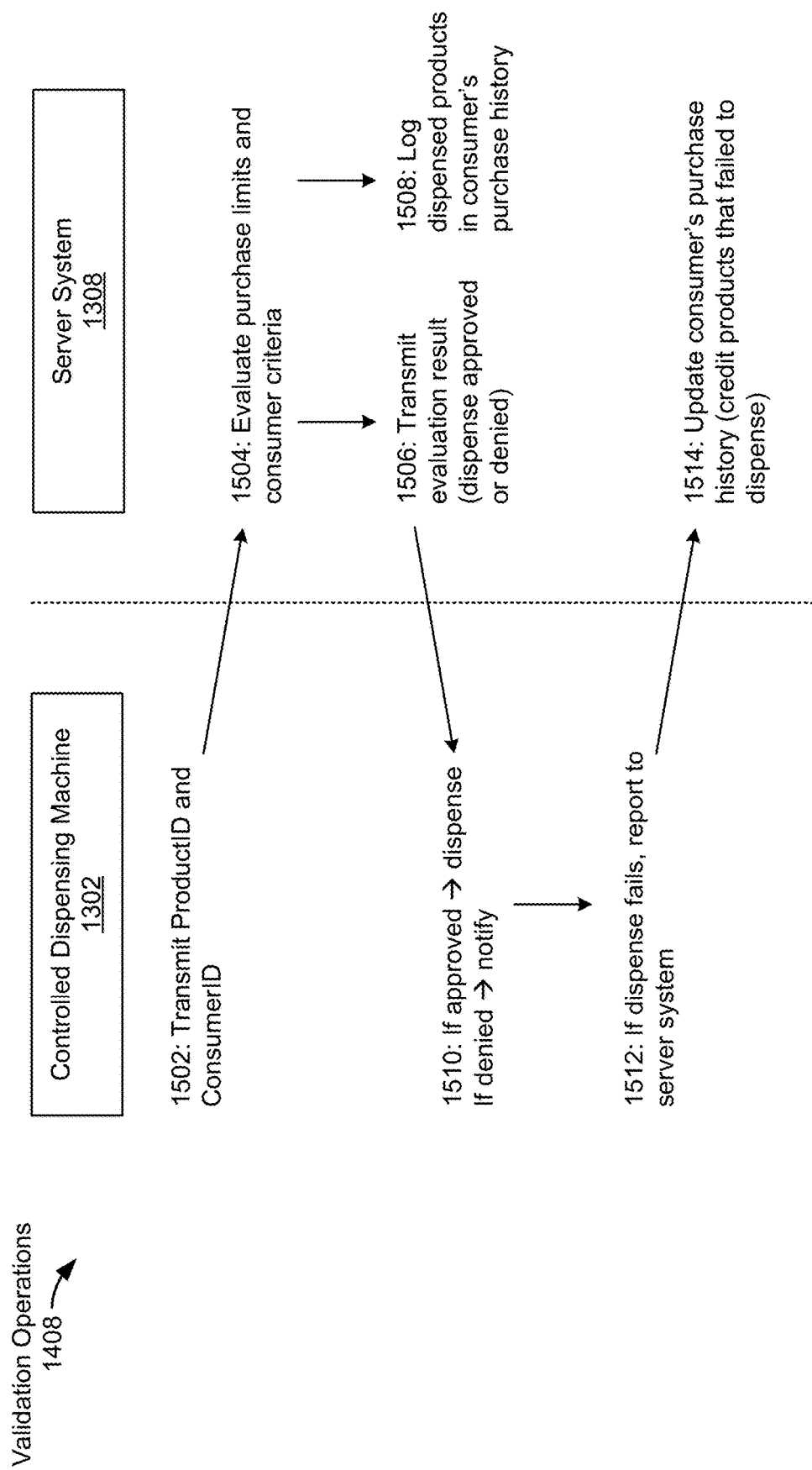
FIG. 15 is a flow diagram of validation operations of a controlled dispensing method in accordance with some implementations.

FIG. 15 is a diagram of example validation operations 1408 of the controlled dispensing method 1400 in accordance with some implementations. The validation operations 1408 may be implemented at the dispensing machine 1302 and a server system 1308 (as described above with reference to FIG. 13). The validation operations 1408 may be triggered upon completion of product selection/identification (operation 1402) and consumer identification (operation 1406) (and optionally, clerk authentication (operation 1404)). Upon completion of the aforementioned operations, the validation operations 1408 may be triggered by selection of a user interface element on the display screen 1314 (e.g., element 1902 described below with reference to FIG. 19), by a barcode scan (e.g., using scanning device 1306/1308 to scan a code corresponding to a dispense command), or by a determination that a predetermined amount of time has passed after the activity related to operations 1402, 1404, and/or 1406.

At the dispensing machine 1302, upon one or more controlled products being selected/identified (ProductID) and a consumer being validated (ConsumerID) (e.g., age verified and/or identity validated), the dispensing machine 1302 transmits (1502) the ProductID (also referred to as a first identifier) and the ConsumerID (also referred to as a second identifier) to the server system 1308. The server system 1308 determines (1504) if it can approve the dispensing of the product(s) to the consumer by evaluating the purchase history of the consumer and other criteria to determine whether purchase limits or other consumer criteria would allow the product(s) to be dispensed to the consumer (e.g., as described above with reference to operations 1402B and 1406B). For example, the server system 1308 may compare the requested product(s) against previously purchased products by the same consumer over a certain period of time and determine if the dispensing can be approved based on predetermined limits set for the dispensing machine 1302 or set for an entire network of dispensing machines 1302. For example, the ConsumerID may be blocked (dispensing may be denied) based on certain criteria such as whether the consumer is suspected of resale, fraud, redistribution, and/or other factors influencing the customer criteria. Even if the consumer is within purchase limits, the consumer may still be blocked from having access to the requested product(s) based on the consumer criteria.

In some implementations, the consumer's purchase history is tracked locally at the location (e.g., at the store) of the dispensing machine 1302. For example, the processing circuitry 1316 and local memory of the dispensing machine 1302 may obtain (e.g., by downloading from the server system 1308) a blocklist of consumer IDs (or hashes of consumer IDs). If a consumer ID 1354 (or a hash of the consumer ID 1354) matches a consumer ID (or a hash of a consumer ID) on the blocklist, then the consumer may be blocked from having access to the requested product(s). Such a blocklist may include consumer IDs (or hashes of consumer IDs) associated with fraudulent IDs previously caught or flagged by a clerk. The blocklist may be stored and updated at the server system 1308 and periodically transmitted to the dispensing machine 1302. Alternatively, the blocklist may be stored and updated locally (e.g., at the retailer machine 1312), making the server system 1308 unnecessary for maintaining and using a blocklist.

The server system 1308 may validate or verify the authenticity of the identification document corresponding to the ConsumerID by comparing the document to documents in a database and/or using machine intelligence to determine authenticity. The database and/or machine intelligence application may be implemented at or otherwise accessible by the server system 1308. For example, an authentication database for identification cards (e.g., drivers licenses or passports) may be implemented at a server not included in the server system 1308, and the server system 1308 may access or otherwise consult the authentication database using an application programming interface (API).

To keep track of all of the controlled products dispensed to a particular consumer, the server system 1308 may pool dispensing data (e.g., number and/or identity of dispensed products) from all of the dispensing machines 1302 communicatively coupled to the server system 1308 via the network(s) 1310 (e.g., to dispensing machines 1302 located in different stores, cities, states, and so forth). In addition to or as an alternative to central tracking of dispensing data at a server system 1308, the dispensing data for a plurality of dispensing operations associated with a plurality of consumers may be tracked via a distributed network of dispensing machines 1302 using, for example, a blockchain protocol.

For example, each of a plurality of dispensing machines 1302 over a network 1310 may maintain a ledger of all transactions in the last 30 days (or any other time period). Each machine's ledger may be updated with subsequently distributed blocks of data using a blockchain protocol. In the event a dispensing machine 1302 loses its connection to the network 1310 (goes offline), the dispensing machine 1302 may independently and locally enforce purchase or dispensing limits using its local copy of the ledger of transactions (e.g., by comparing previous purchase or dispensing operations associated with a particular consumer to a number of requested products to determine whether a limit threshold is satisfied, and dispensing the product if the limit threshold is satisfied).

As another example, each of a plurality of dispensing machines 1302 over a network 1310 may periodically download a block list of consumer IDs from the server system 1308. The block list may include consumer IDs for which dispensing is not permitted (e.g., for fraudulent IDs previously caught or flagged by a clerk, and so forth). The block list may be maintained at a local level if the dispensing machine 1302 is not connected to the network 1310.

If the server system 1308 determines that purchase limits and/or other consumer criteria would not be violated if the requested product(s) are dispensed to the consumer (e.g., dispensing the requested product to the consumer would not violate a purchase limit associated with the product with respect to the consumer), then the server system 1308 approves the dispensing of the requested product. Otherwise, the server system 1308 denies the dispensing of the requested product.

Upon evaluating the requested dispensing operation, the server system 1308 transmits (1506) the result of the evaluation operations 1504 (an approval notification if dispensing is approved or a denial notification if dispensing is denied) to the dispensing machine 1302. The server system 1308 also updates (1508) the consumer's purchase history to log the dispensed product(s). The updated purchase history for the consumer may play a role in denying a subsequent dispensing request (e.g., if such a request would cause a purchase limit to be violated). In some implementations, rather than approving or denying a dispensing request in its entirety, an approval or denial notification may partially approve a subset of the requested products for dispensing in order to satisfy a relevant limit threshold. For example, if a consumer is limited to three controlled products of a particular type in a given day, and the consumer requests five of such products, the server system 1308 may transmit a notification to the dispensing machine 1302 approving the dispensing of only three of the five requested products. In such a scenario, the dispensing machine 1302 may display a message indicating the reason for the partial approval. Such messages may be included in the transmissions from the server system 1308.

Upon receiving the evaluation result, the dispensing machine 1302 causes (1510) the requested products to be dispensed (as described in operation 1410 described above) if the dispensing was approved, or prevents the requested products from being dispensed if the dispensing was denied. In some implementations, the dispensing machine 1302 may notify the clerk/consumer of the denied dispensing by causing a message to be displayed on the display screen 1314 or on the retailer machine 1312.

If dispensing was approved by the server system 1308 but the dispensing operation 1410 fails at the dispensing machine 1302 (e.g., due to a mechanical issue or lack of inventory), the dispensing machine 1302 may report (1512) the failed dispensing operation by transmitting a notification to the server system 1308. Upon receiving the notification of the failed dispensing operation, the server system 1308 may update (1514) the consumer's purchase history by crediting the product(s) that failed to dispense, thereby reflecting the fact that the consumer never used the requested product(s). As a result, the failed dispensing operation will not negatively affect a subsequent dispensing operation associated with the consumer (e.g., purchase history and limits for the consumer are reset to the respective states they were in prior to the current dispensing operation).

In some implementations, as an alternative to validation operations being performed at the server (operations 1504, 1506, 1508, 1514), one or more of these operations may be performed locally at the dispensing machine 1302. For example, dispensing limits may be at transaction level or a machine level. Specifically, there may be a maximum number of controlled products that may be dispensed for a single transaction, for a single consumer, and/or at a single dispensing machine 1302. In such implementations, no server communications would be required to approve a requested dispensing operation, as the number of requested products may be compared to device limits per transaction, per consumer, and/or per machine locally at the dispensing machine 1302. The dispensing machine 1302 may locally validate the ConsumerID and dispense as long as the number of requested products is less than the number of products that are allowed to be dispensed per transaction, per consumer, and/or per machine.

Returning to FIG. 14, in operation 1410, the processing circuitry 1316 approves for dispensing the controlled products 1304 identified in operation 1402 (e.g., upon receiving an approved evaluation result in operation 1510, FIG. 15). Upon approval for dispensing, the processing circuitry 1316 may dispense, or cause to be dispensed, the approved products upon receiving a command via the user interface (e.g., selection of a "Dispense" element). The processing circuitry 1316 may forgo, inhibit, and/or disable the dispensing of the product(s) requested by the consumer until an approval notification is received from the server system 1308 (in operation 1510). The processing circuitry 1316 approves the identified products for dispensing in accordance with successful completion of operations 1402, 1404, and/or 1406 (depending on which of those operations were required), and optionally in accordance with an approval notification received in accordance with validation operations 1402B, 1406B, and/or 1408. For example, if all three operations 1402, 1404, and 1406 are required, as well as successful validation in operation 1408, then the processing circuitry 1316 approves for dispensing the products identified in operation 1402 (e.g., upon positive inventory and purchase limit determinations) as long as the clerk has been authenticated in operation 1404, the consumer has been validated in operation 1406 (e.g., upon validation of age and/or identity, and/or a positive risk/criteria evaluation due to requested products meeting thresholds), and the dispensing has been validated in operation 1408. If at least one of these required operations has not completed successfully, the processing circuitry 1316 does not approve for dispensing the products identified in operation 1402. In such a scenario, the processing circuitry 1316 may provide a message via the user interface on the display screen 1314 regarding which operations failed to complete successfully and/or any steps that need to be performed in order to successfully complete a particular operation.

The controlled dispensing method 1400 governs the dispensing of controlled products 1304 in accordance with transactions initiated by consumers. Other aspects of such transactions, such as payment processing may or may not involve the dispensing machine 1302. Stated another way, the dispensing operations described with reference to method 1400 may be completed independently of any payment functions.

In some implementations, dispensing and payment operations may be integrated into the same process. For example, upon the identification of products in operation 1402, or the approval for dispensing of such products in operation 1410, the processing circuitry 1316 may provide those products (e.g., by transmitting product identifiers associated with the identified and/or approved products), or provide prices associated with those products, to the retailer machine 1312, which facilitates payment functions (e.g., determining an amount owed based on product prices, taxes, discounts, etc.; collecting payment by processing a credit card transaction; providing a receipt; and so forth).

In some implementations, dispensing and payment operations may be processed separately, either in parallel or in sequence. For example, while the processing circuitry 1316 of the dispensing machine 1302 is performing dispensing operations (method 1400), the retailer machine 1312 may perform payment operations (e.g., including the clerk manually entering an amount to be charged or selecting the identified products, and performing the other payment operations described above). Alternatively, the clerk may process payment first, using the retailer machine 1312, and upon successful receipt of payment, cause the dispensing machine 1302 to perform dispensing operations. Alternatively, the clerk may cause the dispensing machine 1302 to perform dispensing operations first, and upon successful dispensing of the requested products, cause the retailer machine 1312 to perform payment operations.

In some implementations, the dispensing machine 1302 may store each dispensing operation in local memory for auditing purposes. The dispensing machine 1302 may optionally transmit the stored dispensing operations to the server system 1308, so that pool dispensing records across a network of dispensing machines 1302 may be audited. Such auditing functionality is useful for determining compliance with regulations associated with the dispensing of the controlled products 1304. In addition, such auditing functionality, together with the other functions described above with reference to FIGS. 14 and 15, promote accountability in the regulation of the dispensing of controlled products 1304 (e.g., including the regulation of which consumers may receive such products, and how much of such products can be dispensed for a given transaction).

FIGS. 16-19 depict example user interface screens (e.g., for display on the display screen 1314) in accordance with some implementations. The example user interfaces may support touch interaction or voice interaction. For touch interaction implementations, the example screens may display one or more selectable affordances that, upon selection, execute one or more commands and described below.

Figure 16A:
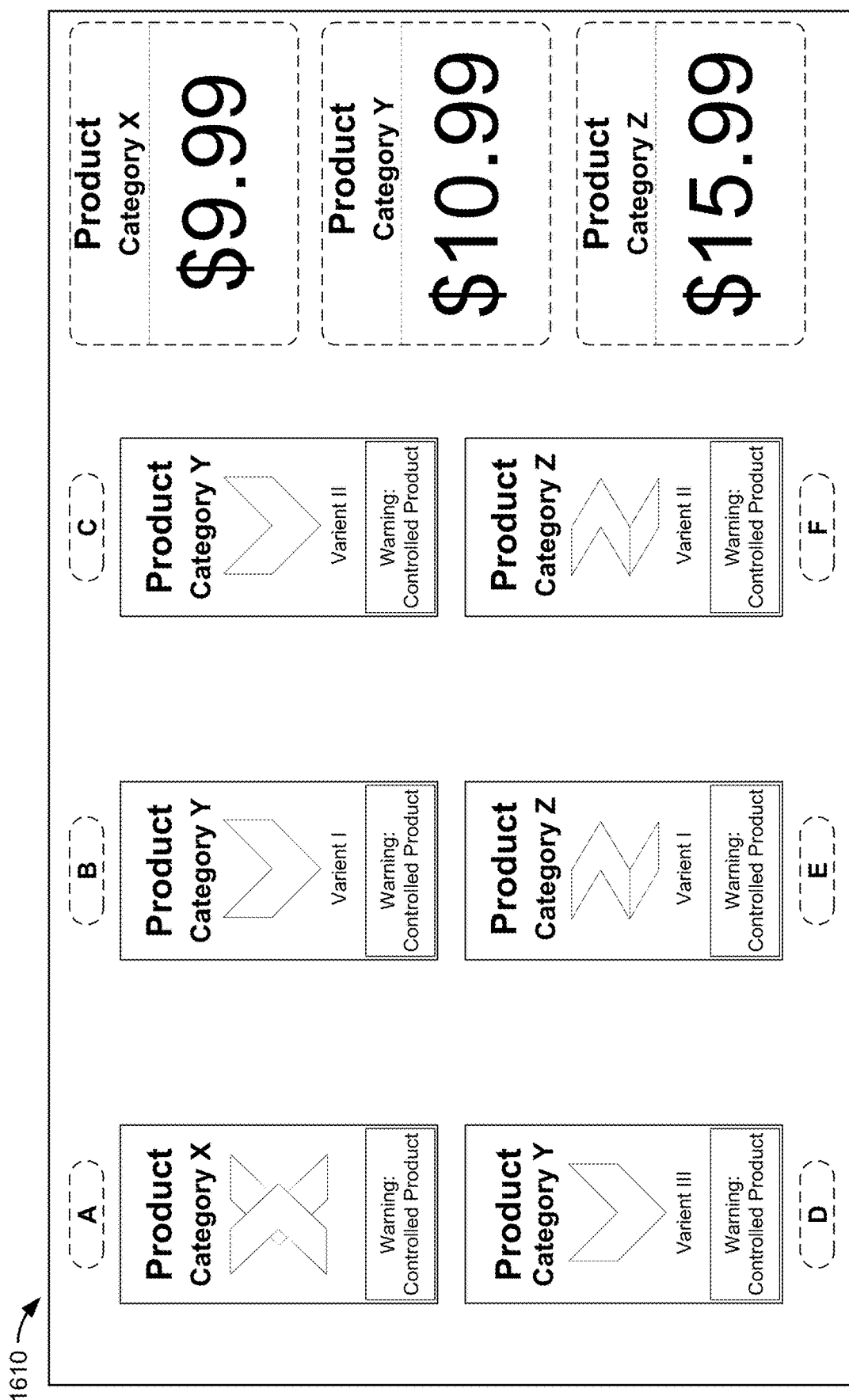
FIGS. 16A-16B are a diagram of transaction screens of a controlled dispensing machine or placard in accordance with some implementations.

FIG. 16A depicts a user interface 1610 with product images including product labels (Product Category X, Product Category Y, Product Category Z) and corresponding labels (A-F). The product images and/or labels may be selectable affordances, the selection of which identifies a product as described in operation 1402. The labels aid in identification of a desired product by a consumer to a clerk, and the product images may be animated. The user interface 1610 may also include pricing, which can be changed locally on the dispensing machine 1302 or retailer machine 1312, or remotely at the server system 1308. There may be several different product variants (e.g., flavors of a vaping product or colors of spray paint) for a given product. The user interface 1610 may include warnings (not shown) communicating the controlled nature of the products, and/or rules regulating access to such products. The user interface 1610 may be displayed on the display screen 1314 (e.g., as an idle screen that is displayed between dispensing operations), and/or may be implemented as a placard 1352. Implementing the same or similar user interfaces at the display screen 1314 and a placard 1352 increases ease at which a consumer and clerk may identify desired products.

Figure 16B:
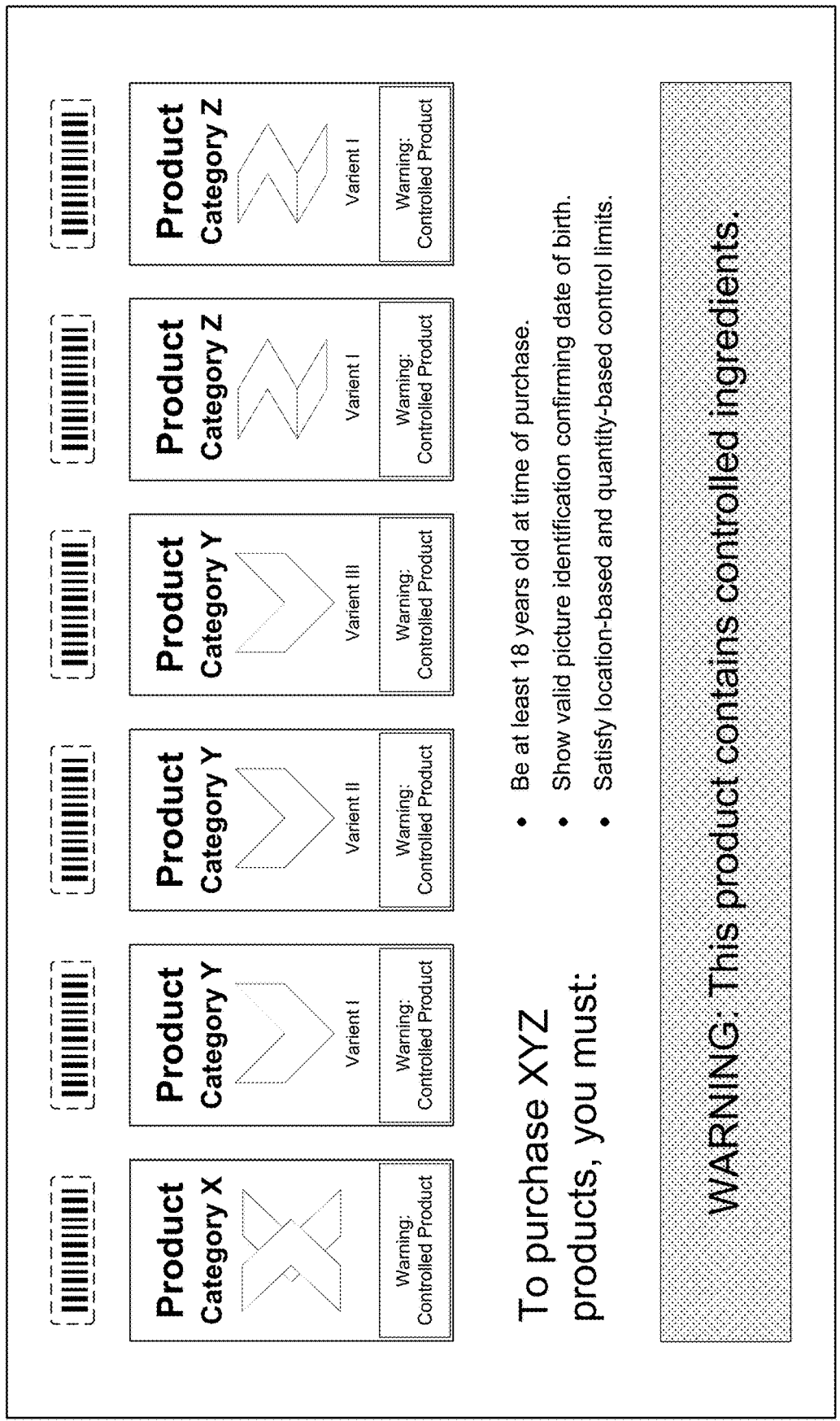

FIG. 16B depicts a user interface 1620 with product images (Product X, Product Y, Product Z) and corresponding scannable barcodes. The barcodes may be scanned by a scanning device 1306, the scanning of which identifies a product as described in operation 1402. The product images may be animated. The user interface 1620 may also include pricing (not shown), which can be changed locally on the dispensing machine 1302 or retailer machine 1312, or remotely at the server system 1308. There may be several different product variants (e.g., flavors of a vaping product or colors of spray paint) for a given product. The user interface 1620 may include warnings communicating the controlled nature of the products, and/or rules regulating access to such products. The user interface 1620 may be displayed on the display screen 1314 (e.g., as an idle screen that is displayed between dispensing operations), and/or may be implemented as a placard 1352. The placard 1352 may also have additional barcodes or QR codes for machine operations such as a dispense operation and/or a cancel instruction. For example, the clerk may scan the consumer's ID with the scanner device 1306, scan the product barcode on the placard, and then scan the dispense barcode. The clerk may then simply walk to the dispensing machine to retrieve the product without the need to touch or interact with the machine directly. Implementing the same or similar user interfaces at the display screen 1314 and a placard 1352 increases ease at which a consumer and clerk may identify desired products. In some implementations, the user interface 1610 may be displayed on a touch-sensitive display screen 1314 (e.g., an idle screen on the dispensing machine 1302) while the user interface 1620 may be displayed as a scannable placard 1352 (e.g., a mat with scannable barcodes).

In some implementations, the scanning device 1306 may give the clerk feedback on the scan. For example, if the consumer ID is valid and approved for purchase, the scanner may output an audible indication (e.g., a "beep") or a visual indication that the consumer is approved. A different audible or visual indication may be presented to the clerk if the consumer ID is denied.

Figure 17A:
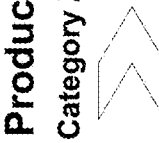

Upon selecting a product (e.g., using a user interface 1610 or 1620), the user interface advances to a transaction screen, as depicted in FIG. 17A. For example, upon selecting Product Y Variant I in the user interface 1610 (FIG. 16A), a quantity affordance "1" is highlighted, showing one Product Y Variant I has been selected (FIG. 17A). The transaction screen includes an array of quantity affordances (e.g., numbers 1, 2, 3, and 4 for each product), product images, letters, and prices. Each of the aforementioned elements may be selectable. Each product is associated with a plurality of quantity affordances representing different quantities of a corresponding product.

In some implementations, each of the quantity affordances may indicate a selection status based on whether it has been selected or not. For example, a quantity affordance that has been selected may be displayed with a highlight or a texture (e.g., the 1 affordance for Product B). In some implementations, selecting a quantity affordance that has already been selected causes the quantity affordance to be unselected, and for the quantity of selected products to be adjusted accordingly.

In some implementations, each of the quantity affordances may indicate an availability status based on (i) quantity limits for a corresponding product or quantity limits for the transaction, and (ii) a number of products already selected. If selection of a particular quantity affordance would cause the number of selected products to be greater than a relevant product limit or the transaction limit, then that particular affordance may indicate its unavailability (e.g., by being grayed out) and be non-selectable (e.g., the 4 affordances for Products C-F). Such an indication is referred to herein as an availability indication.

In some implementations, the availability status of the quantity affordances updates in real-time to indicate which quantity affordances may still be selected, as described above. FIGS. 17A-17F illustrate an example of real-time quantity affordance updates. In this example, there is a quantity limit (also referred to herein as a bulk limit) of one for Product X, and a combined product limit of four for Products Y and Z. As such, only one Product X may be selected and up to four Products Y and/or Z may be selected for a single dispensing transaction.

In FIG. 17A, one Product Y is selected. As such, all quantity affordances that would cause the number of selected Products Y and Z to be greater than four (the quantity limit) are grayed out. In this case, the 4 quantity affordances are grayed out for the other Products Y and Z. The 4 is not grayed out for the selected product, because selection of this 4 would cause the selected 1 to be unselected, and the new total selected quantity would be four, which meets the quantity limit.

Figure 17B:
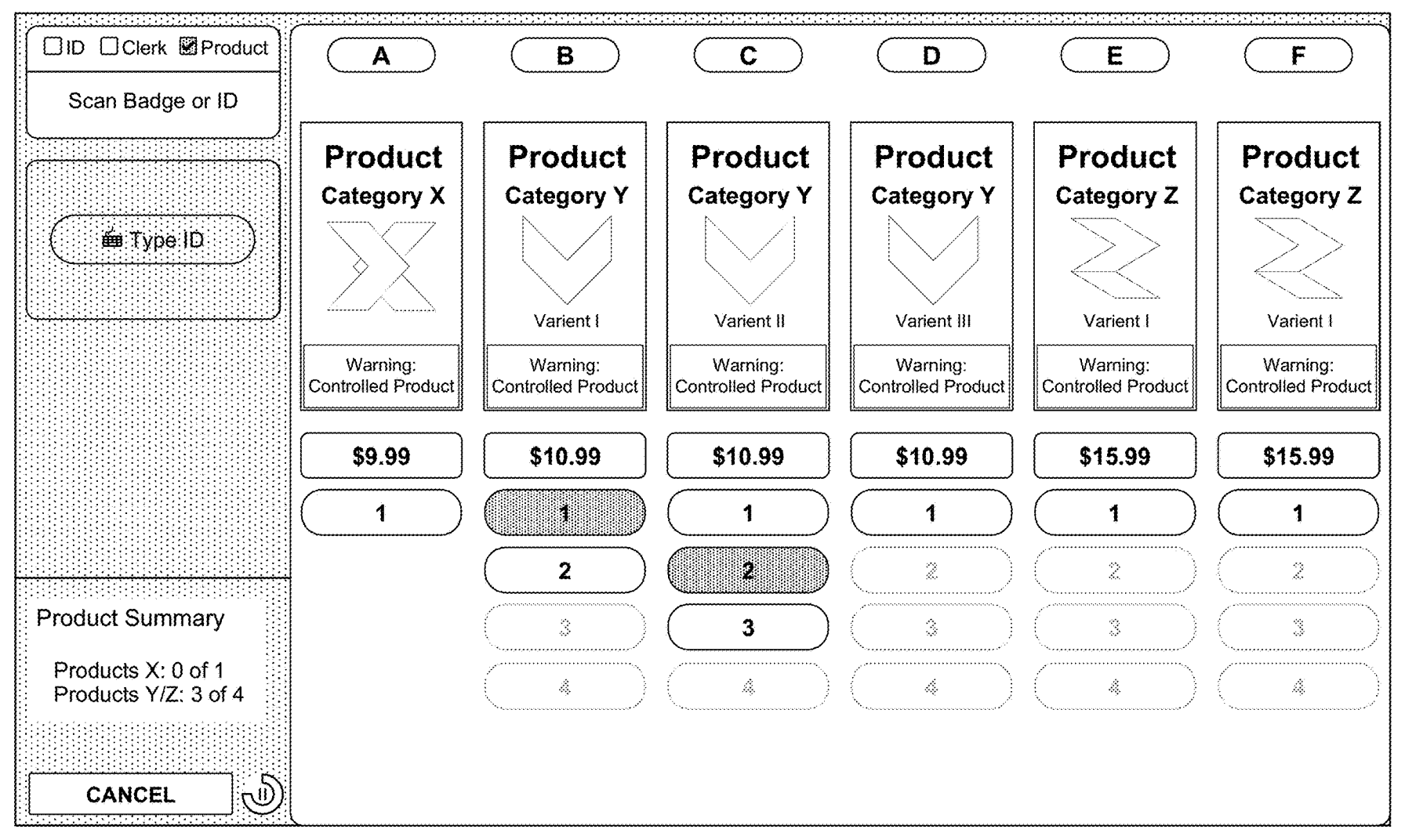

In FIG. 17B, two more Product Ys are selected, bringing the total of selected Products Y/Z to three. As such, additional quantity affordances are grayed.

Figure 17C:
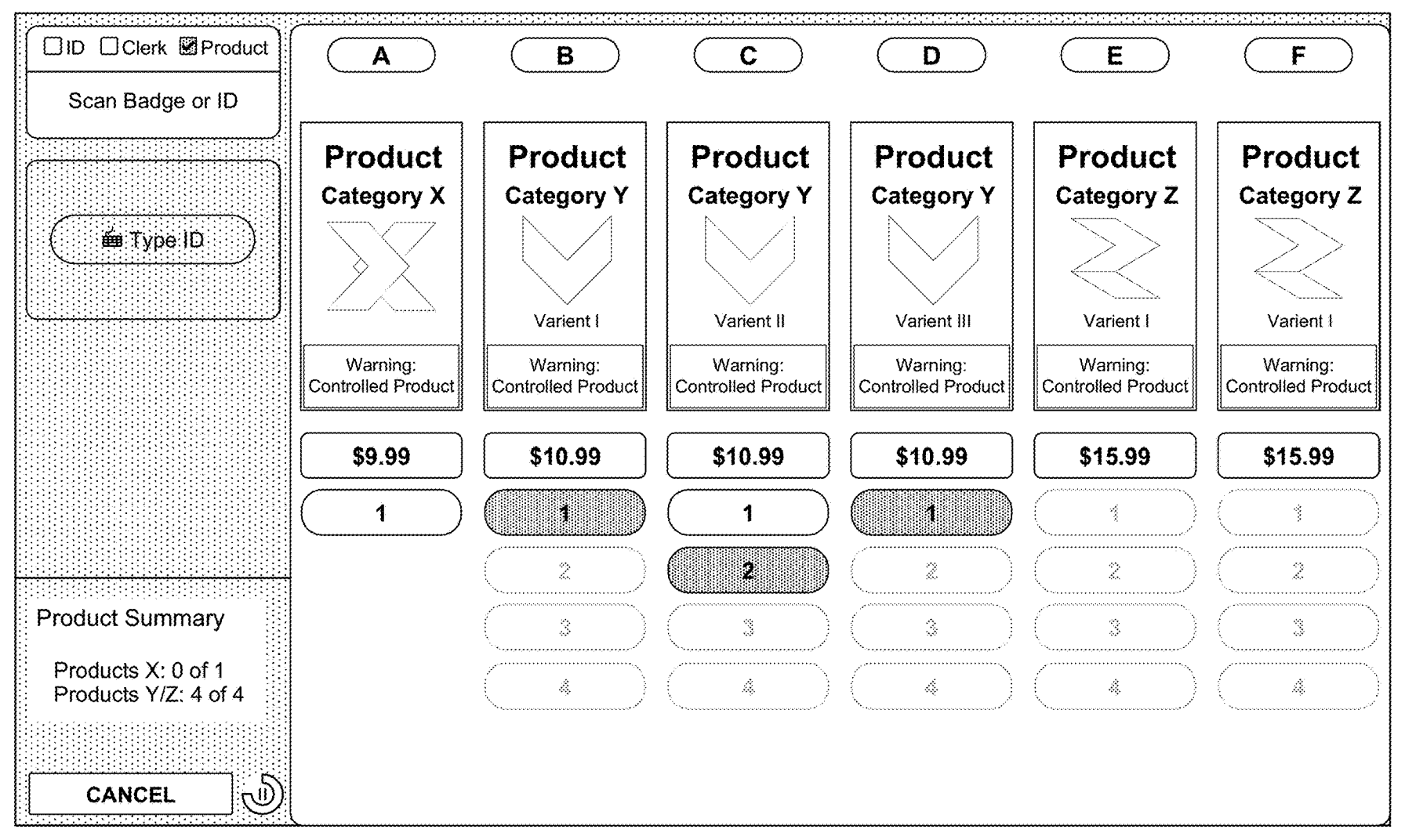

In FIG. 17C, one more Product Y is selected, bringing the total of selected Products Y/Z to four, which is the quantity limit. As such, all other quantity affordances for the other Products Y/Z are grayed out, except for the 1 affordance of Product Y Variant II, since selection of this affordance would deselect the 2 affordance, bringing the total of selected Products Y/Z back down to three.

Figure 17D:
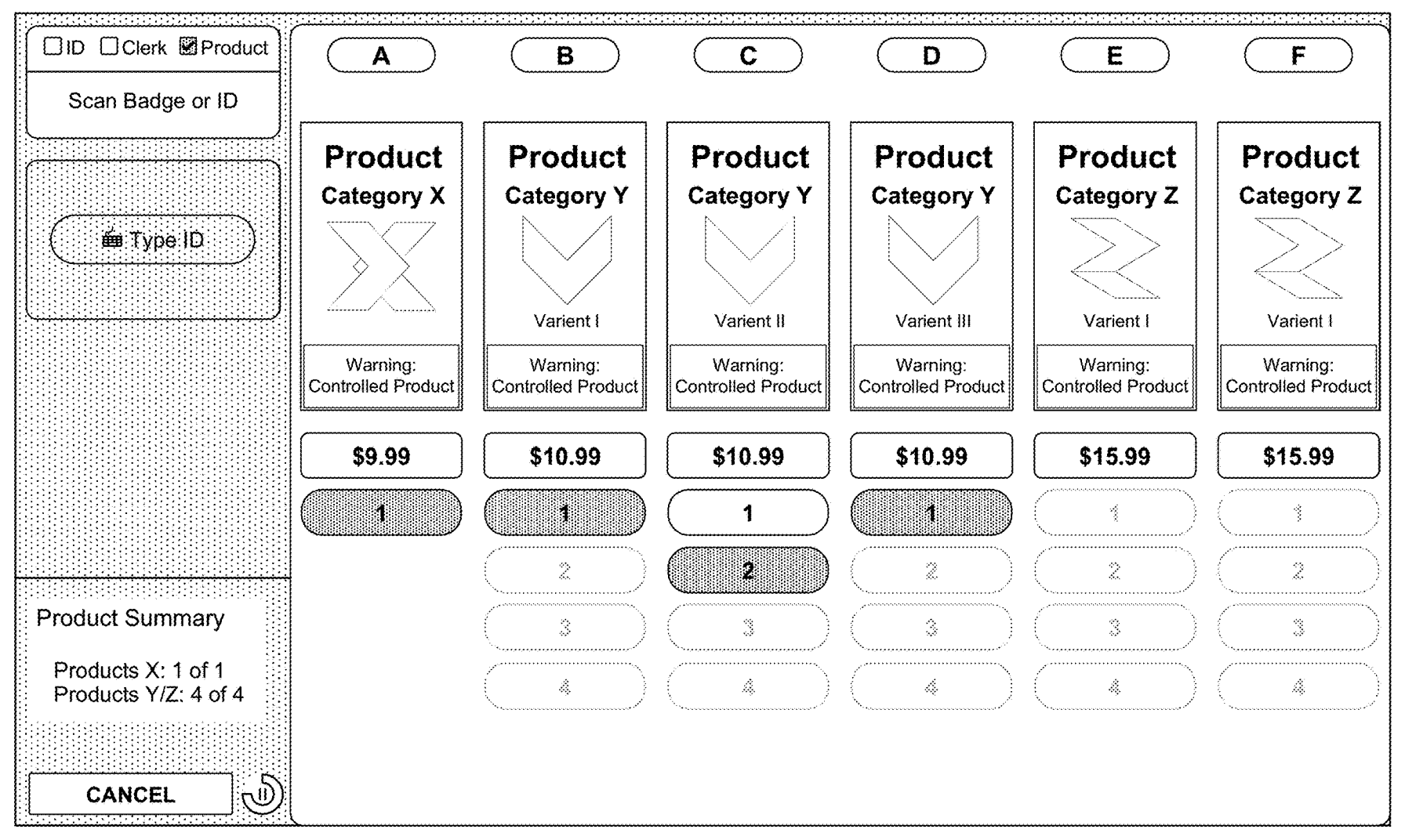

In FIG. 17D, one Product X is selected, thereby meeting the quantity limit for Product X.

Figure 17E:
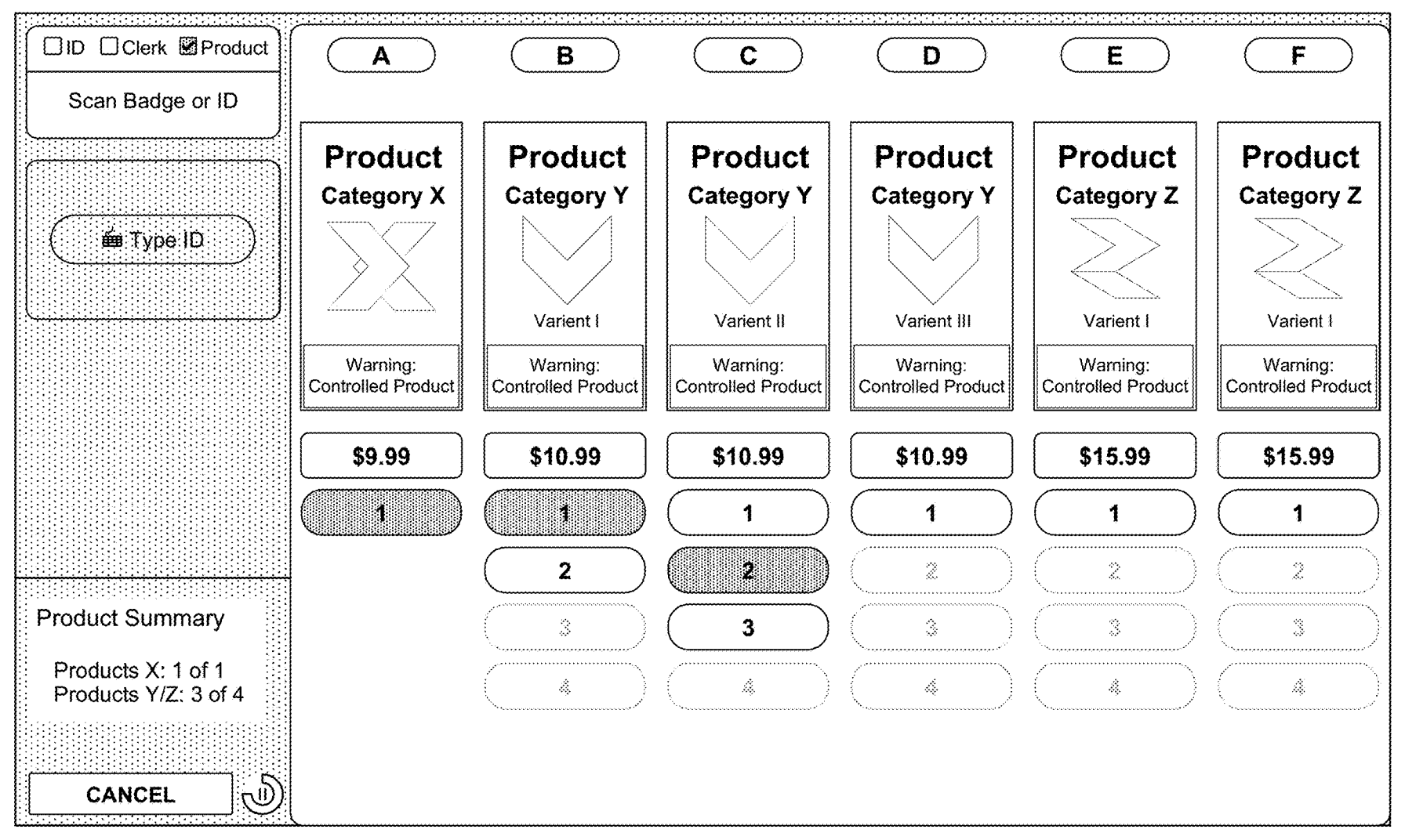

In FIG. 17E, one Product Y Variant III is deselected, bringing the total of selected Products Y/Z back down to three, which causes additional quantity affordances to indicate selectability.

Figure 17F:
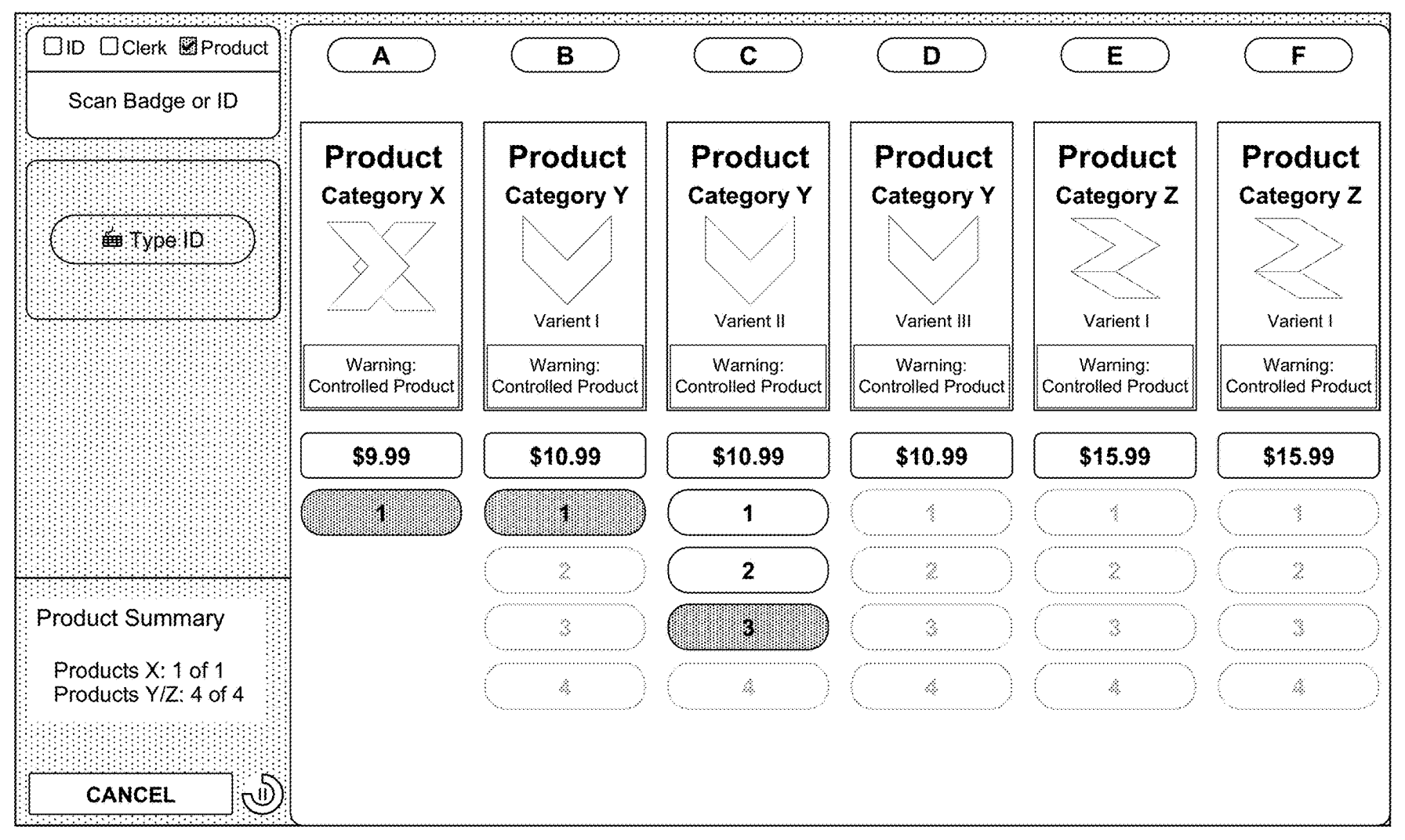

In FIG. 17F, the 3 affordance for Product Y Variant II has been selected, causing the 2 affordance for that product to be deselected, and causing the total of selected Products Y/Z to go back to four, which is the quantity limit. As a result of the total of selected Products Y/Z reaching the quantity limit of four, the quantity affordances associated with the other products are grayed out to indicate that they are unselectable.

Returning to FIG. 17A, the transaction screen may include a status section 1702, which includes status elements (e.g., ID, Clerk, and Product checkboxes) showing completion status of operations required for dispensing (e.g., operations 1402, 1404, and 1406). As each operation is completed, the corresponding status element updates to show completion of that operation (e.g., the box becomes checked).

The transaction screen may include an instruction box 1704, including instructions conveying to a clerk which operation(s) are still incomplete. Regardless of which instruction(s) are displayed, however, the operations may be completed in any order, as described above. Guidance provided by the instruction box 1704 enables a clerk with no training to complete the controlled dispensing method 1400.

The transaction screen may include an identification (ID) section 1706, including information about a scanned or manually entered (typed) consumer ID. A manual entry affordance ("Type ID") allows a clerk to manually enter information from the consumer's ID (e.g., date of birth, expiration date, license number, etc.). Alternatively, the clerk may scan the consumer's ID using the storage controller 124 as described above. Regardless of the method of entry, the ID section may be updated to show information associated with the consumer's ID (see FIG. 19). There may be a "verified by" message in proximity to the ID section (see FIG. 19), which conveys to the clerk that the clerk is being held accountable to physically verify the photo on the consumer's ID with the information being scanned. The "verified by" line may include the clerk's name or other identifying information obtained in operation 1404.

The transaction screen may include a product summary section 1708, including quantity limits and the number of selected products associated with each quantity limit as described above. The transaction screen may include a cancel affordance 1710, the selection of which ends the dispensing session. A pause affordance may be displayed in proximity to the cancel affordance, the selection of which extends the dispensing session (e.g., in the event the clerk gets a phone call or other distraction). The transaction screen may include a dispense affordance 1902 (see FIG. 19). The dispense affordance appears only after each required operation (e.g., 1402, 1404, and 1406) is completed (e.g., one or more products are selected, the consumer is of valid age, has a valid ID, the clerk has logged in, and the selected products are within limits). Selection of the dispense affordance causes the dispensing machine 1302 to dispense the selected products (e.g., causes the processing circuitry 1316 to send an instruction to a dispensing mechanism associated with each selected product to dispense a specified quantity of each respective product).

Figure 18A:
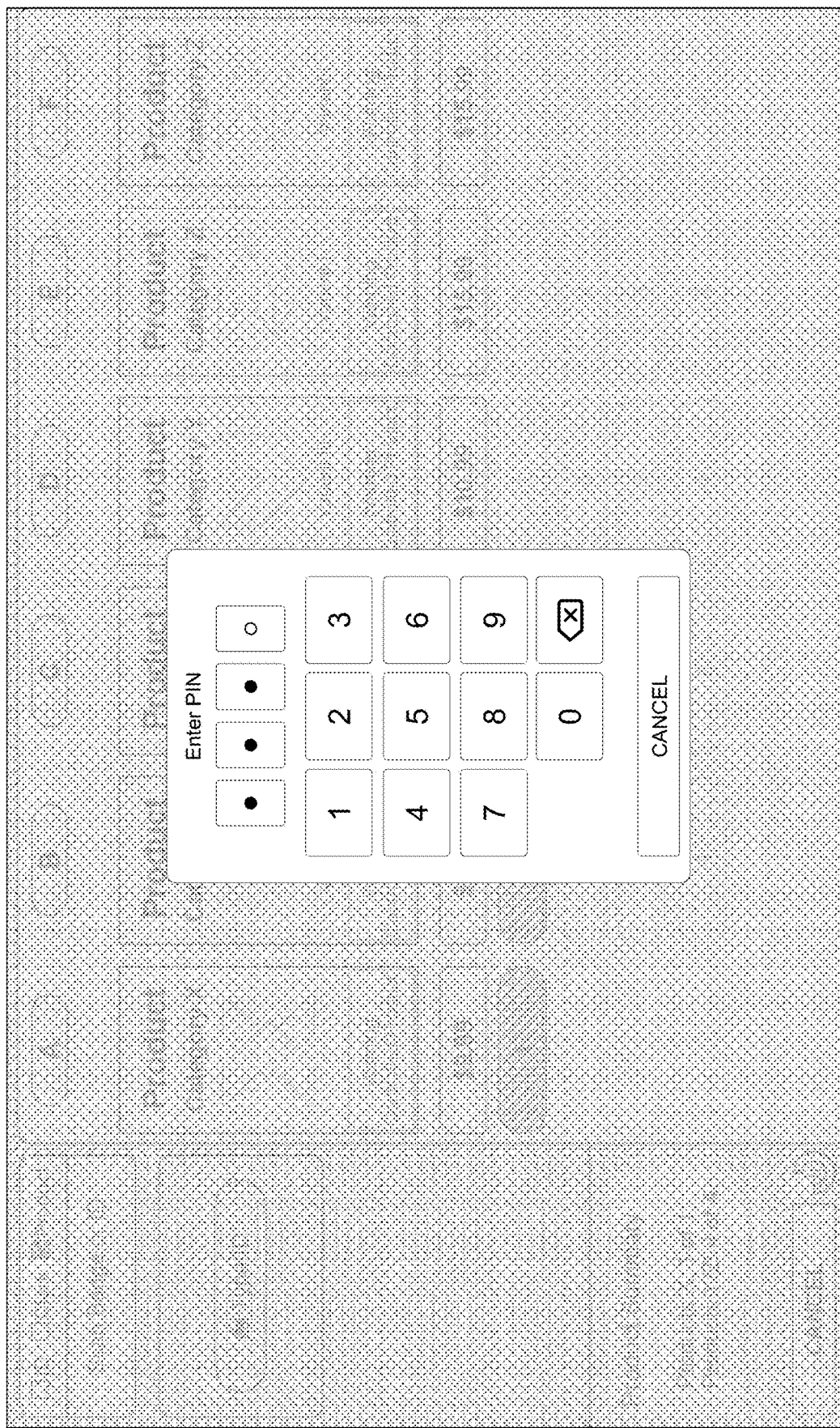
Figure 18B:
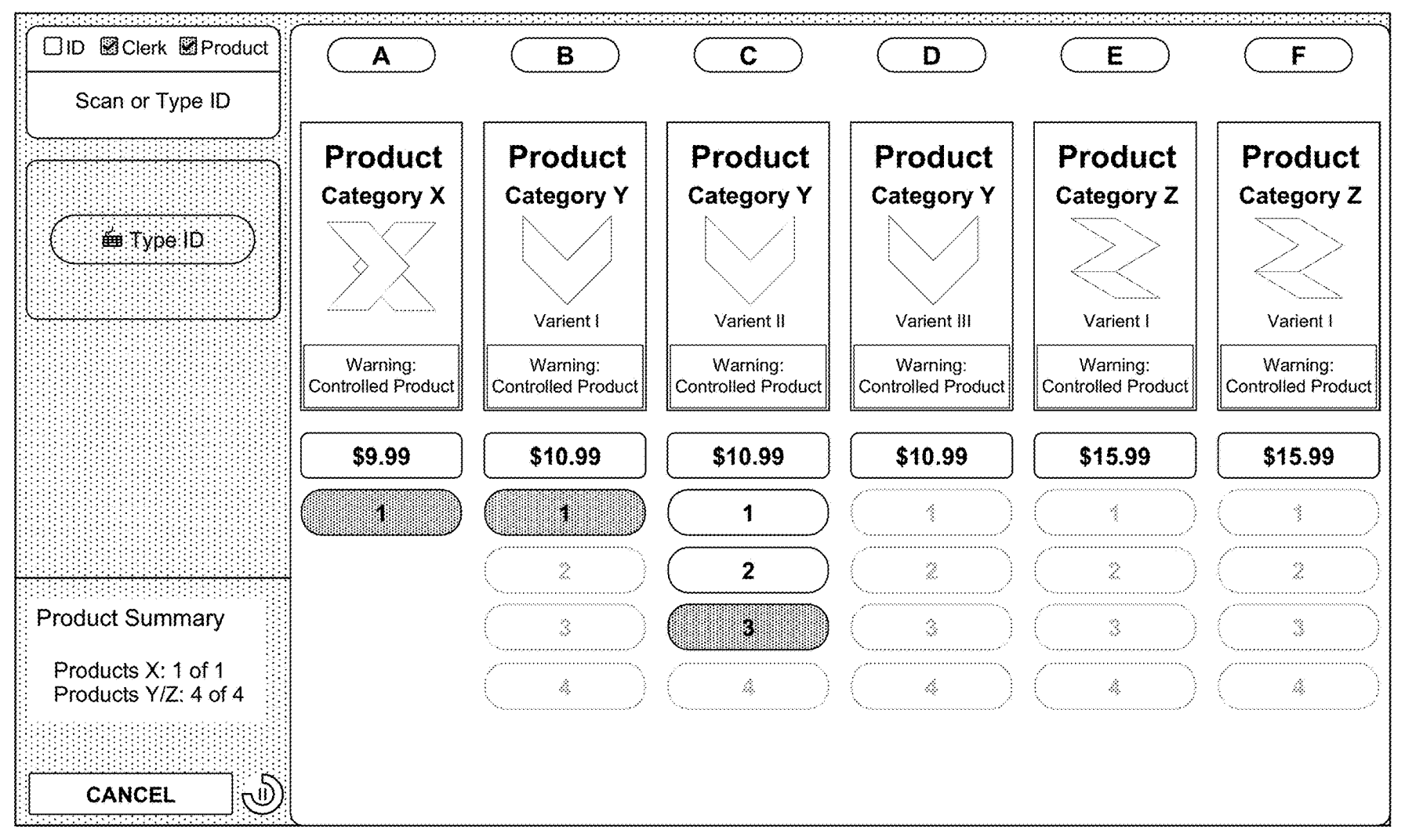
Figure 19:
FIG. 19 is a diagram of a transaction screen of a user interface associated with consumer validation in accordance with some implementations.

Returning to FIG. 17F, five products have been selected—one Product X (meeting the quantity limit of such products), and four Products Y/Z (meeting the quantity limit of such products). At this point in the dispensing process, quantity affordances may be deselected or alternative quantity affordance may be selected in order to change the quantity and type of desired products for dispensing. As long as at least one product is selected, the product status element of the status section 1702 is checked. At this point (or prior to product selection, or subsequent to consumer validation, as described above), the clerk may scan a badge or access card using the storage controller 124, as described above with reference to operation 1404. As part of this operation, the user interface may display a PIN entry screen (FIG. 18A). Once the clerk's PIN is entered (or if no PIN is required, once the clerk's badge is scanned), the status section 1702 of the user interface conveys completion of the clerk authorization operation 1404 (e.g., the clerk element is checked, see FIG. 18B). At this point in the dispense operation (or prior to the clerk authorization operation and/or the product selection operation, as described above), the consumer's ID may be scanned using the storage controller 124 or manually entered. The ID section 1706 may display confirmation of a valid ID (FIG. 19), or an "Invalid ID" message if the ID is expired or otherwise found to be invalid, or an "Underage" message if the consumer's age does not meet an age threshold for a selected product. Upon a successful scanning or entry of a valid consumer ID, the status section 1702 conveys completion of the consumer validation operation (e.g., the ID box is checked). Once all three operations 1402, 1404, and 1404 are completed (or a subset of those operations depending on which operations are required), the dispense affordance 1902 is displayed, the selection of which causes the selected products to be dispensed.

Figure 20:
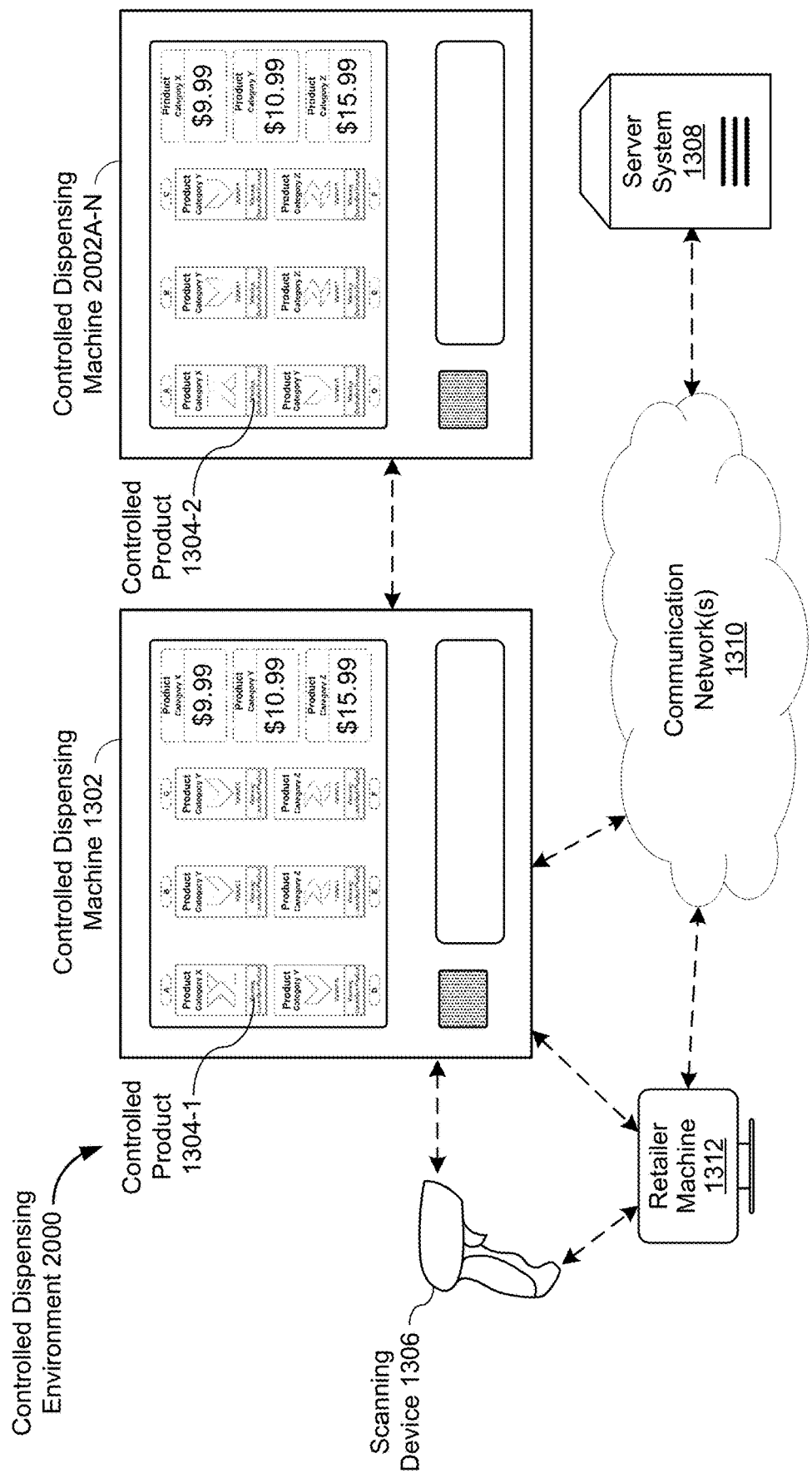
FIG. 20 is a diagram of a controlled dispensing environment in accordance with some implementations.

FIG. 20 is a diagram of a controlled dispensing environment 2000. Items corresponding with those in the controlled dispensing environment 1300 (FIG. 13) are similarly numbered and some are not further discussed for purposes of brevity. In the controlled dispensing environment 2000, a plurality of secondary dispensing machines 2002A-N may be communicatively coupled to a master dispensing machine 1302. The interconnected dispensing machines may communicate with a single controller, or more specifically, a single instance of the processing circuitry 1316. The interconnected dispensing machines may be further coupled to a single scanning device 1306 and/or a single retailer machine 1312. For example, a scanned product identifier (e.g., barcode) may be conveyed to the processing circuitry 1316 of the dispensing machine 1302 or the retailer machine 1312, and the processing circuitry 1316 determines which dispensing machine houses the desired controlled product 1304. The dispensing machine that includes the desired product is the one that receives "dispense" instructions from the processing circuitry 1316 upon successful completion of required dispensing operations (e.g., 1402, 1404, and/or 1406). In some implementations, the processing circuitry 1316 may convey a message on the display screen 1314 of the dispensing machine 1302 or the retailer machine 1312, instructing a clerk to proceed to a particular dispensing machine to retrieve a dispensed product. In some implementations, a routing table is included in memory of the processing circuitry 1316 that routes respective controlled products 1304 to respective dispensing machines (1302 or 2002A-N) in which they are housed. The dispensing machines 1302 and 2002A-N may be communicatively coupled via a wired or wireless local area network as described above, or over a wide area network (e.g., via communication network(s) 1310 and the server system 1308 as described above). As such, a plurality of dispensing machines may be employed in the controlled dispensing environment 2000 without the requirement for separate scanning devices for each dispensing machine, and confusion regarding which dispensing machine from which to retrieve a dispensed product may be avoided. In some implementations, one or more of the machines 2002A-N may not have a display screen.

FIGS. 21A-21D are diagrams of a controlled dispensing machine 2100 including an internal camera 2102 in accordance with some implementations. The dispensing machine 2100 may correspond to dispensing machine 102 (FIG. 1) and/or dispensing machine 1302 (FIG. 13), and features described above with respect to these dispensing machines may be shared with dispensing machine 2100.

The dispensing machine 2100 includes a camera 2102 (or any other sensing device, such as a scanner) mounted inside, or mounted outside with a view of the products inside. In some implementations, the camera may be mounted to the inside of a door 2110, or anywhere else inside of a cabinet 2112 of the dispensing machine 2100. The camera 2102 has a field of view 2120 that covers the products disposed inside the machine 2100.

As described above with reference to machines 102 (FIG. 1) and 1302 (FIG. 13), dispensing machine 2100 may include a plurality of slots 2104 and corresponding dispensing mechanisms 2106 (e.g., spirals, pushers, etc.). For example, referring to FIG. 21D, a product 2122 may be disposed inside slot 2104*a* and subject to dispensing by dispensing mechanism 2106*a*, and a product 2124 may be dispensed inside slot 2104*b* and subject to dispensing by dispensing mechanism 2106*b*.

In some implementations, the products may have text and/or barcode/QR labels on the packaging, oriented such that the camera 2102 can image them all at once (due to the text/labels being in the field of view 2120. This may be useful for tracking inventory levels (e.g., counting how many products in each slot), tracking sales (e.g., by determining how many and which product labels are present), tracking batch codes (e.g., for recalling of products), tracking serial numbers (e.g., for activation as described above), and/or identifying misfiled or misloaded products. In some implementations, if a product is recalled or expired, the machine 2100 may disable the slot or dispensing mechanism corresponding to the recalled/expired products based on either local computation or analysis at a processor of the machine 2100 or based on instructions received from a server (e.g., server system 1308, FIG. 13) based on remote analysis at the server.

In some implementations, the machine 2100 may periodically capture an image using the camera 2102 to implement one or more of the tracking/identifying operations described above. Image capture and associated processing may be triggered by a dispensing request (e.g., during operation 1402B or 1408, FIG. 14).

Figure 22:
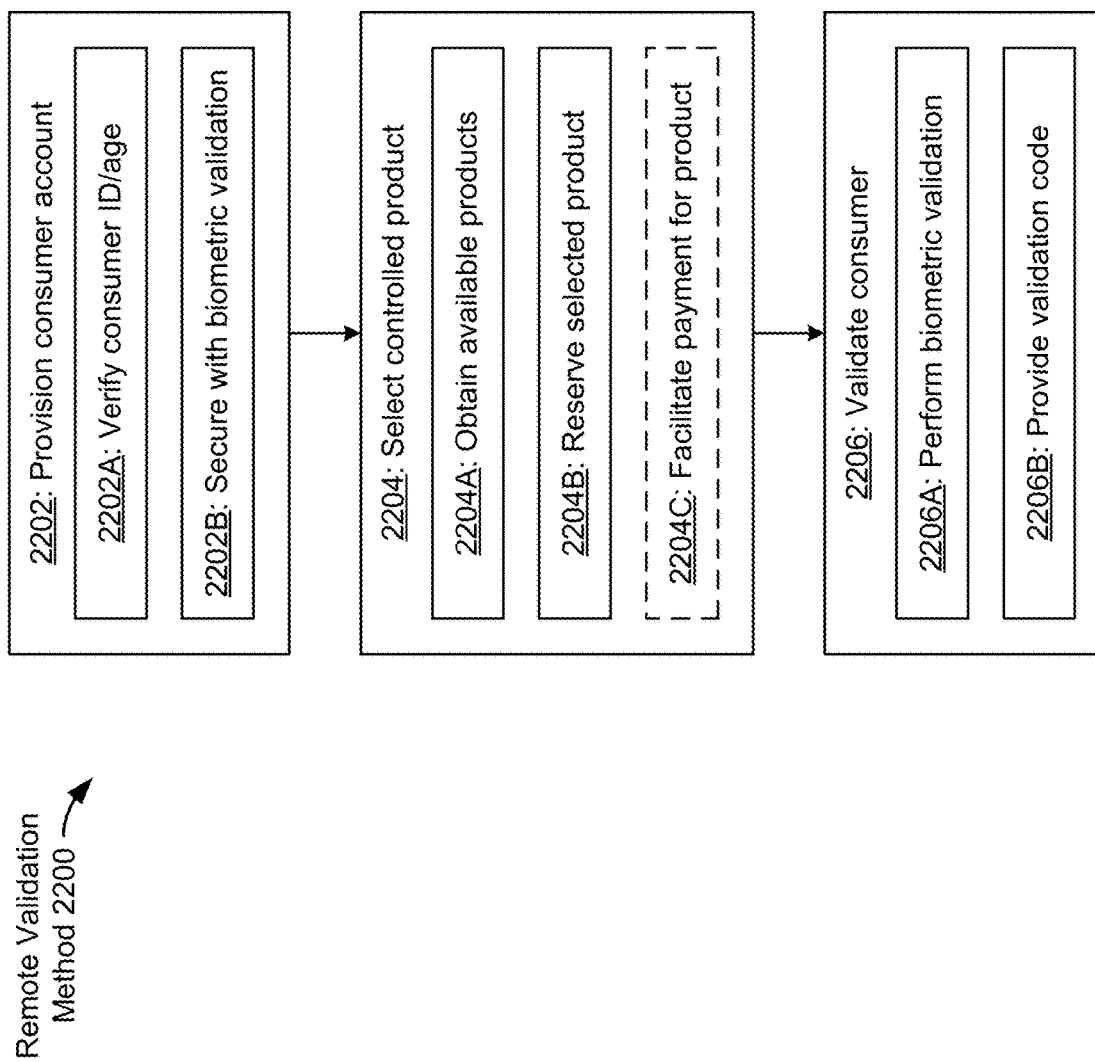
FIG. 22 is a flow diagram of a remote validation method at a mobile device including remote consumer account provisioning and remote product selection in accordance with some implementations.

FIG. 22 is a flow diagram of a remote validation method 2200 at a mobile device including remote consumer account provisioning and remote product selection in accordance with some implementations. The method 2200 may be governed by instructions that are stored in a memory or non-transitory computer readable storage medium of a mobile device (e.g., mobile device 1307) and that are executed by one or more processors of the mobile device. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 2200 may be combined and/or the order of some operations may be changed. Optional operations are conveyed with dashed lines.

In method 2200, the consumer may use his or her phone (e.g., mobile device 1307) to perform some of the operations described above in method 1400 (FIG. 14) before going to the location at which the dispensing machine 1302 is located (before going to the store), thereby saving time and adding convenience for the consumer without compromising on age-based or identity-based compliance measures surrounding the sale of controlled products from the perspective of the retailer or manufacturer.

In general, the mobile device 1307 executes an application that verifies and validates consumer information, reserves and/or facilitates purchases of controlled products 1304, and facilitates communications with the server system 1308 via the communication network(s) 1310. If the consumer is a user of the application, the consumer can use the application to purchase and/or reserve a controlled product 1304 at a desired store, and receive a barcode in the application that identifies the reserved product and validates the consumer (verifying the consumer's age and/or identity). When the consumer arrives at the selected store, a retail clerk scans the barcode in the application (e.g., using scanner 1306). The consumer may provide further identity and/or age verification by performing biometric verification on the consumer's mobile device 1307 (e.g., using touch ID, face ID, or something similar) to validate that the consumer is the owner of the mobile device 1307. Since the consumer is validated as being the owner of the mobile device 1307 (after performing the biometric verification), the mobile device 1307 is associated with the consumer's account (since the application installed), the consumer's identity and/or age has been verified using the consumer's account (by having performed verification procedures during the initial account setup), the retail clerk may presumed that the consumer satisfies age and/or identity requirements associated with the reserved controlled product. This presumption may be solely based on the consumer passing the biometric verification on the mobile device and presenting the barcode, and does not require additional steps such as presenting a physical identification card. The dispensing machine 1302 then dispenses the reserved controlled product 1307 based on the consumer validation and product reservation and/or purchase. As a result of this method, once a consumer's account is validated (e.g., verified that the mobile device belongs to the consumer and the consumer meets an age threshold), then the consumer may not be required to use an ID card (e.g., 1354) for subsequent purchases of controlled products, as long as the consumer continues to use the same mobile device as described herein. This method is advantageous from a data privacy perspective, since the retailer would not be required to view or process consumer data (e.g., would not need to send consumer data to any servers or query any databases with inquiries). Instead, a retail clerk could just scan the barcode on the consumer's mobile device, which would automatically authorize dispensing of the controlled product while conforming to age-based and/or identity-based regulations associated with the controlled product.

More specifically, referring to FIG. 22, method 2200 begins with consumer account provisioning operations 2202. In some implementations, these operations may replace some or all of the consumer validation operations 1406 in method 1400 described above, allowing the consumer to be validated before even going to the store. In operation 2202A, the consumer creates an account and performs a one-time age verification, which can be performed through an external service which requires, for example, the consumer to upload a copy of his or her driver's license and/or upload a live image of the consumer's face (sometimes referred to as a live selfie) for remote verification of identity and/or age. Alternatively one or more identity and/or age verification steps may be performed in person at the store. For example, in some implementations, the consumer may be required to show a physical ID 1354 to the retail clerk, who validates and verifies the ID as described above with reference to operations 1406 and 1406A. The retail clerk then scans a barcode generated by the application running on the mobile device 1307 of the consumer (e.g., using scanning device 1306). The dispensing machine 1302 then transmits a notification to the server system 1308 that the consumer's account (corresponding to the scanned barcode) is age-verified and/or identity-verified. For subsequent product dispensing operations (e.g., involving subsequent visits to the store by the consumer), the consumer's identity and/or age may be verified solely with the mobile device 1307 (e.g., by logging into the consumer's account and performing a biometric verification), rather than the retail clerk having to request a physical ID 1354 again.

Stated another way, the first time the consumer enters the store and attempts to purchase a controlled product, the consumer may be prompted (either in the application running on the mobile device 1307 or on the display screen of the dispensing machine 1302) to show a physical ID 1354 to the retail clerk for validation operations 1406. Then the dispensing machine 1302 and the server system 1308 link the physical ID 1354 to the mobile device 1307. Thus, the next time the consumer enters the store, the consumer does not have to show the physical ID 1354 (operations 2206 described below would be adequate to validate the consumer). Optionally, the dispensing machine 1302 or dispensing application running on the mobile device 1307 may randomly ask for physical ID 1354 anyway (as part of a random spot check to ensure compliance with identity and/or age-based restrictions). These subsequent physical ID checks may be random or based on risk factors (e.g., purchase quantities). For example, if the consumer buys more than a threshold of controlled products per unit of time (e.g., more than two vaping pods per week), the consumer may be prompted to show physical ID 1354 (operations 1406) to make sure the consumer, the mobile device 1307, and the consumer account are still linked. Positive results of such checks (e.g., the physical ID 1354 is confirmed to be that of the consumer linked to the account and the mobile device 1307), may increase confidence in that consumer for subsequent purchases of controlled products, thereby lowering a risk score associated with the consumer, thus requiring less frequent physical ID checks.

As part of the consumer account provisioning, the consumer may be required to secure (2202B) the account with a biometric validation feature of the mobile device 1307 (e.g., any of face ID, touch ID, and so forth). For example, the application may prompt the user to use a built-in biometric validation feature to access the application for subsequent purchases of controlled products. Thus, the consumer account (which is associated with a verified identity and/or age) is linked to the consumer, and the consumer is linked to the mobile device 1307 on which the consumer account is accessed. Stated another way, as a result of operation 2202B, the consumer is linked to the mobile device 1307 on which the consumer accesses his or her account, and as a result of operation 2202A, the consumer's identity and/or age is verified through the consumer's link to the account. Thus, the consumer, the mobile device 1307, and the verified account are all linked as a result of operations 2202.

Once the consumer account is provisioned in operations 2202 (thereby linking the consumer with the consumer account and the mobile device 1307), method 2200 continues with selection (2204) of one or more controlled products 1304. Similar to provisioning operations 2202, selection operations 2204 may take place before the consumer reaches the store (e.g., at home or some other remote location), thereby saving time and adding convenience for the consumer without compromising on age-based or identity-based compliance measures surrounding the sale of controlled products from the perspective of the retailer or manufacturer. In some implementations, operations 2204 may replace some or all of the product identification operations 1402 in method 1400 described above, allowing the consumer to identify, reserve, and/or pay for one or more controlled products 1304 before even going to the store.

In operation 2204A, the consumer may use the mobile application (on the mobile device 1307) to find a desired store (e.g., near the customer or at a place the customer will be at a later day or time), and the mobile application obtains from server system 1308 a list of products normally stocked (or currently stocked) at that store in the controlled dispensing machine 1302. Optionally, server system 1308 may also include pricing and/or current availability of the controlled products 1304 (e.g., describing which controlled products are in stock). In operation 2204B, the consumer selects, on the mobile application, one or more controlled products from the list obtained from server system 1308, and the mobile application reserves the selected products. Optionally, the mobile application facilitates payment (2204C) for the purchase of the selected products, thereby allowing the consumer to both reserve and pay for the desired controlled products before going to the store.

Once the consumer account is provisioned in operations 2202 (thereby linking the consumer with the consumer account and the mobile device 1307) and the controlled product(s) 1304 are reserved via the mobile application, method 2200 continues with in-store validation operations 2206. When the consumer arrives at the store, the consumer launches the mobile app on his or her mobile device 1307. Optionally, the mobile device 1307 uses a location service (e.g., GPS or Bluetooth) that determines when the consumer is located in the store (or located within a geofence around the store) and causes the mobile application to automatically launch to the appropriate screen. In some implementations, this screen provides an option for the consumer to indicate that he or she is ready to pick up the reserved product 1304. At this point, the mobile application performs (2206A) a biometric validation operation (e.g., any of face ID, touch ID, and so forth) to unlock a barcode. The in-store biometric operation 2206 ensures that the person accessing the mobile application is the same person who provisioned the consumer account in operations 2202 (and thus satisfies identity and/or age requirements associated with the controlled products 1304).

As a result of the consumer validation (biometric operation 2206A), the mobile device provides (2206B) a validation code on its display. The validation code may be a barcode, such as a two-dimensional matrix barcode such as a Quick Response (QR) code. Any other barcode or visual representation of a code (e.g., a string of numbers, letters, and/or symbols) may be displayed on the mobile device 1307. When the consumer presents the validation code to the retail clerk (by showing the display of the mobile device 1307), the retail clerk knows that biometric verification (2206A) passed, and that the person presenting the validation code is linked to the mobile device 1307, which is linked to a consumer account that is associated with a verified identity and/or age that satisfies restrictions associated with the controlled product(s) 1304). Stated another way, the retail clerk does not need to ask the consumer for a physical ID 1354, because the retail clerk can be assured that the holder of the mobile device 1307 is the person who is identity-verified and/or age-verified due to the biometric validation.

The clerk proceeds to scan (e.g., using scanning device 1306) the validation code displayed on the mobile device 1307, and dispensing machine 1302 validates the code against the server system 1308 (e.g., confirms that the validation code is still valid, has not been revoked, and/or that the reserved product 1304 has not already been dispensed). If this validation operation passes, then the dispensing machine 1302 dispenses the reserved (preordered) product 1304. This scanning operation may cover both payment and ID authentication, such that when the dispensing machine 1302 dispenses the reserved product 1304, the retail clerk may hand the product to the consumer and the consumer may leave the store. Alternatively, if the consumer did not pay for the reserve product remotely (2204C), then the consumer may pay in-person at the store before leaving with the dispensed product 1304.

Figure 23:
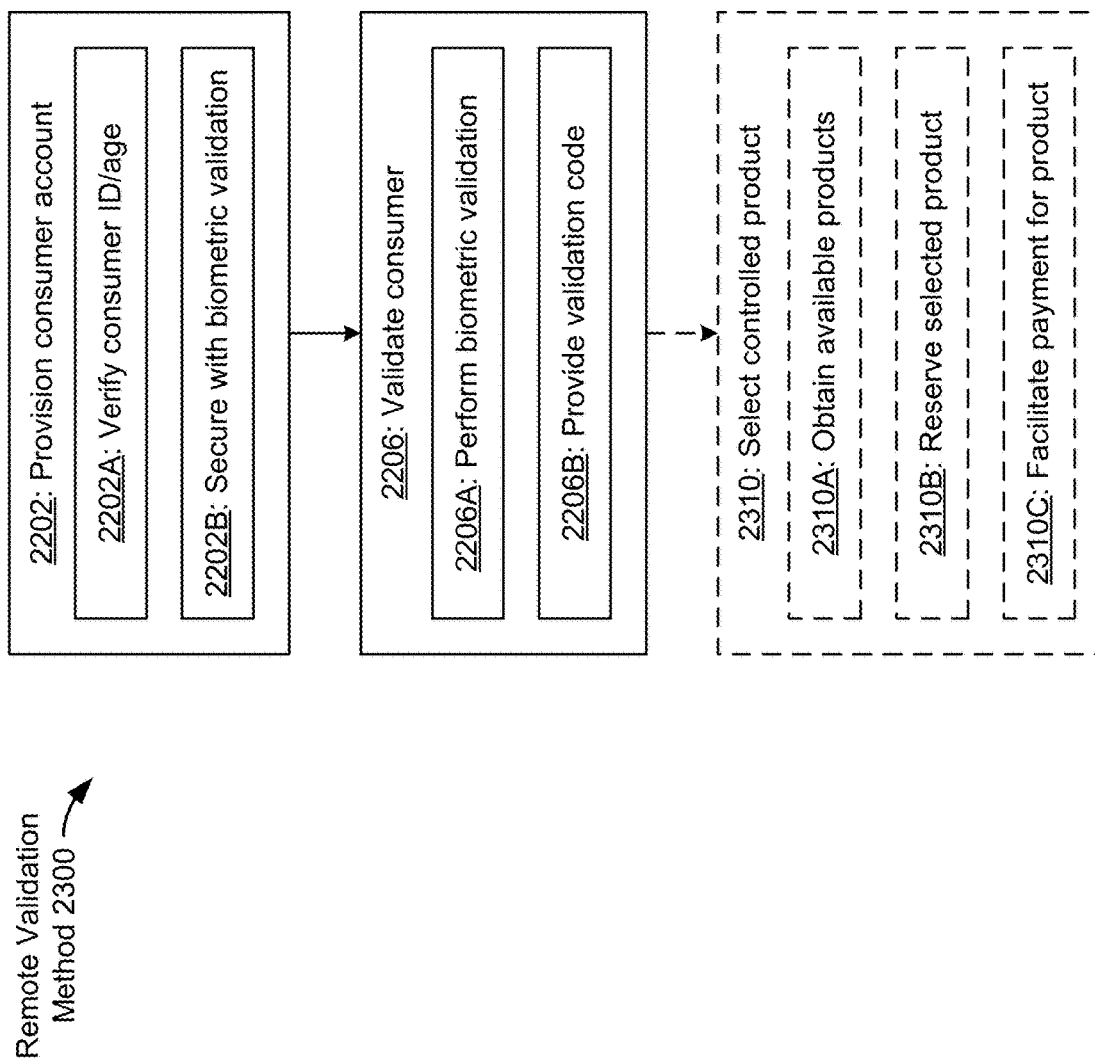
FIG. 23 is a flow diagram of a remote validation method at a mobile device including remote consumer account provisioning and local product selection in accordance with some implementations.

FIG. 23 is a flow diagram of a remote validation method 2300 at a mobile device including remote consumer account provisioning and in-store product selection in accordance with some implementations. The method 2300 may be governed by instructions that are stored in a memory or non-transitory computer readable storage medium of a mobile device (e.g., mobile device 1307) and that are executed by one or more processors of the mobile device. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 2300 may be combined and/or the order of some operations may be changed. Optional operations are conveyed with dashed lines.

In method 2300, the consumer may use his or her phone (e.g., mobile device 1307) to perform some of the operations described above in method 1400 (FIG. 14) before going to the location at which the dispensing machine 1302 is located (before going to the store), thereby saving time and adding convenience for the consumer without compromising on age-based or identity-based compliance measures surrounding the sale of controlled products from the perspective of the retailer or manufacturer. While in method 2200, the consumer both provisions an account and selects (reserves) controlled products before entering the store, the consumer in method 2300 provisions the account before entering the store and then makes product selections in the store. Stated another way, if the consumer did not order ahead of time, he or she can still go to the store and use the mobile application for identification, except after the retail clerk scans the validation code displayed by the application on the mobile device 1307, the consumer tells the retail clerk which products he or she wants, or otherwise selects the products in the store, as described above with reference to operations 1402. The consumer may then pay for the selected products in the store (or optionally with the mobile application).

Method 2300 begins with consumer account provisioning operations 2202, including initial verification (2202A) of identity and/or age of the consumer and initial configuration (2202B) of biometric validation for securing the validated account to the consumer as described above in method 2200. In some implementations, these operations may replace some or all of the consumer validation operations 1406 in method 1400 described above, allowing the consumer to be validated before even going to the store. As described above, operations 2202 may be performed remotely (before the consumer goes to the store), thereby saving time and adding convenience for the consumer without compromising on age-based or identity-based compliance measures surrounding the sale of controlled products from the perspective of the retailer or manufacturer.

Method 2300 continues with in-store validation operations 2206, including performing (2206A) biometric validation and providing (2206B) a validation code for display on the mobile device 1307 as described above in method 2200. Thus, when it is time for the consumer to order controlled products from the dispensing machine 1302, the retail clerk may presume that the consumer meets identity-based and/or age-based requirements associated with the controlled products by scanning the validation code on the consumer's mobile device.

Method 2300 continues with product selection operations 2310. In some implementations, the consumer may obtain (2310A) a list of, or otherwise view, controlled products 1304 that are available for dispensing in the store (e.g., by viewing the display screen 1314 or placard 1352) as described above with reference to operation 1402. Alternatively, the list of controlled products 1304 available for dispensing may be communicated by the dispensing machine 1302 to the mobile app via short-range communication protocol (e.g., Bluetooth) while the consumer is in the store.

The consumer may reserve (2310B) desired controlled products by indicating them to the retail clerk (e.g., by pointing to or otherwise selecting them on the display screen 1314 or placard 1352). Alternatively, the mobile application may automatically select one or more controlled products. For example, the consumer may have a preference already stored in the mobile application (e.g., configured by the consumer and/or based on purchase history). When the validation code is scanned, the product identifier(s) of the consumer's selection can be encoded (by the mobile application) in the validation code in addition to the user information, so there is no need to tell the retail clerk which controlled product(s) are desired for purchase. These options may be configurable, in that instead of automatic selections based on preferences, the preferred products may be offered by the mobile application and/or the dispensing machine 1302 for confirmation by the consumer. For example, the consumer may agree to have the offered products dispensed, or the consumer may select different products for dispensing. In such a scenario, the selection may be used to update the consumer's preferences (stored in the mobile application and/or with the consumer's account at the server system 1308).

Alternatively, the server system 1308 may automatically select one or more controlled products. For example, instead of the mobile application encoding product identifiers in the validation code, consumer preferences (e.g., configured by the consumer and/or based on purchase history) may be associated with the consumer's account and stored at the server system 1308. When the dispensing machine 1302 is validating the consumer (operations 1406), the dispensing machine 1302 can also download the consumer's preferred selections from the server system 1308 and automatically select the preferred controlled product(s) for dispensing, so there is no need to tell the retail clerk which controlled product(s) are desired for purchase. These options may be configurable, in that instead of automatic selections based on preferences, the preferred products may be offered by the mobile application and/or the dispensing machine 1302 for confirmation by the consumer. These options may be configurable, in that instead of automatic selections based on preferences, the preferred products may be offered by the mobile application and/or the dispensing machine 1302 for confirmation by the consumer. For example, the consumer may agree to have the offered products dispensed, or the consumer may select different products for dispensing. In such a scenario, the selection may be used to update the consumer's preferences (stored in the mobile application and/or with the consumer's account at the server system 1308).

The dispensing machine 1302 proceeds to dispense the selected controlled product(s) 1304. The user may pay (2310C) in the store contemporaneous to (just before, during, or just after) the dispensing operation as described above. The user may pay in person (e.g., using cash or a credit card) at a point of sale (e.g., using retailer machine 1312). Alternatively, the mobile application may facilitate payment as described above (e.g., with reference to operation 2204C). In some implementations, the consumer may select an option on the mobile application to pay for the selected product(s) before the retail clerk scans the validation code. As such, when the retail clerk (or dispensing machine 1302) scans the validation code, the retail machine 1312 (or the dispensing machine 1302) may upload the product selection to the server system 1308, which ensures that the consumer has sufficient funds and, if so, authorizes dispensing (e.g., by sending a dispensing authorization command to the dispensing machine 1302), and charges the payment account associated with the consumer's account. In such a scenario, no in-person payment is necessary at the store, thereby further increasing convenience without compromising on age-based or identity-based compliance measures surrounding the sale of controlled products from the perspective of the retailer or manufacturer.

Figure 24:
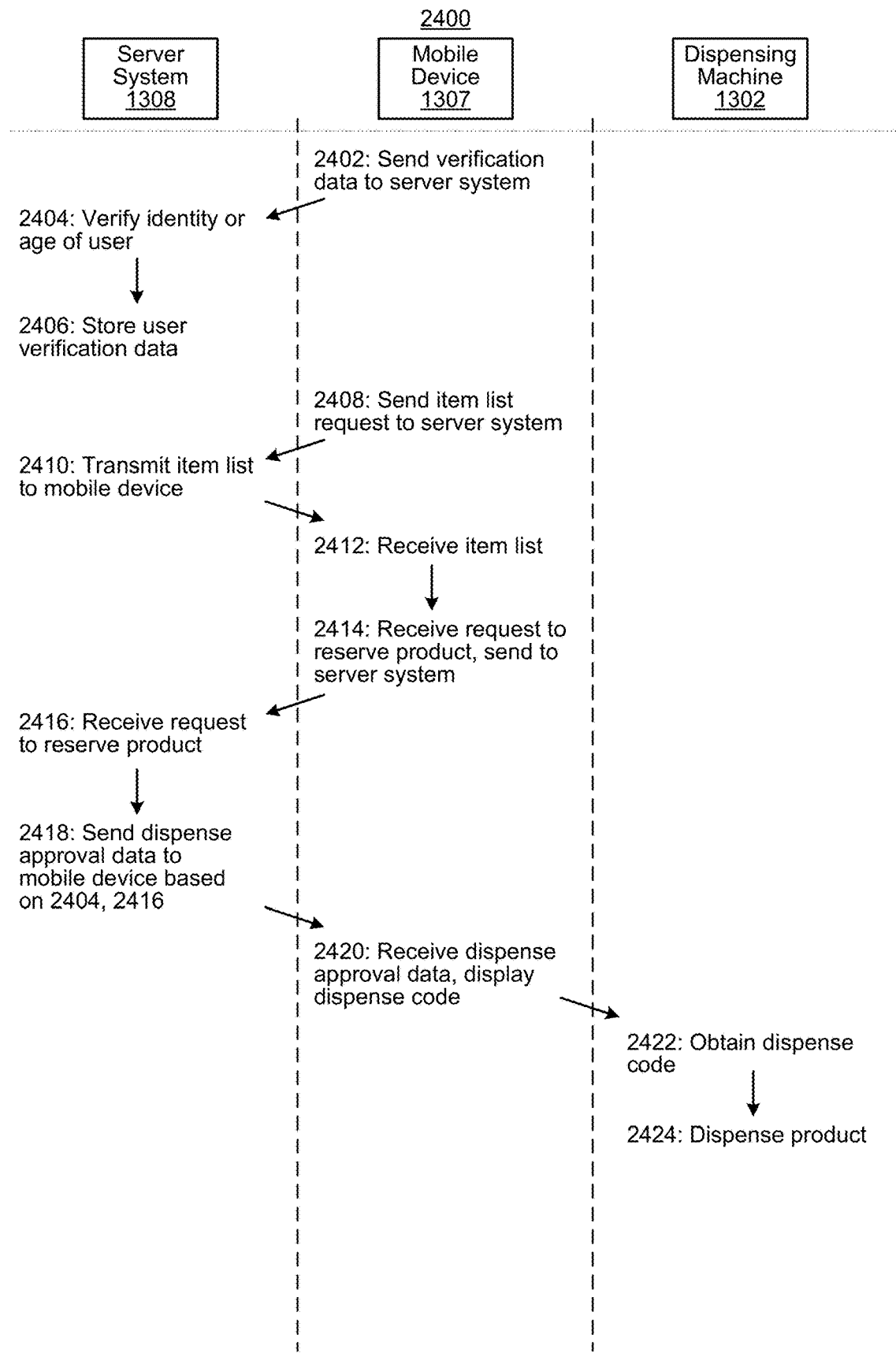
FIG. 24 is a flow diagram of a remote validation method at a controlled dispensing system including remote consumer account provisioning and remote product selection in accordance with some implementations.

FIG. 24 is a flow diagram of a remote validation method 2400 at a controlled dispensing system 1300 including remote consumer account provisioning and remote product selection (as described with reference to method 2200 above) in accordance with some implementations. The method 2400 may be governed by instructions that are stored in respective memories or non-transitory computer readable storage mediums of a server system (e.g., server system 1308), a mobile device (e.g., mobile device 1307), and a dispensing machine (e.g., dispensing machine 1302) and that are executed by one or more processors of the aforementioned system, device, machine. The computer readable storage mediums may include magnetic or optical disk storage devices, solid state storage devices such as Flash memory, or other non-volatile memory devices. The instructions stored on the computer readable storage mediums may include one or more of: source code, assembly language code, object code, or other instruction format that is interpreted by one or more processors. Some operations in the method 2400 may be combined and/or the order of some operations may be changed. Optional operations are conveyed with dashed lines.

In method 2400, a controlled dispensing system includes a dispensing fixture 1302 including an input peripheral (e.g., scanner 1318 or 1306), a plurality of controlled products (e.g., identity-restricted or age-restricted controlled products 1304), and a dispensing mechanism (e.g., 2106); and a server system 1308 communicatively coupled to the dispensing fixture 1302 and a mobile device 1307 of a user via a communication network 1310. The mobile device sends (2402) verification data (e.g., described above with reference to operations 2202) to the server system, which receiving from the mobile device image data corresponding to an identification document (e.g., 1354) or face (e.g., a live selfie) of the user of the mobile device. The server system verifies (2404) an identity or age of the user based on the image data received from the mobile device. In some implementations, the server system stores (2406) the verification data of the user based on the verifying of the identity or age of the user, and transmits subsequent approval data to the mobile device for subsequent dispense approval operations based in part on the verification data (e.g., approves subsequent dispensing operations for future store visits as described above with reference to operations 2206).

The mobile device sends (2408) a request for a list of available controlled products for purchase at a desired store (e.g., stocked in dispensing machines at the desired store). The server system receives from the mobile device the request to obtain a list of the plurality of controlled products included in the dispensing fixture. In response to the request to obtain the list of the plurality of controlled products, the server system transmits (2410) the list of the plurality of controlled products to the mobile device, and the mobile device receives (2412) the item list.

The mobile device receives a user request (2414) to reserve one or more of the available controlled products (e.g., described above with reference to operations 2204) and transmits the request to the server system. The server system receives (2416) receiving from the mobile device the request to reserve a first controlled product of the plurality of controlled products included in the dispensing fixture. The server system sends (2418) dispense approval data (e.g., corresponding to a validation code as described above with reference to operation 2206B) to the mobile device based on the verification of the identity and/or age of the user (operation 2404) and the request to reserve a product (operation 2416). The dispense approval data indicates that the user is validated (meets identity and/or age-based requirements associated with the reserved controlled product) and indicates which controlled product(s) were requested.

Stated another way, in accordance with (i) the verifying of the identity or age of the user (operation 2404) and (ii) the request to reserve the first controlled product (operation 2416) (before the mobile device is present at a location (e.g., the store) of the dispensing fixture), the server system transmits (2418) to the mobile device the dispense approval data including (i) an indication that the identity or age of the user is verified and (ii) a product indicator corresponding to the first controlled product. Optionally, the server system processes a payment initiated by the user at the mobile device for the first controlled product.

The mobile device receives (2420) the dispense approval data, and when the user is in the story and ready to request dispensing of the reserved product, the mobile device displays a dispense code (e.g., the validation code described above with reference to operation 2206) for scanning by the input peripheral (e.g., scanner 1306 or 1318) of the dispensing fixture. The dispensing fixture obtains (2422) via the input peripheral (e.g., scanner 1306 or 1318) the dispense code provided by the mobile device (e.g., the dispense code being a visual code displayed on the mobile device such as a barcode). The dispense code corresponds to the dispense approval data transmitted from the server system to the mobile device. In accordance with the obtaining the dispense code, the one or more processors of the dispensing machine cause the dispensing mechanism to dispense (2424) the first controlled product (the reserved controlled product).

In some implementations, any operations described above with reference to method 2200 may be performed in addition to those described above with reference to method 2400.

Figure 25:
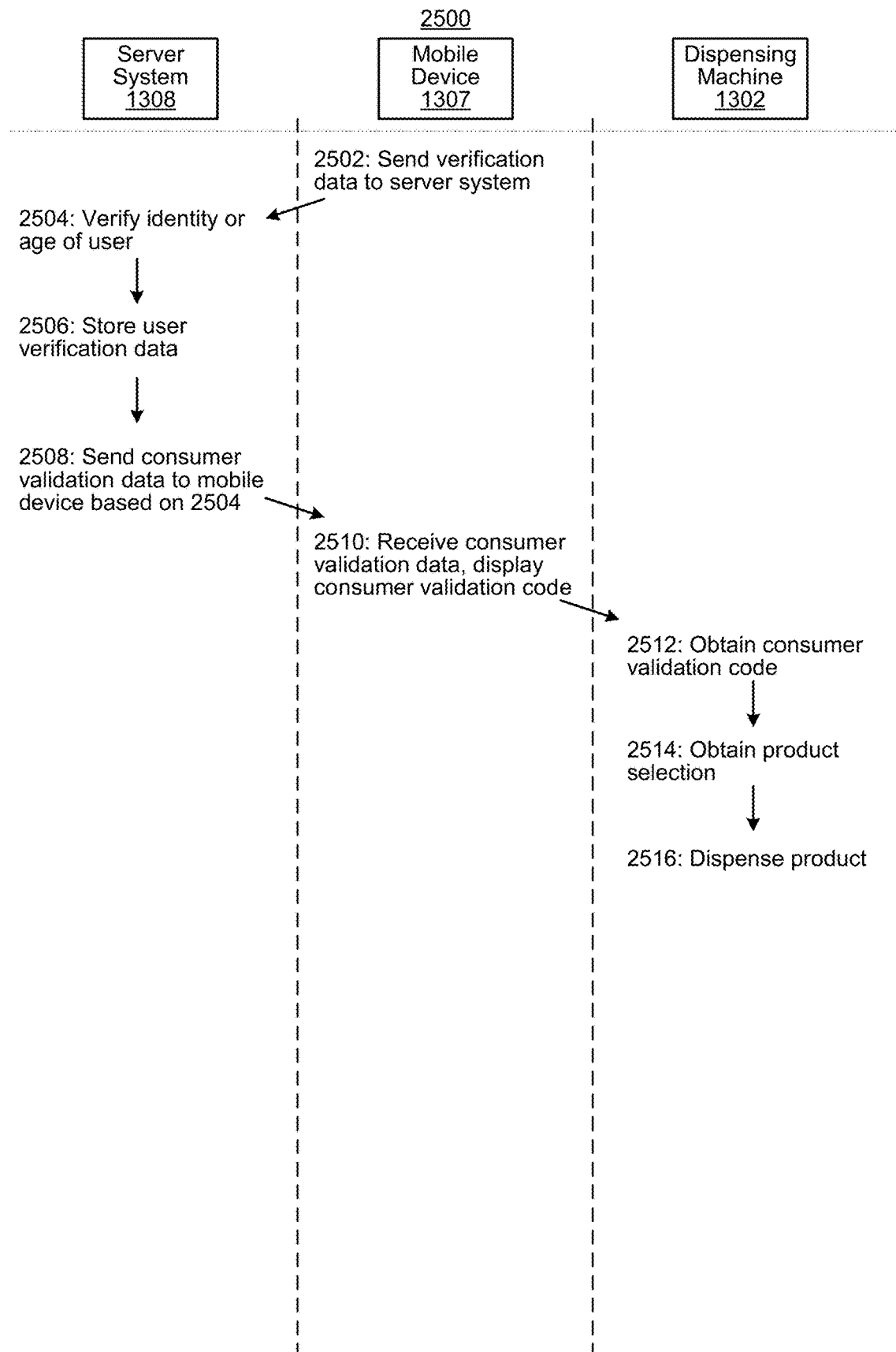
FIG. 25 is a flow diagram of a remote validation method at a controlled dispensing system including remote consumer account provisioning and local product selection in accordance with some implementations.

FIG. 25 is a flow diagram of a remote validation method at a controlled dispensing system 1300 including remote consumer account provisioning and local product selection (as described with reference to method 2300 above) in accordance with some implementations. The method 2500 may be governed by instructions that are stored in respective memories or non-transitory computer readable storage mediums of a server system (e.g., server system 1308), a mobile device (e.g., mobile device 1307), and a dispensing machine (e.g., dispensing machine 1302) and that are executed by one or more processors of the aforementioned system, device, machine. The computer readable storage mediums may include magnetic or optical disk storage devices, solid state storage devices such as Flash memory, or other non-volatile memory devices. The instructions stored on the computer readable storage mediums may include one or more of: source code, assembly language code, object code, or other instruction format that is interpreted by one or more processors. Some operations in the method 2500 may be combined and/or the order of some operations may be changed. Optional operations are conveyed with dashed lines.

In method 2500, a controlled dispensing system includes a dispensing fixture 1302 including an input peripheral (e.g., scanner 1318 or 1306), a plurality of controlled products (e.g., identity-restricted or age-restricted controlled products 1304), and a dispensing mechanism (e.g., 2106); and a server system 1308 communicatively coupled to the dispensing fixture 1302 and a mobile device 1307 of a user via a communication network 1310. The mobile device sends (2502) verification data (e.g., described above with reference to operations 2202) to the server system, which receiving from the mobile device image data corresponding to an identification document (e.g., 1354) or face (e.g., a live selfie) of the user of the mobile device. The server system verifies (2504) an identity or age of the user based on the image data received from the mobile device. In some implementations, the server system stores (2506) the verification data of the user based on the verifying of the identity or age of the user, and transmits subsequent approval data to the mobile device for subsequent dispense approval operations based in part on the verification data (e.g., approves subsequent dispensing operations for future store visits as described above with reference to operations 2206).

In accordance with the verifying of the identity or age of the user (and before the mobile device is present at a location (e.g., a store) of the dispensing fixture), the server system transmits (2508) to the mobile device consumer validation data including an indication that the identity or age of the user is verified (meets identity-based and/or age-based restrictions associated with the controlled products 1304) (based on operation 2504). The mobile device 1307 receives (2510) the consumer validation data, and displays a consumer validation code (as described above with reference to operation 2206B).

The dispensing fixture obtains (2512) via the input peripheral the consumer validation code provided by the mobile device (e.g., scans a visual code displayed on the mobile device such as a barcode), wherein the consumer validation code corresponds to the consumer validation data transmitted from the server system to the mobile device. The dispensing fixture obtains (2514) a user selection of a first controlled product of the plurality of controlled products (e.g., as described above with reference to operations 2310). In accordance with the consumer validation code (verifying that the user meets identity-based or age-based requirements associated with the selected controlled product) and the user selection (of the first controlled product), the one or more processors of the dispensing fixture cause the dispensing mechanism to dispense (2516) the first controlled product (the selected controlled product).

In some implementations, any operations described above with reference to method 2300 may be performed in addition to those described above with reference to method 2500.

Miscellaneous

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A controlled dispensing system comprising:
    a dispensing fixture including an input peripheral, a plurality of controlled products, and a dispensing mechanism; and
    a server system communicatively coupled to the dispensing fixture and a mobile device of a user via a communication network;
    wherein the server system further includes one or more processors and memory storing one or more programs to be executed by the one or more processors, the one or more programs including instructions for:
        prior to receiving from the mobile device any requests to reserve or select any of the plurality of controlled products:
            receiving from the mobile device image data corresponding to an identification document of the user of the mobile device;
            verifying an age of the user based on the image data received from the mobile device, and determining that the age of the user satisfies an age-based restriction associated with the plurality of controlled products;
        receiving from the mobile device a request to obtain a list of the plurality of controlled products included in the dispensing fixture; and
        in response to the request to obtain the list of the plurality of controlled products, transmitting the list of the plurality of controlled products to the mobile device;
        receiving from the mobile device a request to reserve a first controlled product of the plurality of controlled products included in the dispensing fixture; and
        in accordance with (i) the verifying of the age of the user and the determination that the age of the user satisfies the age-based restriction and (ii) the request to reserve the first controlled product, transmitting to the mobile device dispense approval data including (i) an indication that the age of the user satisfies the age-based restriction and (ii) a product indicator corresponding to the first controlled product; and
    wherein the dispensing fixture further includes one or more processors and memory storing one or more programs to be executed by the one or more processors, the one or more programs including instructions for:
        obtaining via the input peripheral a dispense code provided by the mobile device, wherein the dispense code corresponds to the dispense approval data transmitted from the server system to the mobile device indicating that the age of the user satisfies the age-based restriction; and
        in accordance with the dispense code, causing the dispensing mechanism to dispense the first controlled product.

2. The controlled dispensing system of claim 1, wherein the input peripheral is a scanning device communicatively coupled to the dispensing fixture.

3. The controlled dispensing system of claim 1, wherein the plurality of controlled products are products for which usage is controlled by an age restriction.

4. The controlled dispensing system of claim 1, wherein the plurality of controlled products are tobacco products, vaping products, and/or electronic cigarettes.

5. The controlled dispensing system of claim 1, wherein the image data corresponds to a driver's license of the user.

6. The controlled dispensing system of claim 1, wherein the one or more programs stored in the one or more processors of the server further include instructions for:
    storing verification data of the user based on the verifying of the age of the user; and
    transmitting subsequent approval data to the mobile device for subsequent dispense approval operations based in part on the verification data.

7. The controlled dispensing system of claim 1, wherein the one or more programs stored in the one or more processors of the server further include instructions for transmitting the dispense approval data to the mobile device before the mobile device is present at a location of the dispensing fixture.

8. The controlled dispensing system of claim 1, wherein the one or more programs stored in the one or more processors of the server further include instructions for processing a payment initiated at the mobile device for the first controlled product.

9. The controlled dispensing system of claim 1, wherein obtaining the dispense code via the input peripheral includes scanning a visual code displayed on the mobile device.

10. The controlled dispensing system of claim 9, wherein the visual code is a barcode.

11. A method of operating a controlled dispensing system, the method comprising:
    at a server system including one or more processors and communicatively coupled to a dispensing fixture and a mobile device of a user via a communication network:
        prior to receiving from the mobile device any requests to reserve or select any of a plurality of controlled products included in the dispensing fixture:
            receiving from the mobile device image data corresponding to an identification document or face of the user of the mobile device;
            verifying an age of the user based on the image data received from the mobile device, and determining that the age of the user satisfies an age-based restriction associated with the plurality of controlled products;
        receiving from the mobile device a request to obtain a list of the plurality of controlled products included in the dispensing fixture; and
        in response to the request to obtain the list of the plurality of controlled products, transmitting the list of the plurality of controlled products to the mobile device;

receiving from the mobile device a request to reserve a first controlled product of the plurality of controlled products included in the dispensing fixture; and in accordance with (i) the verifying of the age of the user and the determination that the age of the user satisfies the age-based restriction and (ii) the request to reserve the first controlled product, transmitting to the mobile device dispense approval data including (i) an indication that the age of the user satisfies the age-based restriction and (ii) a product indicator corresponding to the first controlled product; and at the dispensing fixture, the dispensing fixture including one or more processors, an input peripheral, and a dispensing mechanism:

obtaining via the input peripheral a dispense code provided by the mobile device, wherein the dispense code corresponds to the dispense approval data transmitted from the server system to the mobile device indicating that the age of the user satisfies the age-based restriction; and in accordance with the dispense code, sending an instruction via the one or more processors to the dispensing mechanism causing the dispensing mechanism to dispense the first controlled product.

12. The method of claim 11, wherein the input peripheral is a scanning device communicatively coupled to the dispensing fixture.

13. The method of claim 11, wherein the plurality of controlled products are products for which usage is controlled by an age restriction.

14. The method of claim 11, wherein the plurality of controlled products are tobacco products, vaping products, and/or electronic cigarettes.

15. The method of claim 11, wherein the image data corresponds to a driver's license of the user.

16. The method of claim 11, further comprising, at the server:

storing verification data of the user based on the verifying of the age of the user; and transmitting subsequent approval data to the mobile device for subsequent dispense approval operations based in part on the verification data.

17. The method of claim 11, further comprising, at the server, transmitting the dispense approval data to the mobile device before the mobile device is present at a location of the dispensing fixture.

18. The method of claim 11, further comprising, at the server, processing a payment initiated at the mobile device for the first controlled product.

19. The method of claim 11, wherein obtaining the dispense code via the input peripheral includes scanning a visual code displayed on the mobile device.

20. The method of claim 11, wherein the visual code is a barcode.

* * * * *